US010680464B2

(12) United States Patent
Tominaga et al.

(10) Patent No.: US 10,680,464 B2
(45) Date of Patent: Jun. 9, 2020

(54) CONTACTLESS POWER RECEIVER, CONTACTLESS POWER FEEDER, AND CONTACTLESS POWER TRANSMISSION SYSTEM PROVIDED WITH SAME

(71) Applicant: Panasonic Intellectual Property Management Co., Ltd., Osaka (JP)

(72) Inventors: Hiroshi Tominaga, Hyogo (JP); Akio Kurobe, Osaka (JP); Keiji Ogawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 217 days.

(21) Appl. No.: 15/322,550

(22) PCT Filed: Sep. 2, 2015

(86) PCT No.: PCT/JP2015/004454
§ 371 (c)(1),
(2) Date: Dec. 28, 2016

(87) PCT Pub. No.: WO2016/035333
PCT Pub. Date: Mar. 10, 2016

(65) Prior Publication Data
US 2017/0133887 A1 May 11, 2017

(30) Foreign Application Priority Data

Sep. 2, 2014 (JP) .................................. 2014-177634
Nov. 13, 2014 (JP) .................................. 2014-230822
Jan. 21, 2015 (JP) .................................. 2015-009055

(51) Int. Cl.
*H02J 50/12* (2016.01)
*H02J 50/80* (2016.01)
(Continued)

(52) U.S. Cl.
CPC ............. *H02J 50/12* (2016.02); *H02J 7/025* (2013.01); *H02J 50/80* (2016.02); *H04M 1/0202* (2013.01); *H04M 1/7253* (2013.01)

(58) Field of Classification Search
CPC ............. H02J 50/12; H02J 50/80; H02J 7/025
See application file for complete search history.

(56) References Cited

U.S. PATENT DOCUMENTS

2009/0074044 A1* 3/2009 Yokomitsu ............... H04B 3/54
375/225
2013/0264997 A1* 10/2013 Lee ....................... H04B 5/0037
320/106
(Continued)

FOREIGN PATENT DOCUMENTS

JP 2009-165291 7/2009
JP 2012-105478 A 5/2012
(Continued)

OTHER PUBLICATIONS

International Search Report of PCT application No. PCT/JP2015/004454 dated Nov. 17, 2015.
(Continued)

*Primary Examiner* — Jeffrey M Shin
(74) *Attorney, Agent, or Firm* — Brinks Gilson & Lione

(57) ABSTRACT

Contactless power receiver 1a includes power reception unit having a contactless power reception function using electromagnetic induction; communication unit separately transmitting a plurality of data items in the vicinity of a zero cross point of an alternating current voltage from commercial power supply; and power reception side message division unit dividing a transmission message into a plurality of data items. Contactless power feeder includes power feeding unit having a contactless power feeding function using electromagnetic induction; communication unit separately receiving a plurality of data items in the vicinity of a zero cross point of an alternating current voltage from commercial power supply; and power feeding side message combination unit generating a reception message by combining a plurality of data items. Each of the plurality of data items which are divided by power reception side message division unit and are combined by power feeding side message combi-
(Continued)

nation unit has a size transmittable in the vicinity of the zero cross point. According to this configuration, it is possible to accurately perform communication having a large amount of information without being affected by a noise due to contactless power transmission.

16 Claims, 37 Drawing Sheets

(51) Int. Cl.
*H02J 7/02* (2016.01)
*H04M 1/02* (2006.01)
*H04M 1/725* (2006.01)

(56) References Cited

U.S. PATENT DOCUMENTS

2016/0065005 A1* 3/2016 Won ............... H04B 5/0037
                                                      307/104
2017/0149286 A1* 5/2017 Joye ................ H02J 7/025

FOREIGN PATENT DOCUMENTS

| JP | 2013-236479 | 11/2013 |
| JP | 2013-251952 | 12/2013 |
| WO | 2014/108785 A1 | 7/2014 |

OTHER PUBLICATIONS

The Extended European Search Report dated Jul. 25, 2017 for the related European Patent Application No. 15837304.3.

* cited by examiner

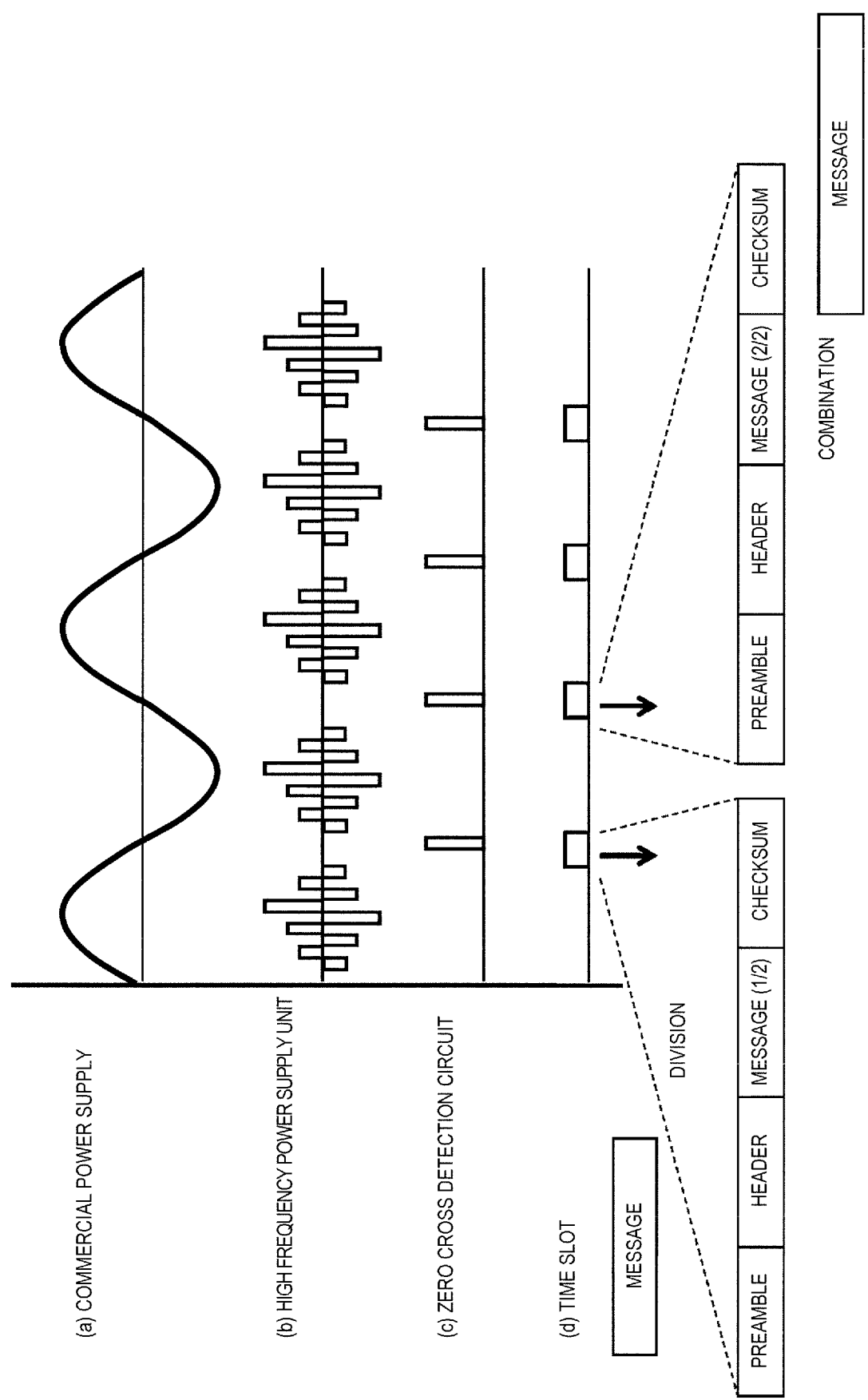

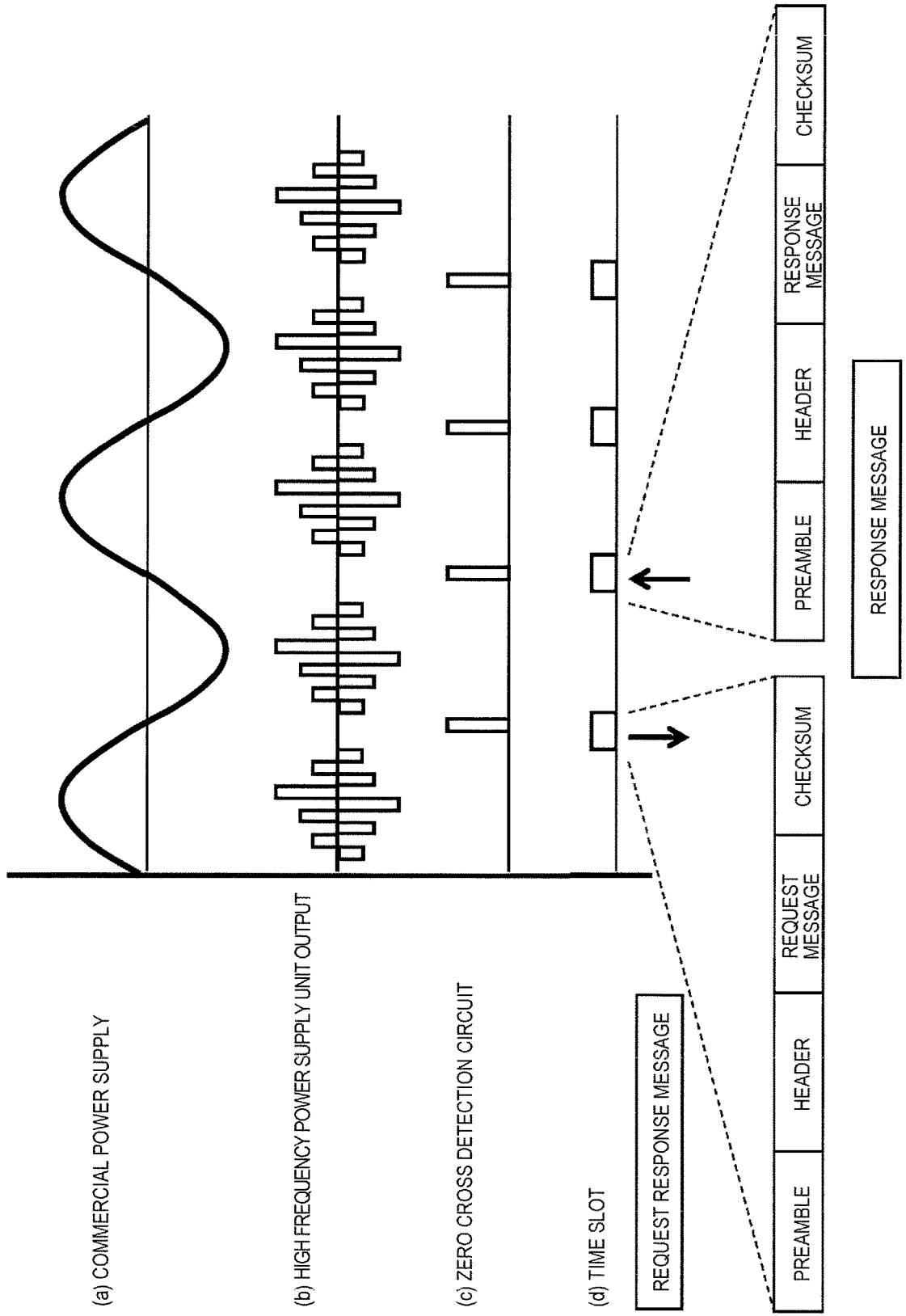

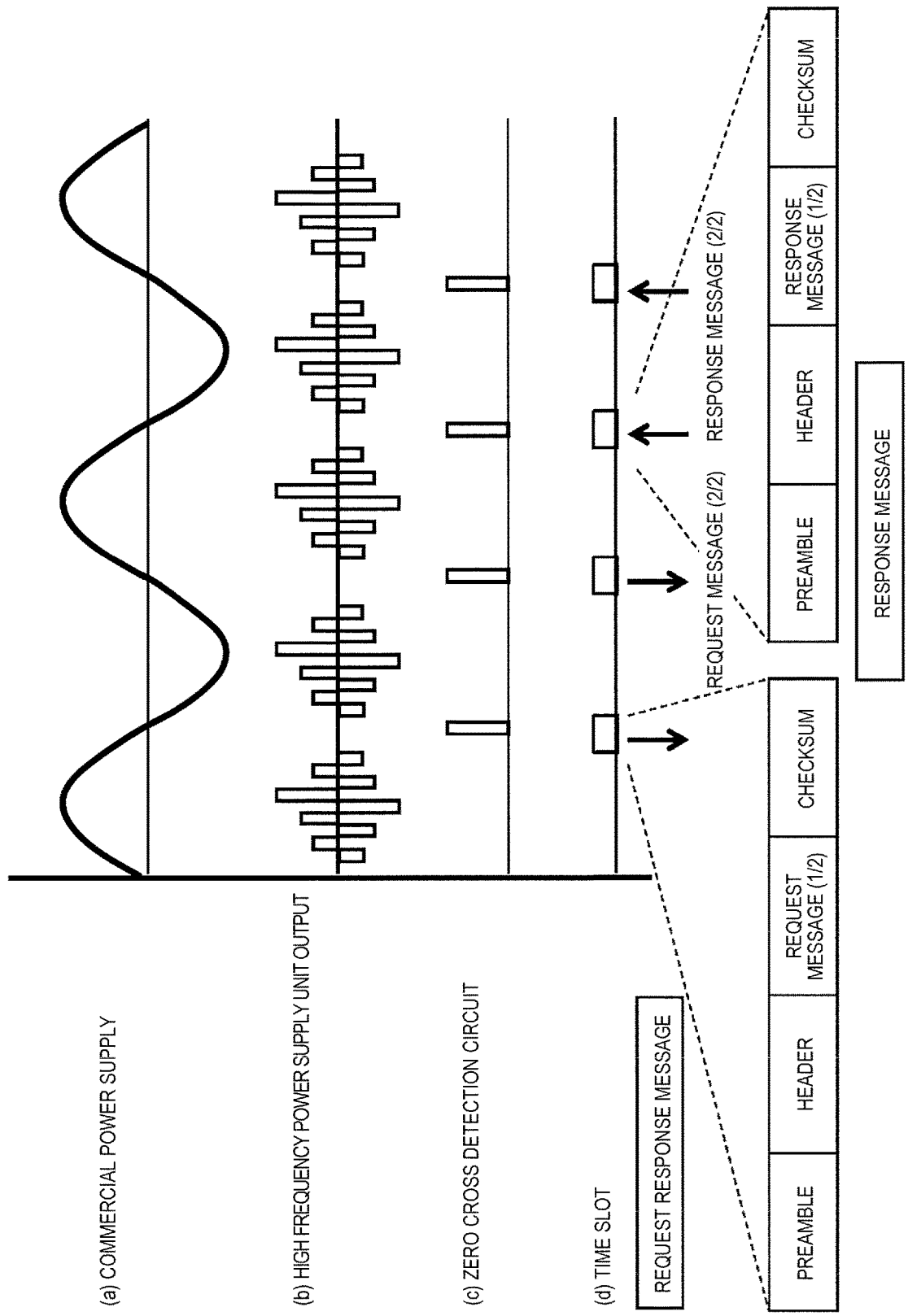

FIG. 24C
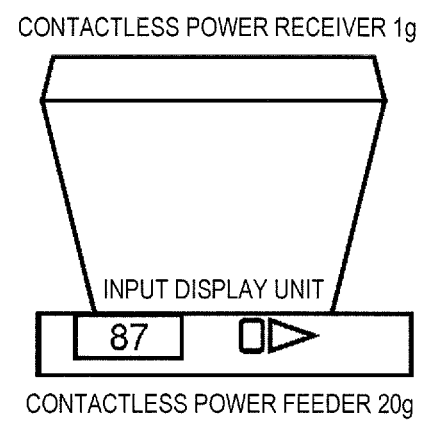
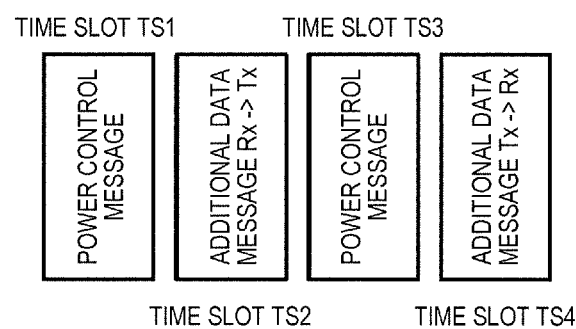

FIG. 24D
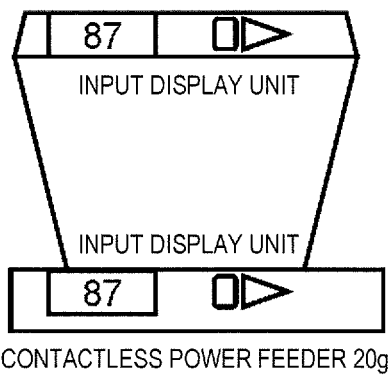
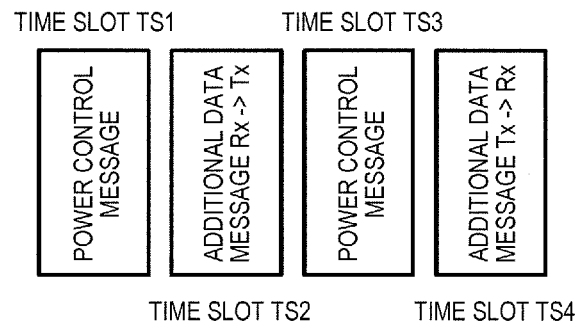

*FIG. 34*

| HEADER | MESSAGE SIZE | COMPLEMENT |
|---|---|---|
| 0x00...0x1F | 1 + (HEADER – 0) / 32 | 1 x 32 MESSAGE (SIZE 1) |
| 0x20...0x7F | 2 + (HEADER – 32) / 16 | 6 x 16 MESSAGE (SIZE 2...7) |
| 0x80...0xDF | 8 + (HEADER – 128) / 8 | 12 x 8 MESSAGE (SIZE 8...19) |
| 0xE0...0xFF | 20 + (HEADER – 224) / 4 | 8 x 4 MESSAGE (SIZE 20...27) |

FIG. 35

| HEADER | PACKET TYPE | MESSAGE SIZE |
|---|---|---|
| PING STATE | | |
| 0x01 | SIGNAL STRENGTH | 1 |
| 0x02 | END POWER TRANSFER | 1 |
| IDENTIFICATION STATE/SETTING STATE | | |
| 0x06 | POWER CONTROL HOLD OFF | 1 |
| 0x51 | CONFIGURATION | 5 |
| 0x71 | IDENTIFICATION | 7 |
| 0x81 | EXTENDED IDENTIFICATION | 8 |
| POWER FEEDING STATE | | |
| 0x02 | END POWER TRANSFER | 1 |
| 0x03 | CONTROL ERROR | 1 |
| 0x04 | RECEIVED POWER | 1 |
| 0x05 | CHARGE STATUS | 1 |
| IDENTIFICATION STATE/SETTING STATE, POWER FEEDING STATE | | |
| 0x18 | PROPRIETARY | 1 |
| 0x19 | PROPRIETARY | 1 |
| 0x28 | PROPRIETARY | 2 |
| 0x29 | PROPRIETARY | 2 |
| 0x38 | PROPRIETARY | 3 |
| 0x48 | PROPRIETARY | 4 |
| 0x58 | PROPRIETARY | 5 |
| 0x68 | PROPRIETARY | 6 |
| 0x78 | PROPRIETARY | 7 |
| 0x84 | PROPRIETARY | 8 |
| 0xA4 | PROPRIETARY | 12 |
| 0xC4 | PROPRIETARY | 16 |
| 0xE2 | PROPRIETARY | 20 |

CONTACTLESS POWER RECEIVER, CONTACTLESS POWER FEEDER, AND CONTACTLESS POWER TRANSMISSION SYSTEM PROVIDED WITH SAME

This application is a 371 application of PCT/JP2015/004454 having an international filing date of Sep. 2, 2015, which claims priority to JP2014-177634 filed Sep. 2, 2014, JP2014-230822 filed Nov. 13, 2014, and JP2015-009055 filed Jan. 21, 2015. The entire contents of these applications are incorporated herein by reference.

TECHNICAL FIELD

The present disclosure relates to a contactless power transmission system for consumer electronics and the like.

BACKGROUND ART

FIG. 30 is a block configuration diagram of a contactless power transmission system of the related art described in PTL 1.

As illustrated in FIG. 30, in PTL 1, contactless power receiver 401 is disclosed in which input of a command and output of information with respect to contactless power feeder 420 are performed in order to improve usability and reliability of contactless power receiver 401.

Contactless power receiver 401 includes resonant circuit for power reception 405a which becomes a power reception unit for receiving power fed from contactless power feeder 420 over the wireless on the basis of a change in a magnetic flux generated at the time of operating contactless power feeder 420, and resonant circuit 405b performing bidirectional communication of a communication signal with respect to contactless power feeder 420 over the wireless.

Contactless power feeder 420 includes resonant circuit for feeding power 422 corresponding to resonant circuit 405a, and resonant circuit for communication 421 and communication circuit 423 corresponding to resonant circuit 405b.

FIG. 31 is a block configuration diagram of a wireless charge system of the related art described in NPL 1 in which, in particular, the specification for a mobile device such as a smart phone is defined.

As illustrated in FIG. 31, the wireless charge system defined in NPL 1 includes base station 301 and mobile device 302.

Power is fed from power conversion unit 306a and power conversion unit 306b of base station 301 to power pickup unit 307 of mobile device 302 over the contactless. Load 309 of mobile device 302 consumes the fed power.

At this time, base station 301 adjusts the amount of fed power according to the amount of required power which is transmitted from power receiver 305 of mobile device 302 to power transmitter 304a and power transmitter 304b of base station 301 through communication control unit 308a and communication control unit 308b.

FIG. 32 is a state transition diagram of the wireless charge system of the related art described in NPL 1. In selection state S1 illustrated in FIG. 32, it is detected whether or not mobile device 302 is disposed on base station 301.

The detection of mobile device 302, for example, is performed by detecting a change in impedance, or the like. In a case where base station 301 detects that mobile device 302 is disposed thereon, the state is transitioned to ping state S2. In ping state S2, a minute amount of power which is sufficient to activate communication control unit 308c is fed to power pickup unit 307 of mobile device 302 from power conversion unit 306a.

In this state, in a case where a response from mobile device 302 is not returned to base station 301 through communication control units 308a and 308b, the state returns to selection state S1.

In a case where the response returns, base station 301 is transitioned to identification state/setting state S3 while continuously transmitting a minute amount of power.

In identification state/setting state S3, mobile device 302 transmits identification information or the amount of required power to base station 301 through communication control units 308a and 308b. In a case where it is determined that it is possible to correspond to the amount of required power from mobile device 302, base station 301 is transitioned to power feeding state S4.

In power feeding state S4, power transmission is performed from power transmitter 304a of base station 301 to power receiver of mobile device 302. The amount of power to be transmitted is adjusted according to the amount of required power which is transmitted from power receiver 305 of mobile device 302 to power transmitter 304a of base station 301. Load 309 of mobile device 302 consumes the transmitted power.

FIG. 33 illustrates a format of a communication packet which is used in the wireless charge system described in NPL 1.

As illustrated in FIG. 33, preamble 321 stores codes of 11 bits to 25 bits for detecting the communication packet. Header 322 stores a code of 1 bite corresponding to a class and a size of a message.

Message 323 stores data items of 1 bite to 27 bites corresponding to the codes in header 322. Checksum 324 stores data of 1 bite for detecting a communication error.

FIG. 34 is a diagram illustrating a relationship between a message size and a code of a header defined in NPL 1. FIG. 35 is a diagram illustrating a message type defined in NPL 1.

In NPL 1, it is defined that message sizes of 1 bite to 27 bites which are obtained by substituting the code in header 322 into a numerical expression illustrated in FIG. 34 are used. In addition, as illustrated in FIG. 35, in NPL 1, a packet type of a message and a message size corresponding to each code are defined. Here, the detailed description thereof is omitted.

CITATION LIST

Patent Literature

PTL 1: Japanese Patent Unexamined Publication No. 2009-165291

Non-Patent Literature

NPL 1: System Description Wireless Power Transfer Volume I: Low Power Part 1: Interface Definition Version 1.1.2 Jun. 2013

SUMMARY OF THE INVENTION

A technology of the related art described in PTL 1 is configured such that in a case where any one of a cooking container such as a pot and an input and output device including a communication circuit, an information input and output circuit, and the like is selected to be used, switching between transmission of only high power and transmission of low power and data communication is performed according to the selection. In this configuration, the data communication is not performed at the time of performing the transmission of high power, and thus, it is possible to perform the power transmission and the data communication by using the same coil.

In a technology of the related art described in NPL 1, power to be transmitted is limited to be less than or equal to 5 W, and thus, it is easy to perform communication by superimposing data on the power to be transmitted. For this reason, a coil for contactless power transmission and a coil for communication are communized on both of a power feeding side and a power reception side, and at all times, it is possible to simultaneously perform power transmission and data communication.

However, in the technology of the related art described in PTL 1, there is a case where consumed power is greater than 1 kW. In this case, in order to simultaneously perform the power transmission and the data communication, the coil for power transmission and the coil for communication are required.

In addition, in the technology of the related art described in PTL 1, in a case where a frequency for power transmission is close to a frequency for communication, resonant circuit for communication 405b is affected by a noise from resonant circuit for power reception 405a. For this reason, it is only possible to perform communication of a limited amount of information between communication circuit 423 and resonant circuit 405b at a time point where a voltage of power to be transmitted becomes 0 V, that is, in a time slot before and after a zero cross point.

The technology of the related art described in NPL 1 is for charging a mobile device such as a smart phone, and thus, power to be transmitted is less than or equal to 5 W, and it is possible to ignore an influence of a noise. Accordingly, message sizes of 1 bite to 20 bites illustrated in FIG. 35 are set on the premise that communication of a message from mobile device 302 to base station 301 is performed in parallel with the power transmission.

However, in a case of the technology of the related art described in PTL 1, as described above, the data communication during the power transmission is performed only in a time slot in the vicinity of the zero cross point of the power to be transmitted, and it is difficult to perform communication of a packet greater than 10 bites as defined in FIG. 35.

As illustrated in FIG. 35, in a control error indicating a difference between the amount of required power and the amount of received power in the power transmission and received power indicating the amount of received power, a quantizing error of the power which is representable by 1 bite increases as the amount of fed power increases, and thus, in a case where the amount of fed power is large, it is necessary to increase the message size.

The technology of the related art described in NPL 1 is only for one directional communication to base station 301 from mobile device 302. However, in an induction heating cooking device, in general, adjusting heating power or the like is performed not on a pot side to be heated but on an operation panel on a cooking device side, and thus, communication to the power reception side from the power feeding side is also required.

In bidirectional communication, it is reasonable that the same wireless resource is used by being subjected to time division. In a case of a contactless power transmission system, the bidirectional communication is mainly performed in the vicinity of the zero cross point of the power to be transmitted, and thus, in a case where higher power is transmitted, the data communication is easily affected by the noise.

The present disclosure has been made in order to solve the problems of the related art, and an object thereof is to provide a contactless power feeder and a contactless power receiver in which it is possible to accurately perform communication having a large amount of information between the contactless power receiver and the contactless power feeder without being affected by a noise due to contactless power transmission.

In order to solve the problems of the related art, a contactless power receiver according to an aspect of the present disclosure includes a power reception unit having a contactless power reception function using electromagnetic induction; a communication unit separately transmitting a plurality of data items in a time slot in the vicinity of a zero cross point of an alternating current voltage from a commercial power supply; and a power reception side message division unit dividing a transmission message into the plurality of data items, each of the plurality of data items having a size transmittable in the time slot.

A contactless power feeder according to an aspect of the present disclosure includes a power feeding unit having a contactless power feeding function using electromagnetic induction; a communication unit separately receiving a plurality of data items in a time slot in the vicinity of a zero cross point of an alternating current voltage from a commercial power supply; and a power feeding side message combination unit generating a reception message by combining the plurality of data items, each of the plurality of data items having a size receivable in the time slot.

According to the aspects described above, it is possible to accurately perform communication having a large amount of information between the contactless power receiver and the contactless power feeder without being affected by a noise due to contactless power transmission.

BRIEF DESCRIPTION OF THE DRAWINGS

FIG. 3 is a timing chart of a signal waveform, a time slot, and a communication packet in the contactless power transmission system according to Exemplary Embodiment 1.

FIG. 11 is a timing chart of a signal waveform, a time slot, and a communication packet in the contactless power transmission system according to Exemplary Embodiment 2.

FIG. 15 is a timing chart of a signal waveform, a time slot, and a communication packet in the contactless power transmission system according to Exemplary Embodiment 3.

FIG. 24C is a diagram illustrating an example of the combination according to the presence or absence of the input display unit on the power reception side and the power feeding side.

FIG. 24D is a diagram illustrating an example of the combination according to the presence or absence of the input display unit on the power reception side and the power feeding side.

FIG. 34 is a diagram illustrating a communication header and a message size in the wireless charge system of the related art described in NPL 1.

FIG. 35 is a diagram illustrating a relationship between the communication header and a packet type and the message size in the wireless charge system of the related art described in NPL 1.

DETAILED DESCRIPTION OF THE PREFERRED EMBODIMENTS

Figure 1:
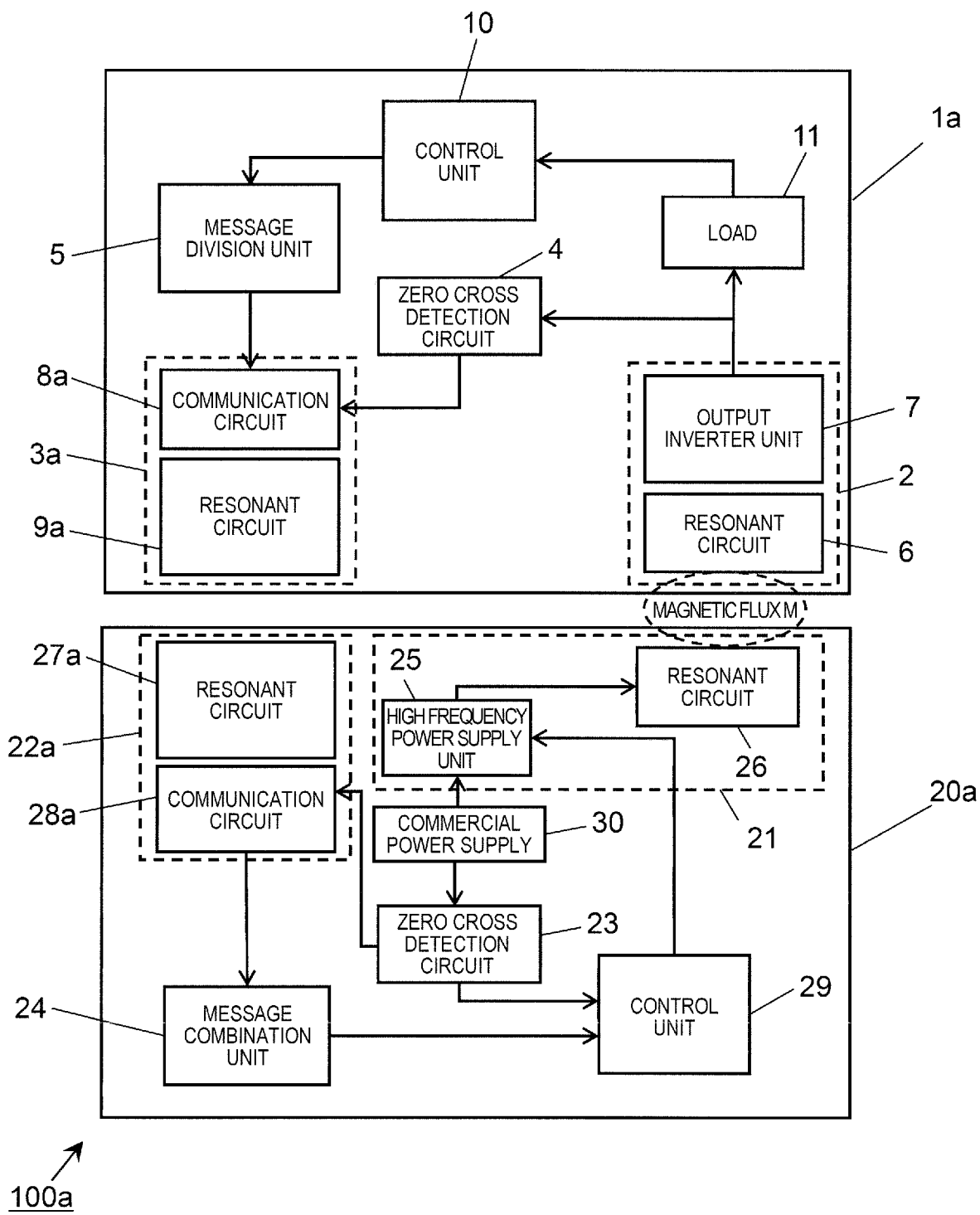
FIG. 1 is a block configuration diagram of a contactless power transmission system according to Exemplary Embodiment 1.

A contactless power receiver according to a first aspect of the present disclosure includes a power reception unit having a contactless power reception function using electromagnetic induction, a communication unit separately transmitting a plurality of data items in a time slot in the vicinity of a zero cross point of an alternating current voltage from a commercial power supply, and a power reception side message division unit dividing a transmission message into the plurality of data items, each of the plurality of data items having a size transmittable in the time slot.

In a contactless power receiver according to a second aspect of the present disclosure, a power reception side message combination unit generating a reception message by combining a plurality of data items is further included in the first aspect, and the communication unit separately receives the plurality of data items to be combined by the power reception side message combination unit, by using a plurality of time slots.

In a contactless power receiver according to a third aspect of the present disclosure, in a case in which the transmission message is a message requesting a response message, the communication unit transmits all of the plurality of data items, and then, receives the response message in a subsequent time slot, in the first aspect.

In a contactless power receiver according to a fourth aspect of the present disclosure, the communication unit is a power reception communication unit having the contactless power reception function and transmitting the transmission message by performing load modulation with respect to high frequency power which is subjected to contactless transmission according to the transmission message, in the first aspect.

In a contactless power receiver according to a fifth aspect of the present disclosure, the communication unit is a power reception communication unit having the contactless power reception function and receiving the reception message superimposed on high frequency power which is subjected to contactless transmission by load modulation, in the second aspect or the third aspect.

A contactless power receiver according to a sixth aspect of the present disclosure includes a power reception unit having a contactless power reception function using electromagnetic induction, and a communication unit, in a case in which a transmission message requesting a response message is transmitted in a time slot in the vicinity of a zero cross point of an alternating current voltage from a commercial power supply, the communication unit receiving the response message in a subsequent time slot.

A contactless power receiver according to a seventh aspect of the present disclosure includes a power reception unit having a contactless power reception function using electromagnetic induction, a communication unit performing communication of a message in a time slot in the vicinity of a zero cross point of an alternating current voltage from a commercial power supply, and a control unit allocating the time slot to any one of transmission of a power control message, transmission of other messages, and reception of a reception message according to time slot allocation.

In a contactless power receiver according to an eighth aspect of the present disclosure, the control unit changes the time slot allocation according to a load, in the seventh aspect.

A contactless power feeder according to a ninth aspect of the present disclosure includes a power feeding unit having a contactless power feeding function using electromagnetic induction, a communication unit separately receiving a plurality of data items in a time slot in the vicinity of a zero cross point of an alternating current voltage from a commercial power supply, and a power feeding side message combination unit generating a reception message by combining the plurality of data items, each of the plurality of data items having a size receivable in the time slot.

In a contactless power feeder according to a tenth aspect of the present disclosure, a power feeding side message division unit dividing a transmission message into a plurality of data items is further included in the ninth aspect, and the communication unit separately transmits the plurality of data items divided by the power feeding side message division unit, by using a plurality of time slots.

In a contactless power feeder according to an eleventh aspect of the present disclosure, in a case in which the reception message is a message requesting a response message, the communication unit receives all of the plurality of data items, and then, transmits the response message in a subsequent time slot, in the ninth aspect.

In a contactless power feeder according to a twelfth aspect of the present disclosure, the communication unit is a power feeding communication unit having the contactless power feeding function and receiving the reception message superimposed on high frequency power which is subjected to contactless transmission by load modulation, in the ninth aspect.

In a contactless power feeder according to a thirteenth aspect of the present disclosure, the communication unit is a power feeding communication unit having the contactless power feeding function and transmitting the transmission message by performing load modulation with respect to high frequency power which is subjected to contactless transmission according to the transmission message, in the tenth aspect or the eleventh aspect.

A contactless power feeder according to a fourteenth aspect of the present disclosure includes a power feeding unit having a contactless power feeding function using electromagnetic induction, and a communication unit, in a case in which a reception message requesting a response message is received in a time slot in the vicinity of a zero cross point of an alternating current voltage from a commercial power supply, the communication unit transmitting the response message in a subsequent time slot.

A contactless power feeder according to a fifteenth aspect of the present disclosure includes a power feeding unit having a contactless power feeding function using electromagnetic induction, a communication unit performing communication of a message in a time slot in the vicinity of a zero cross point of an alternating current voltage from a commercial power supply, and a control unit allocating the time slot to any one of transmission of a power control message, transmission of other messages, and reception of a reception message according to time slot allocation.

In a contactless power feeder according to a sixteenth aspect of the present disclosure, the control unit changes the time slot allocation according to a load, in the fifteenth aspect.

A contactless power transmission system according to a seventeenth aspect of the present disclosure includes the contactless power receiver according to the first aspect, and the contactless power feeder according to the ninth aspect.

Hereinafter, exemplary embodiments of the present disclosure will be described with reference to the drawings. Furthermore, the present disclosure is not limited by the exemplary embodiments.

Exemplary Embodiment 1

Figure 2A:
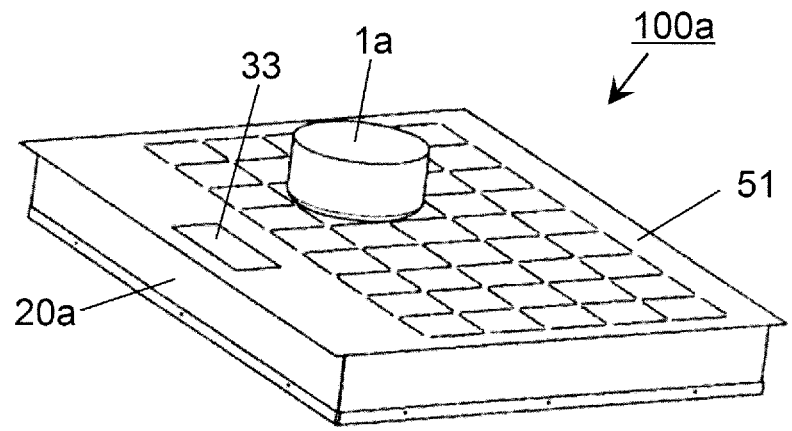
FIG. 2A is an external perspective view of the contactless power transmission system according to Exemplary Embodiment 1.
Figure 2B:
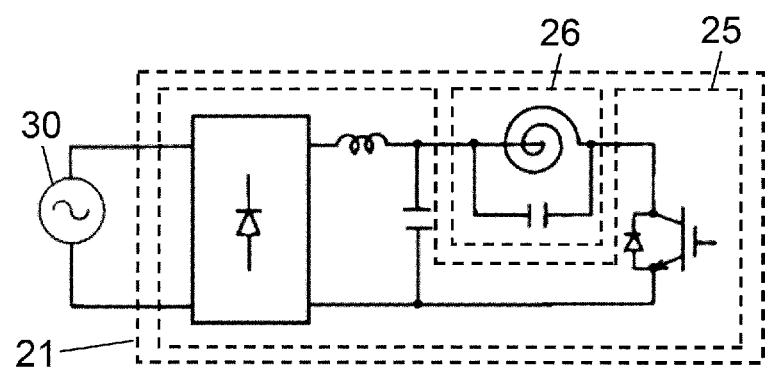
FIG. 2B is a block diagram illustrating an example of a circuit configuration of a contactless power feeder according to Exemplary Embodiment 1.

FIG. 1 is a block configuration diagram of contactless power transmission system 100a according to Exemplary Embodiment 1 of the present disclosure. FIG. 2A is a perspective view illustrating an appearance of contactless power feeder 20a according to this exemplary embodiment. FIG. 2B is a block configuration diagram illustrating a circuit configuration for driving each dielectric heating coil disposed in contactless power feeder 20a according to this exemplary embodiment.

In FIG. 1, contactless power receiver 1a, for example, is a juicer, a blender, or a jar pot. Load 11, for example, is a motor used for a juicer and a blender, or a heater used for a jar pot.

A power feeder embedded in a counter top of a kitchen, and a power feeder which is used as an induction heating cooking device are assumed as contactless power feeder 20a. Contactless power receiver 1a is independent from contactless power feeder 20a, and is used by being mounted on contactless power feeder 20a.

In this exemplary embodiment, contactless power feeder 20a is an induction heating cooking device in which a plurality of dielectric heating coils (not illustrated) are arranged on the lower side of top panel 51 in the shape of a matrix, and a pot or the like can be subjected to dielectric heating in an arbitrary position on top panel 51.

In a case where the pot or the like is mounted on top panel 51, and input display unit 33 is operated, the induction heating cooking device, which is contactless power feeder 20a, operates the dielectric heating coils arranged on the lower side of the position where the pot is mounted, and performs induction heating with respect to the pot.

As illustrated in FIG. 2A, in a case where contactless power receiver 1a is mounted on top panel 51, the induction heating cooking device, which is contactless power feeder 20a, feeds power to contactless power receiver 1a by using a change in magnetic flux M generated by a high frequency current flowing through the dielectric heating coil. In this case, the dielectric heating coil functions as a power feeding coil.

Returning to FIG. 1, in contactless power feeder 20a, power feeding unit 21 includes high frequency power supply unit 25 and resonant circuit 26 as illustrated in FIG. 2B.

High frequency power supply unit 25 includes a rectification circuit and an inverter circuit, and converts commercial power supply 30 into high frequency power of several dozen kHz to several hundred kHz. Resonant circuit 26 includes a resonance capacitor and a power feeding coil, and generates magnetic field M in a case where the high frequency power is fed from high frequency power supply unit 25.

Control unit 29 configured of a microprocessor controls high frequency power supply unit 25, and changes magnetic flux M which is generated by resonant circuit 26.

In contactless power receiver 1a, power reception unit 2 includes resonant circuit 6 and output inverter unit 7. Resonant circuit 6 includes a power reception coil and a resonance capacitor. Output inverter unit 7 includes a rectification circuit and an inverter circuit.

Communication unit 3a of contactless power receiver 1a includes communication circuit 8a and resonant circuit 9a, and communication unit 22a of contactless power feeder 20a includes resonant circuit 27a and communication circuit 28a. Each of resonant circuits 9a and 27a includes a coil for communication.

Figure 2C:
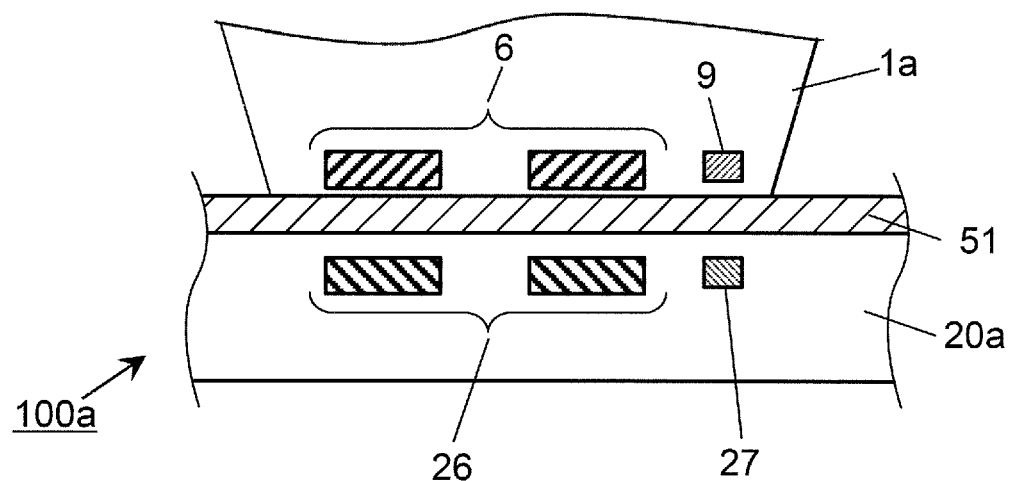
FIG. 2C is a schematic sectional view of the contactless power transmission system according to Exemplary Embodiment 1 in a case where a contactless power receiver is mounted on the contactless power feeder.

FIG. 2C is a schematic sectional view of contactless power transmission system 100a in a case where contactless power receiver 1a is mounted on contactless power feeder 20a.

As illustrated in FIG. 2C, each of the coils for communication of resonant circuits 9a and 27a is disposed on the outside of a power reception coil of resonant circuit 6 and a power feeding coil of resonant circuit 26 which are wound into the shape of a doughnut.

Furthermore, the coils for communication of resonant circuits 9a and 27a may be concentrically wound along the inner circumference or the outer circumference of the power feeding coil and the power reception coil. Optical communication using LED or the like can also be applied to a communication method of communication unit 3a and communication unit 22a.

In a case where contactless power receiver 1a is mounted on contactless power feeder 20a, the power reception coil of resonant circuit 6 is disposed in proximity to the upper side of the power feeding coil of resonant circuit 26, and resonant circuit 9a is also disposed in proximity to the upper side of portion resonant circuit 27a.

In this state, output inverter unit 7 converts the high frequency power from resonant circuit 6 into alternating current power having a frequency identical to that of commercial power supply 30. The alternating current power which is transmitted to power reception unit 2 from power feeding unit 21 is fed to load 11.

In contactless power receiver 1a, control unit 10 configured of a microprocessor monitors the power to be fed to load 11, and outputs an error between power which is required for activating load 11 and power which is actually fed to message division unit 5 as a transmission message.

Message division unit 5 divides a message (for example, a message of 2 bites) into a plurality of data items (for example, two data items of 1 bite) according to an instruction from control unit 10. Communication circuit 8a modulates the plurality of data items which are divided or a transmission message which is not divided. Communication unit 3a transmits a signal which is modulated through resonant circuit 9a according to electromagnetic induction.

In contactless power feeder 20a, communication unit 22a receives the transmitted signal through resonant circuit 27a close to resonant circuit 9a according to electromagnetic induction. Communication circuit 28a demodulates the received signal. Message combination unit 24 combines the plurality of data items which are demodulated (for example, the two data items of 1 bite) according to an instruction from control unit 29, and outputs a reception message (for example, a message of 2 bites).

Control unit 29 controls high frequency power supply unit 25 according to the reception message, and adjusts power to be transmitted to power which is required for activating load 11.

As illustrated in FIG. 2C, the coils for communication of resonant circuits 9a and 27a are disposed in proximity to the power feeding coil and the power reception coil, and thus, there is a possibility that a noise due to magnetic flux M for power transmission allows an error to occur in communication. Even in a case of optical communication, there is a possibility that peripheral circuits of a light emitting element and a light receiving element are affected by the noise of magnetic flux M.

In this exemplary embodiment, in order to reduce the influence of the noise, communication is performed in time slot before and after a time point where an alternating current voltage from commercial power supply 30 becomes 0 V, that is, in the vicinity of a zero cross point. For this reason, contactless power receiver 1a and contactless power feeder 20a include zero cross detection circuits 4 and 23, respectively.

Zero cross detection circuit 23 detects the zero cross point where the alternating current voltage from commercial power supply 30 becomes 0 V, and outputs a timing signal providing the timing of the zero cross point to communication circuit 28a and control unit 29. Zero cross detection circuit 4 detects a zero cross point where an alternating current voltage which is subjected to power transmission becomes 0 V, and outputs a timing signal providing the timing of the zero cross point to communication circuit 8a.

FIG. 3 is a diagram illustrating an example of a timing chart of each signal and a format of a communication packet in contactless power transmission system 100a. In FIG. 3, waveform (a) indicates an alternating current voltage waveform from commercial power supply 30, waveform (b) indicates an output waveform from high frequency power supply unit 25, and waveform (c) indicates the output of zero cross detection circuits 4 and 23.

As illustrated by waveform (d) in FIG. 3, control unit 29 recognizes the timing of a time interval (hereinafter, referred to as a time slot) where communication of a communication packet having a minimum length can be performed, on the basis of the timing signal output from zero cross detection circuit 23. In the time slot, control unit 29 controls high frequency power supply unit 25 such that power transmission stops. Only in a case where power to be fed which has higher than or equal to a certain level, and the communication is not able to be performed in parallel with the power transmission due to the influence of the noise, the power transmission stops.

Communication circuit 8a recognizes the timing of the time slot on the basis of the timing signal output from zero cross detection circuit 4, and transmits a message through resonant circuit 9a in the time slot.

In a lower portion of FIG. 3, an example of the format of the communication packet is illustrated. The packet format is identical to that described in NPL 1. That is, a packet format of this exemplary embodiment includes a preamble of 12 bits for synchronism, a header of 8 bits indicating the type of packet, and a checksum of 8 bits for detecting a communication error.

Hereinafter, one time slot will be described as a period having a length in which communication of a message of 1 bite can be narrowly performed along with the preamble, the header, and the checksum described above.

As illustrated by waveform (d) in FIG. 3, in a case where the transmission message is a message of 2 bites, control unit 10 controls message division unit 5 which is a power reception side message division unit, and generates two packets by dividing the message. Communication unit 3a transmits the two packets one by one in sequence by using two time slots.

In the example illustrated in FIG. 3, the header and the checksum are added to each of the divided messages, and thus, overhead increases. Instead, a transmission error of one packet does not affect the reception of the other packet, and thus, resistance with respect to the transmission error is improved.

The header is used for designating a data length along with a message class. A fact that the transmitted message is a message of 2 bites can be imparted to a reception side by using the header. For example, the following method is considered as such a method.

First, as illustrated by waveform (d) in FIG. 3, the header indicating that the transmitted message is the message of 2 bites (for example, the amount of fed power) is defined. In this method, the header is added to each of two packets respectively including two messages of 1 bite which are divided from the message of 2 bites.

Figure 4:
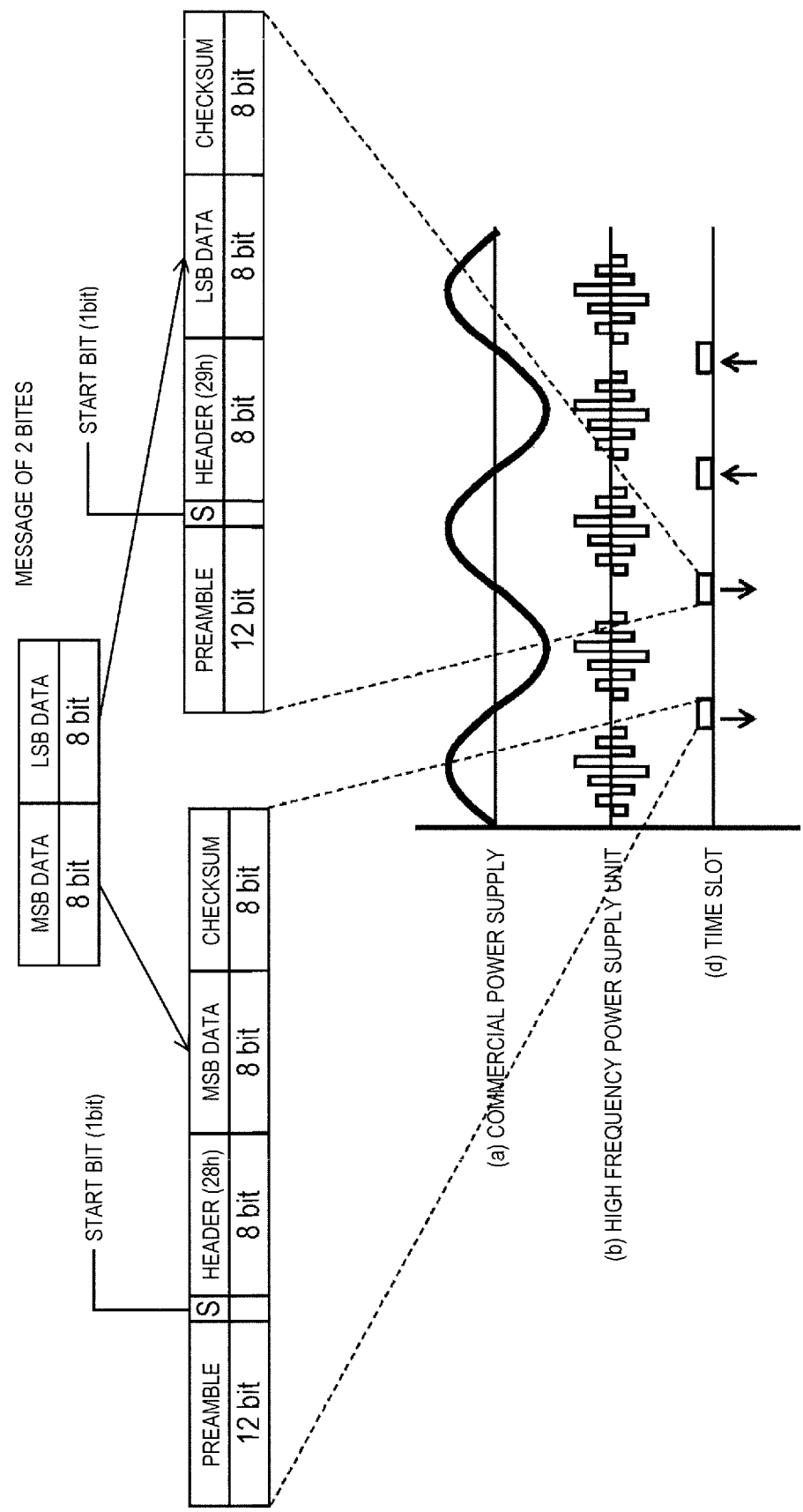
FIG. 4 is a timing chart of a signal waveform, a time slot, and a communication packet in the contactless power transmission system according to Exemplary Embodiment 1.

Second, as illustrated in FIG. 4, two different headers (for example, 28h and 29h) indicating that the transmitted message is the message of 2 bites are defined. In this method, two packets respectively including the two messages of 1 bite divided into data of 1 bite on an MSB side (hereinafter, referred to as MSB data) and data of 1 bite on an LSB side (hereinafter, referred to as LSB data) are configured. The corresponding headers are respectively added to the packets. According to this method, it is possible to further increase the resistance with respect to the transmission error.

Figure 5A:
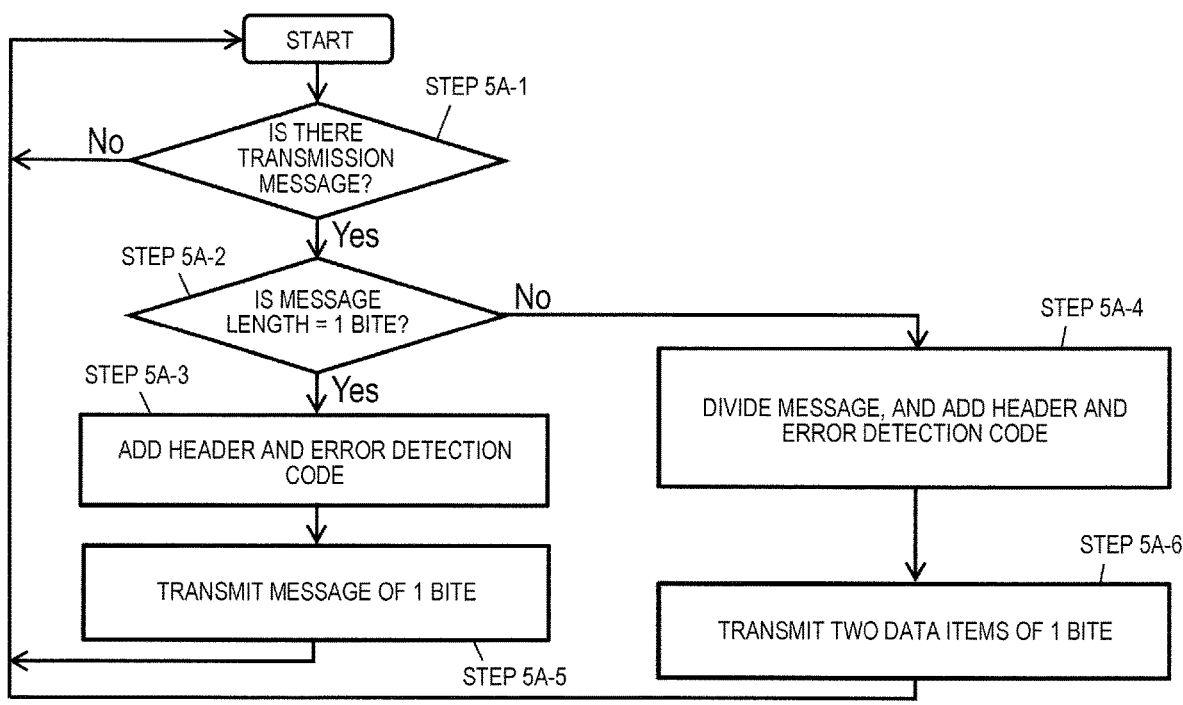
FIG. 5A is a flowchart illustrating a transmission process in the contactless power receiver according to Exemplary Embodiment 1.

FIG. 5A is a flowchart illustrating a transmission process of control unit 10 for a divided packet in contactless power receiver 1a.

As illustrated in FIG. 5A, in Step 5A-1, the presence or absence of the transmission message is determined. The processing of Step 5A-1 is repeated until it is determined that the transmission message is present, and in a case where it is determined that the transmission message is present, the process proceeds to Step 5A-2.

In Step 5A-2, it is determined whether the length of the transmission message is 1 bite or 2 bites. In a case where the transmission message is 1 bite, the process proceeds to Step 5A-3. In Step 5A-3, a header corresponding to the message and an error detection code are added to the packet. In Step 5A-5, the message of 1 bite is transmitted in one time slot.

In a case where the transmission message is 2 bites, the process proceeds to Step 5A-4. In Step 5A-4, the transmission message is divided to the MSB data and the LSB data, and the header and the error detection code are added to the MSB data and the LSB data. In Step 6, the two data items of 1 bite are transmitted one by one in sequence by using two time slots.

Figure 5B:
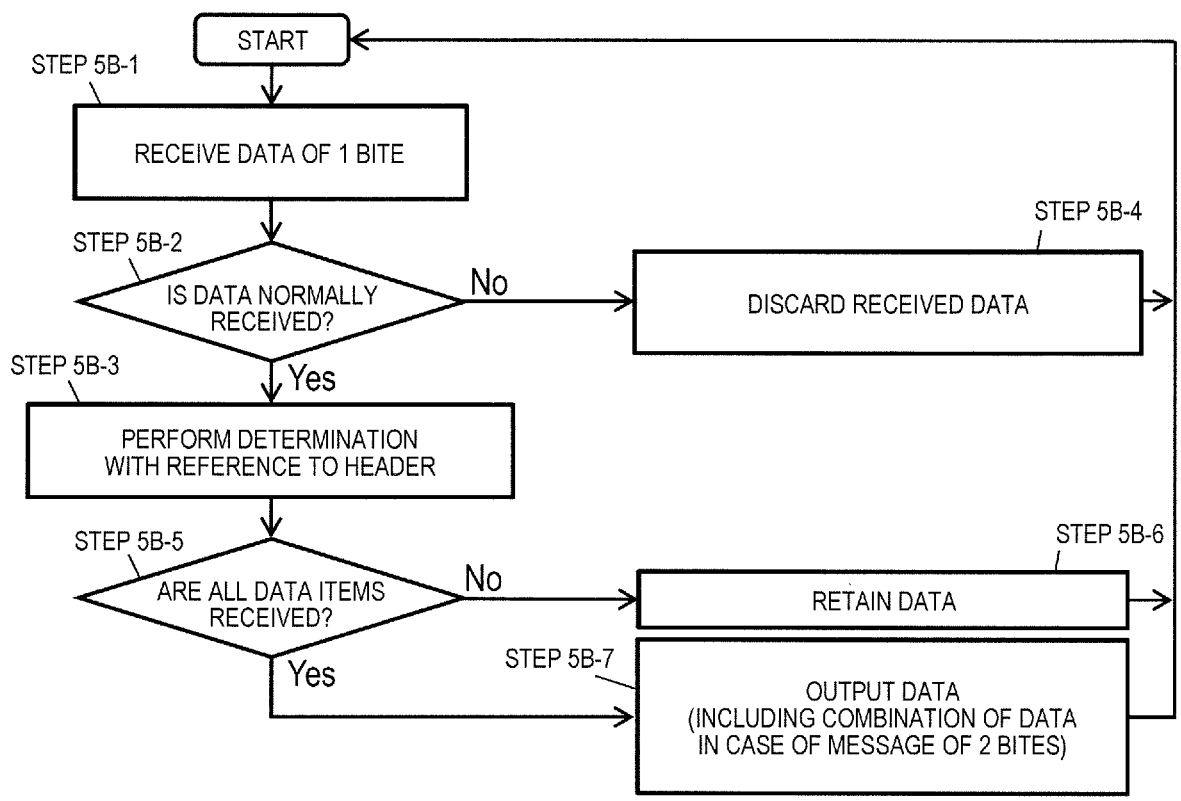
FIG. 5B is a flowchart illustrating reception process in the contactless power feeder according to Exemplary Embodiment 1.

FIG. 5B is a flowchart illustrating a reception process of control unit 29 for a divided packet in contactless power feeder 20a.

As illustrated in FIG. 5B, in Step 5B-1, data of 1 bite is received. In Step 5B-2, it is determined whether or not the data of 1 bite is normally received by the error detection code. In a case where the data of 1 bite is normally received, the process proceeds to Step 5B-3.

In Step 5B-3, it is determined whether the received data is a message of 1 bite, or any one of the MSB data and the LSB data which are messages of 2 bites, with reference to the header.

In a case where the received data is the message of 1 bite, the process proceeds to Step 5B-7, and the reception of the message of 1 bite is completed. In a case where the received data is the MSB data which is the message of 2 bites, the process proceeds to Step 5B-6. In Step 5B-6, the data is retained, and the process proceeds to reception processing of the LSB data.

In a case where the LSB data is received in the next time slot, the process proceeds to Step 5B-7. In Step 5B-7, the received LSB data is combined with the retained MSB data, and the reception of the message of 2 bites is completed.

In the combination process of the divided message as described above, even though the MSB data is unreceived, the received data is discarded in a case where the LSB data is received. In a case where the LSB data is not received subsequently to the reception of the MSB data, both of the received data and the data which is received in the previous time slot are discarded (Step 5B-4).

Figure 6:
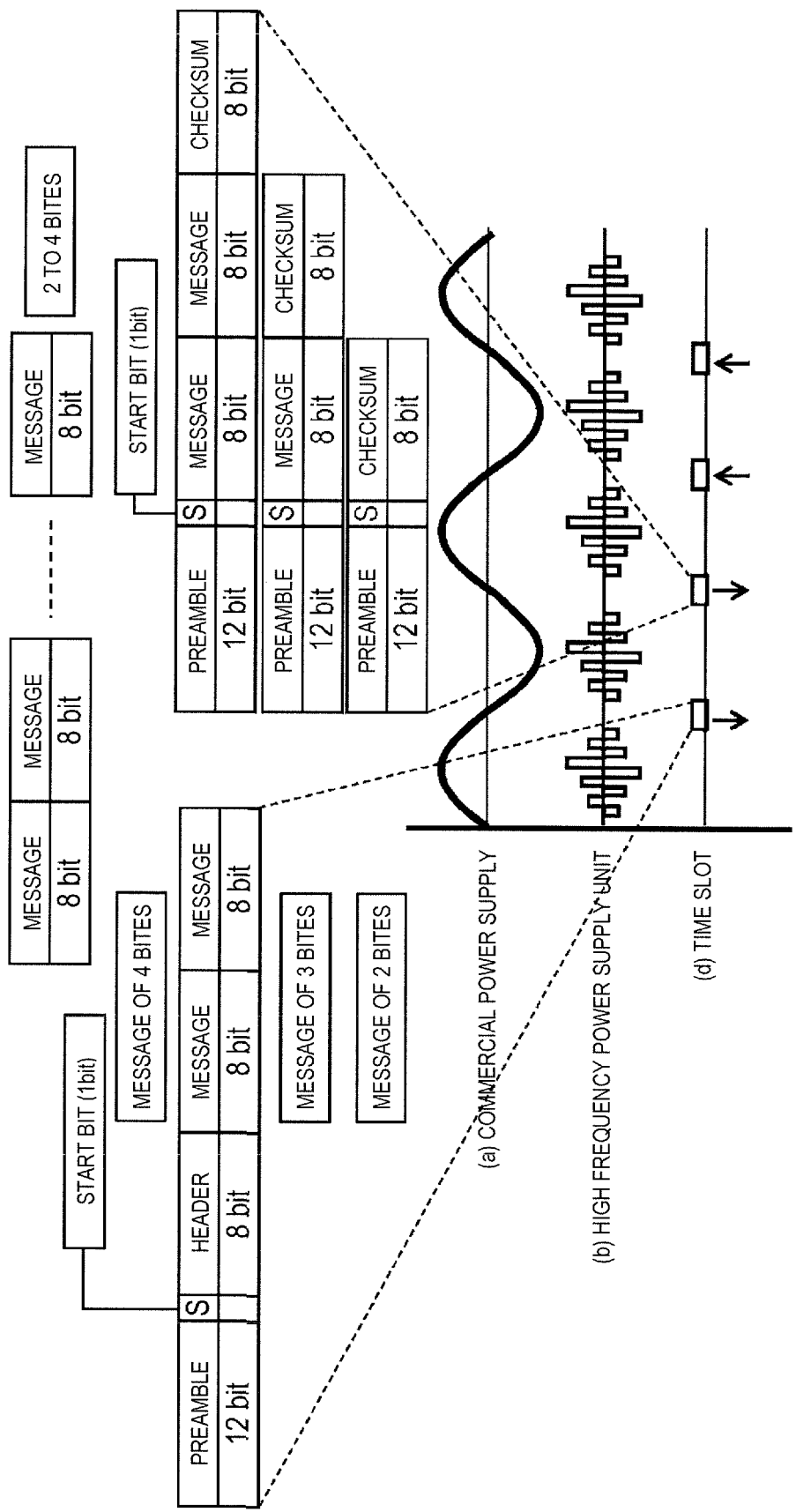
FIG. 6 is a timing chart of a signal waveform, a time slot, and a communication packet in the contactless power transmission system according to Exemplary Embodiment 1.

In a case of an environment in which the transmission error is less likely to occur, as illustrated in FIG. 6, the header and the checksum are added to the message before being divided, and then, the data is divided into the number which fits into one time slot. The preamble is added to each data after being divided, and two packets are configured.

In a case where transmission is performed in two time slots according to the timing signal obtained from zero cross detection circuit 4, it is possible to efficiently transmit 2 to 4 messages in two time slots. As illustrated in FIG. 6, a start bit of 1 bit is further added such that it is possible to more easily recognize that the next bit is at the beginning of the header or the message.

Furthermore, it is also possible to apply this division communication method to a longer message. For example, it is also possible to divide a message of 5 bites to 7 bites into three messages, and to transmit the three messages by using three time slots. In a case of a message having a length longer than or equal to the length described above, a time slot may be used in which data which is divided every 3 bites is transmitted.

In addition, in this exemplary embodiment, one time slot is defined as a period having a length in which the communication of the message of 1 bite can be narrowly performed, but the present disclosure is not limited thereto. In a case where a faster communication method is used, a message length which can be subjected to communication in one time slot increases. For example, in a case where data of 2 bites can be subjected to communication in one time slot, the same effect can be obtained in a case where a message is divided every 2 bites.

In contactless power feeder 20a, the preamble is detected, and thus, two communication packets are received. In order to further reduce malfunction due to the noise, the preamble may be detected only in a time slot where the timing signal from zero cross detection circuit 23 is received.

Message combination unit 24 which is a power feeding side message combination unit combines data items included in the communication packets which are received in two time slots, and generates one message. Control unit 29 receives the combined message. Various control commands defined in NPL 1, and a message having a proprietary specification for being used in control or an operation which is uniquely defined by a manufacturer are assumed as a message to be subjected to communication.

In a case of a division communication method illustrated by waveform (d) in FIG. 3, error detection of the header and the message which are received in each time slot is performed, and then, the message is taken out. On the other hand, in a case of a division communication method illustrated in FIG. 6, the header, the message, and the checksum which are received in each time slot are connected to each other, and then, the error detection may be performed once. According to the division communication method illustrated in FIG. 6, it is also possible to realize efficiency of processing.

Figure 7:
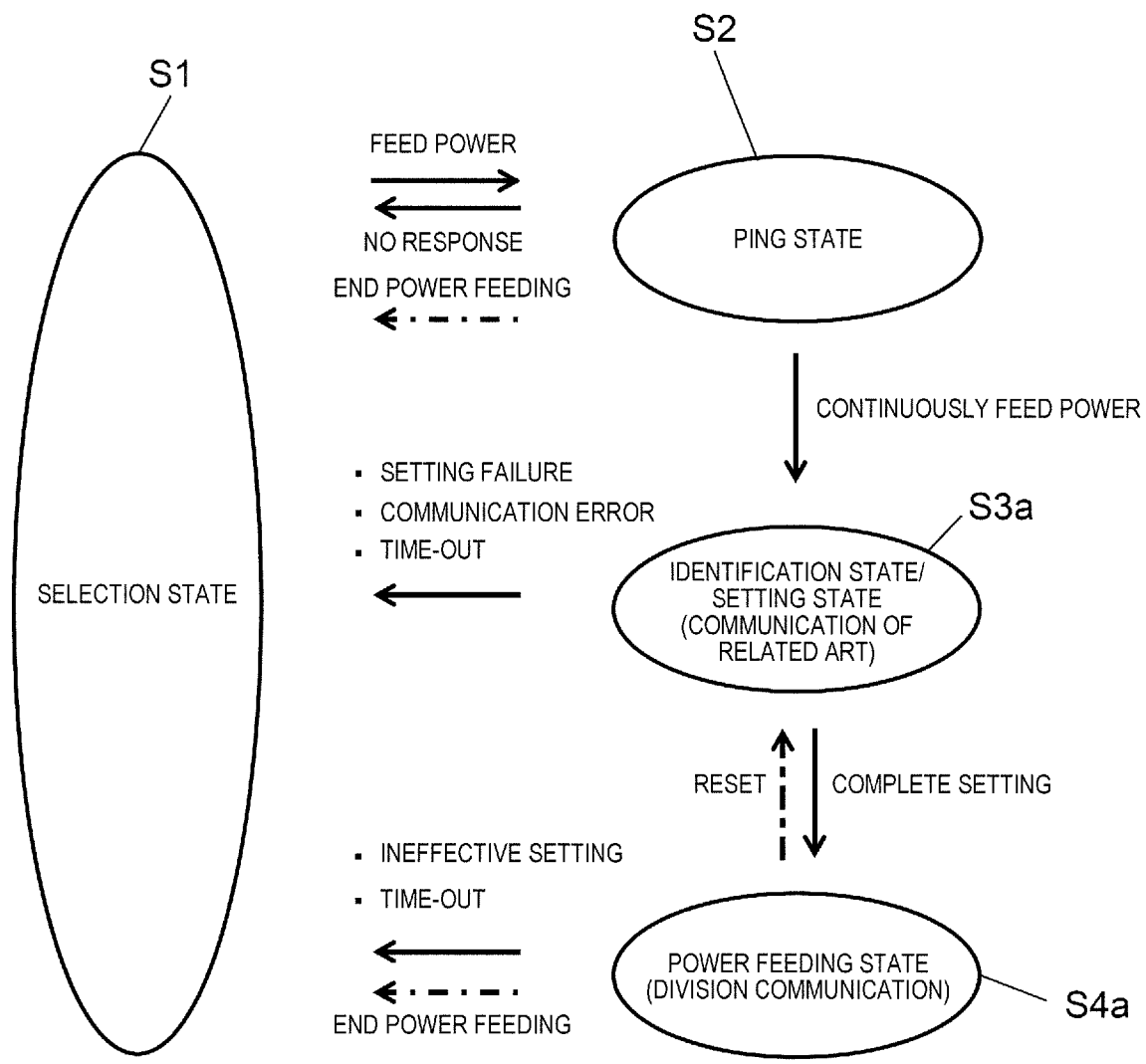
FIG. 7 is a state transition diagram of contactless power transmission systems according to Exemplary Embodiments 1 to 4.
Figure 32:
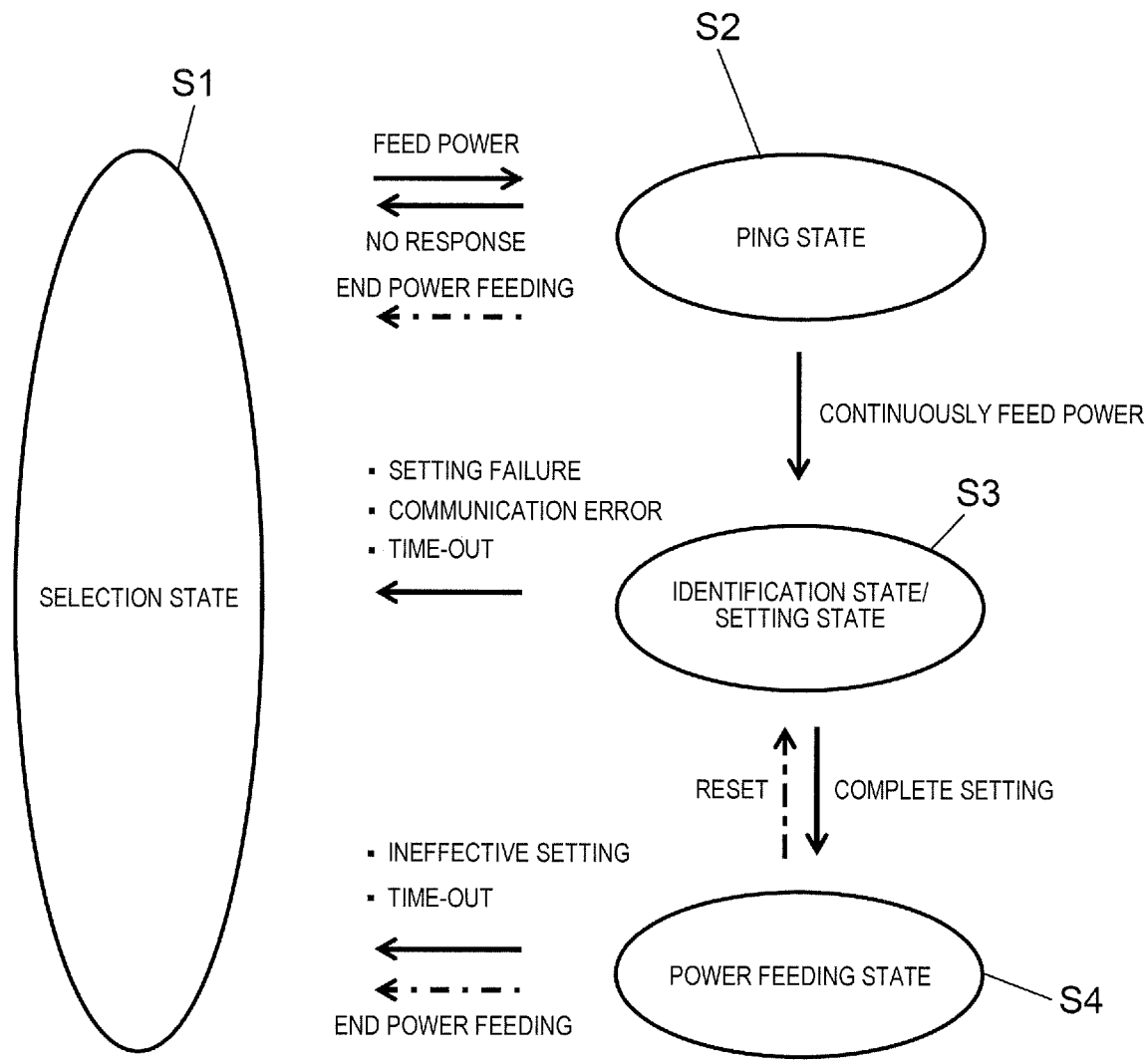
FIG. 32 is a state transition diagram of the wireless charge system of the related art described in NPL 1.
Figure 33:
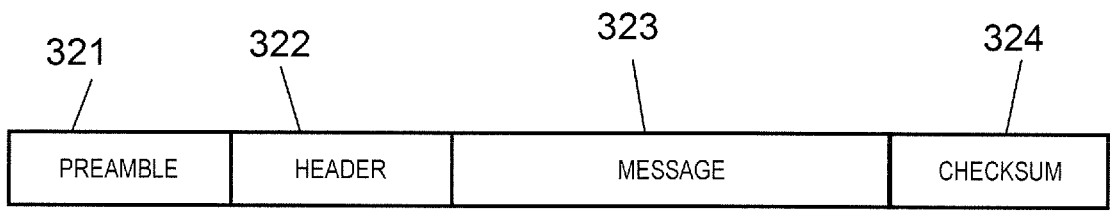
FIG. 33 is a diagram illustrating a format of a communication packet in the wireless charge system of the related art described in NPL 1.

FIG. 7 is a state transition diagram of contactless power transmission system 100a. The state transition illustrated in FIG. 7 is basically identical to that of FIG. 32, but is different in that a change is added to the specification defined in NPL 1 in order to be applied to transmission of higher power.

That is, as illustrated in FIG. 7, in this exemplary embodiment, the division communication method described above is used only in power feeding state S4a, and in a case where the influence of the noise due to the power transmission is small, communication of the related art which is not accompanied by the division communication method described above is performed in identification state/setting state S3a.

Furthermore, in FIG. 2B, one voltage-resonance type inverter is illustrated as an inverter disposed in high frequency power supply unit 25, but the present disclosure is not limited thereto. For example, an SEPP inverter including greater than or equal to two switching elements or a full bridge inverter can also be applied.

In addition, in the division communication method illustrated by waveform (d) in FIG. 3, two headers defined as indicating the number of bites of the data in the first half of divided message and the number of bites of the data in the last half of the divided message may be added to the packets, respectively. In Step 5A-4 of the flowchart illustrated in FIG. 5A, a header with m and n which indicates that t-th data of an n-divided message of m bites is included may be added to the packet.

Modification Example of Exemplary Embodiment 1

Figure 8:
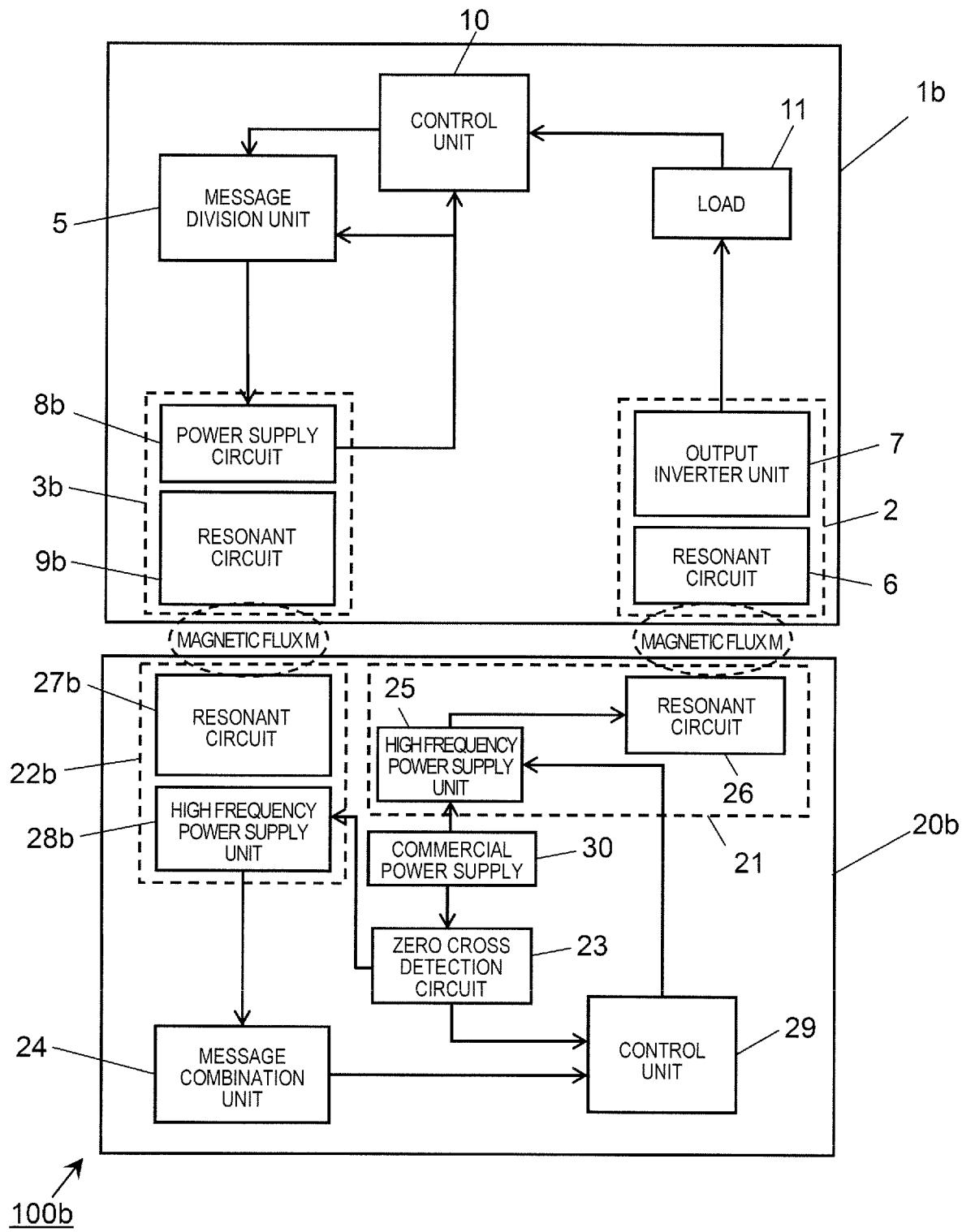
FIG. 8 is a block configuration diagram of a contactless power transmission system according to a modification example of Exemplary Embodiment 1.

FIG. 8 is a block configuration diagram of contactless power transmission system 100b according to a modification example of Exemplary Embodiment 1. In the drawings for illustrating this modification example, the same reference numerals are applied to the identical or corresponding portions to those of the drawings described above, and the detailed description thereof will be omitted.

As illustrated in FIG. 8, contactless power transmission system 100b is different from contactless power transmission system 100a illustrated in FIG. 1 in the following points. Contactless power receiver 1b does not include zero cross detection circuit 4, but includes power reception communication unit 3b instead of communication unit 3a. Contactless power feeder 20b includes power feeding communication unit 22b instead of communication unit 22a.

Power reception communication unit 3b includes resonant circuit 9b including a power reception coil, and power supply circuit 8b. Power feeding communication unit 22b includes resonant circuit 27b including a power feeding coil, and high frequency power supply unit 28b.

The power reception coil of resonant circuit 9b may be concentrically wound along the inner circumference or the outer circumference of the power reception coil of resonant circuit 6 which is wound into the shape of a doughnut. Similarly, the power feeding coil of resonant circuit 27b may be concentrically wound along the inner circumference or the outer circumference of the power feeding coil of resonant circuit 26 which is wound into the shape of a doughnut.

In a case where contactless power receiver 1b is mounted on contactless power feeder 20b, the power reception coil of resonant circuit 6 is disposed in proximity to the upper side of the power feeding coil of resonant circuit 26, and resonant circuit 9b is also disposed in proximity to the upper side of resonant circuit 27b.

In this state, power feeding communication unit 22b feeds high frequency power to power reception communication unit 3b of contactless power receiver 1b which is close to power feeding communication unit 22b over the contactless. As illustrated in FIG. 8, zero cross detection circuit 23 feeds a timing signal providing the timing of the zero cross point of the of the alternating current voltage from commercial power supply 30 to high frequency power supply unit 28b. High frequency power supply unit 28b generates magnetic flux M through resonant circuit 27b in the vicinity of the zero cross point according to the timing signal.

Power reception communication unit 3b includes resonant circuit 9b including the power reception coil, and power supply circuit 8b. Power supply circuit 8b converts a change in magnetic flux M from resonant circuit 27b into alternating current power by using resonant circuit 9b, and feeds the alternating current power to control unit 10.

Thus, power feeding communication unit 22b has a contactless power feeding function using electromagnetic induction to power reception communication unit 3b, and power reception communication unit 3b has a contactless power reception function using electromagnetic induction from power feeding communication unit 22b.

In concurrence with the power transmission described above, power supply circuit 8b performs load modulation with respect to power to be transmitted over the contactless according to a transmission message output from control unit 10, and thus, transmits the transmission message to the power feeding side from the power reception side by superimposing the transmission message on the power to be transmitted.

High frequency power supply unit 28b demodulates a signal superimposed on the power to be transmitted, and feeds a reception message to control unit 29. Thus, communication is performed between power reception communication unit 3b and power feeding communication unit 22b only in the vicinity of the zero cross point of the alternating current voltage from commercial power supply 30.

Figure 9:
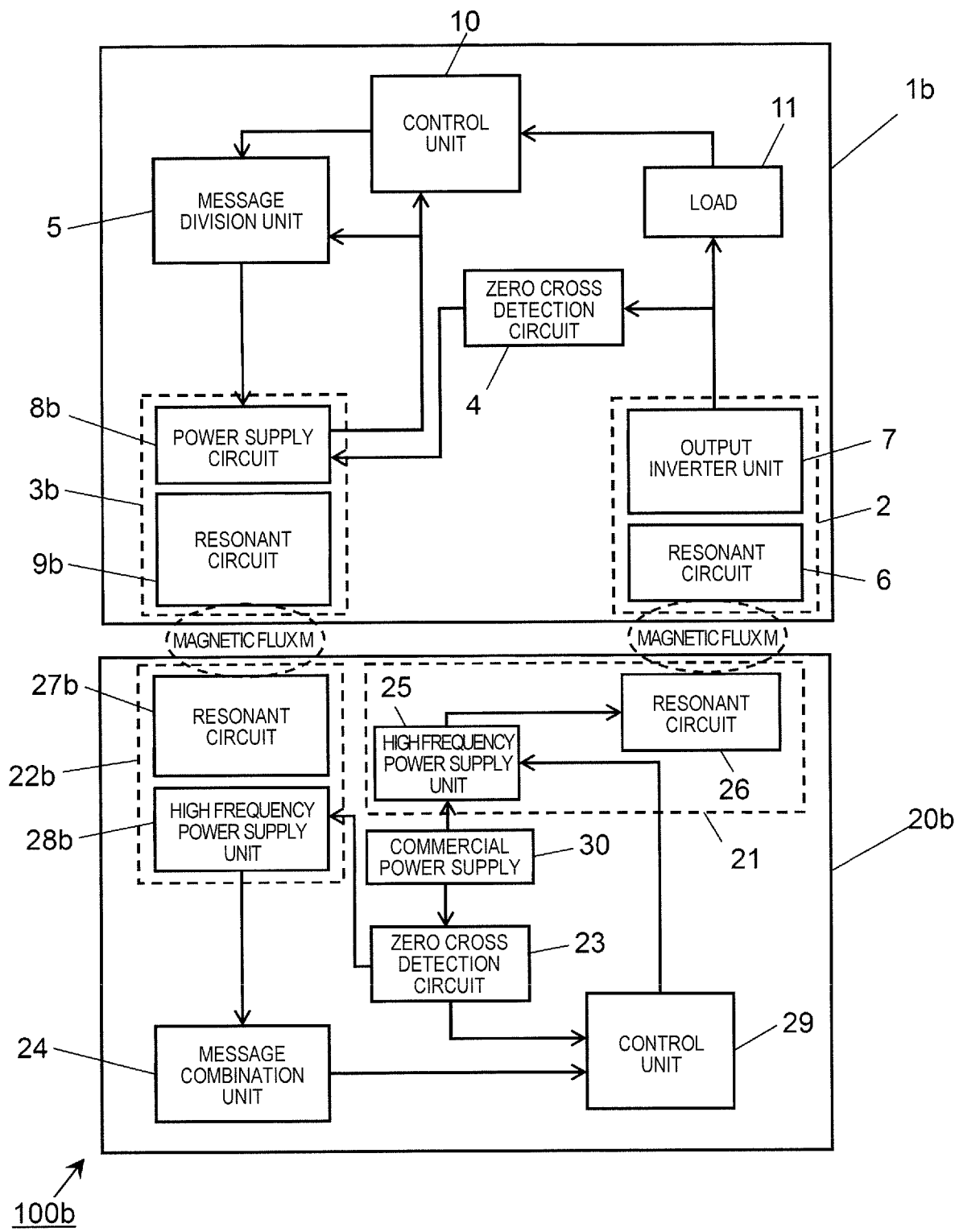
FIG. 9 is a block configuration diagram of a contactless power transmission system according to another modification example of Exemplary Embodiment 1.

In a case where a frequency used for the power transmission is close to a frequency used for the communication, or in a case where there is a possibility that jamming occurs in the communication due to the power transmission having high power, a modification example illustrated in FIG. 9 is effective. FIG. 9 is a block configuration diagram of contactless power transmission system 100b according to another modification example of Exemplary Embodiment 1.

As illustrated in FIG. 9, contactless power receiver 1b is identical to contactless power receiver 1a illustrated in FIG. 1, and includes zero cross detection circuit 4. Power supply circuit 8b of power reception communication unit 3b performs communication of a message only in the vicinity of the zero cross point according to the timing signal from zero cross detection circuit 4. Accordingly, it is possible to further suppress the influence of the noise due to the contactless power transmission.

Exemplary Embodiment 2

Figure 10:
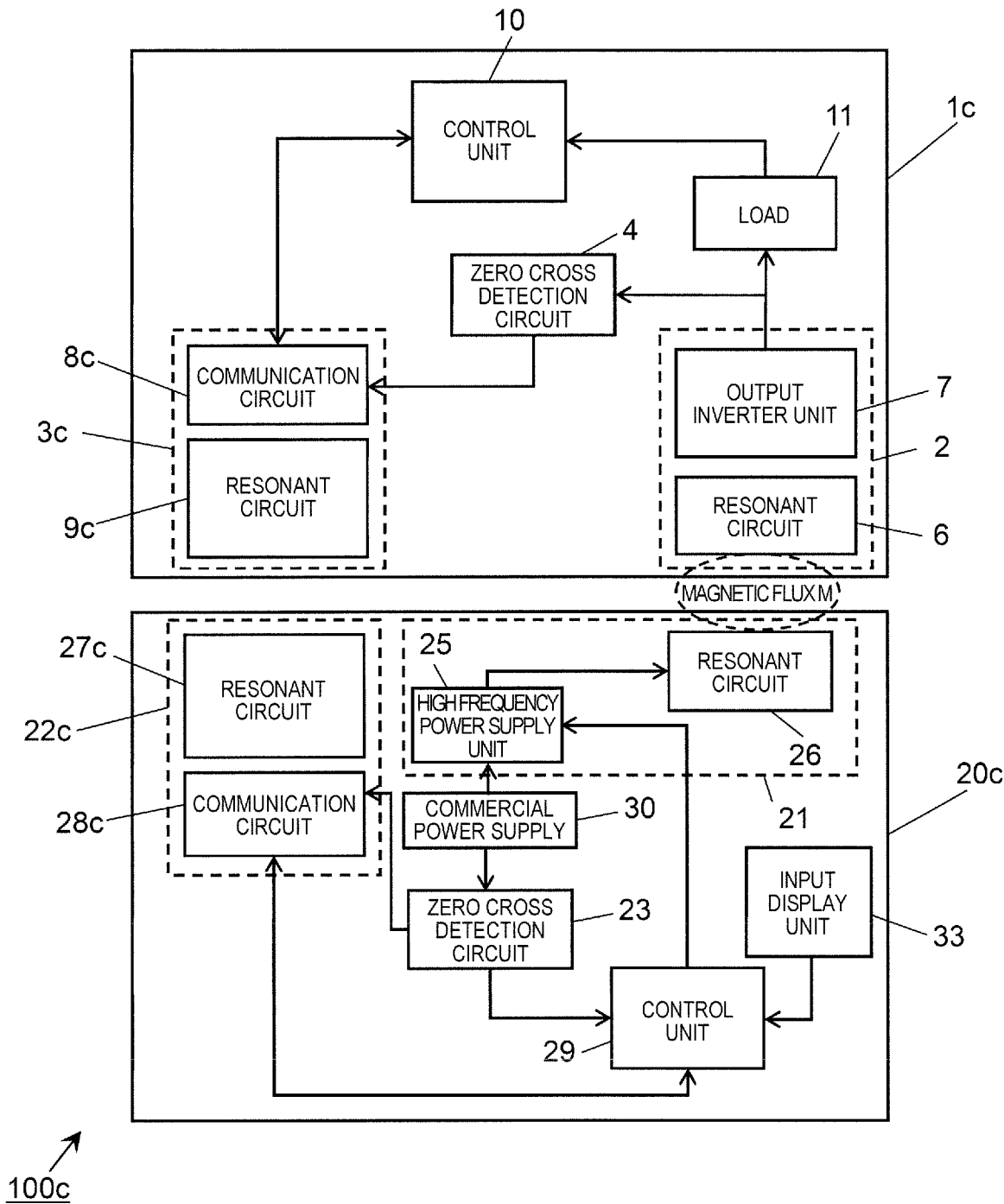
FIG. 10 is a block configuration diagram of a contactless power transmission system according to Exemplary Embodiment 2.

FIG. 10 is a block configuration diagram of contactless power transmission system 100c according to Exemplary Embodiment 2 of the present disclosure. FIG. 11 is a diagram illustrating an example of a timing chart of each signal and a format of a communication packet in contactless power transmission system 100c. In the drawings for illustrating this exemplary embodiment, the same reference numerals are applied to the identical or corresponding portions to those of the drawings described above, and the detailed description thereof will be omitted.

As illustrated in FIG. 10, contactless power transmission system 100c is different from contactless power transmission system 100a illustrated in FIG. 1 in the following points.

Contactless power receiver 1c does not include message division unit 5, but includes communication unit 3c including communication circuit 8c and resonant circuit 9c instead of communication unit 3a. Contactless power feeder 20c does not include message combination unit 24, but includes communication unit 22c including resonant circuit 27c and communication circuit 28c.

Bidirectional communication of a message using electromagnetic induction is performed between communication unit 3c and communication unit 22c, as with transmission of a message to communication unit 22a from communication unit 3a.

Waveforms (a) to (c) in FIG. 11 are identical to waveforms (a) to (c) in FIG. 3, respectively.

Waveform (d) in FIG. 3 indicates that a message from the power reception side is divided, and is transmitted in two time slots. On the other hand, waveform (d) in FIG. 11 indicates that the power feeding side returns a response message to the power reception side in a subsequent time slot according to the timing signal output from zero cross detection circuit 23, with respect to a message which is transmitted from the power reception side in a certain time slot and requests a response.

Control unit 10 does not transmit a message in the subsequent time slot of the time slot where the message requesting a response is transmitted, but waits for receiving a packet which returns from contactless power feeder 20c. Accordingly, a collision between the next transmission packet and the response packet is avoided. It is also effective that the direction of the communication is determined in advance in each time slot from the viewpoint of avoiding the collision between the packets.

Figure 12A:
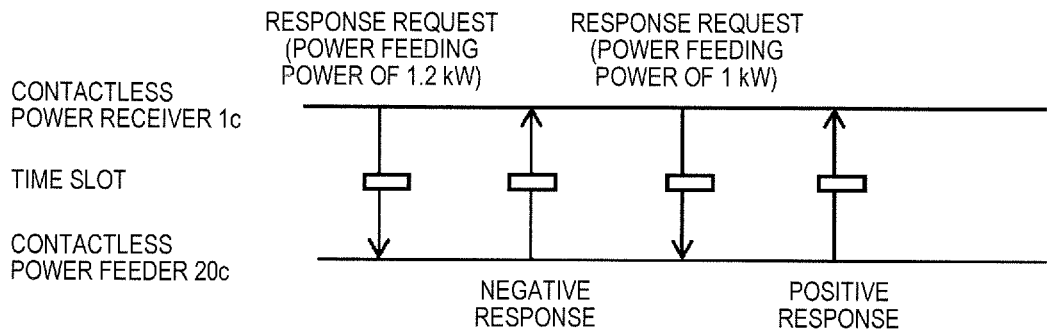
FIG. 12A is a diagram illustrating an example of using a response message which returns to a contactless power receiver from a contactless power feeder in Exemplary Embodiment 2.
Figure 12B:
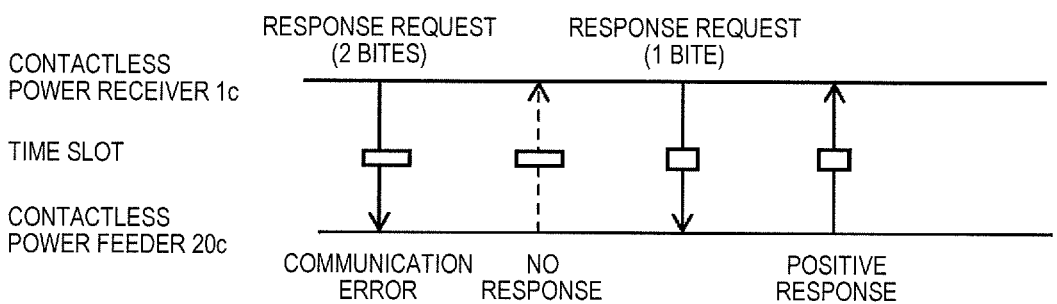
FIG. 12B is a diagram illustrating an example of using the response message which returns to the contactless power receiver from the contactless power feeder in Exemplary Embodiment 2.
Figure 12C:
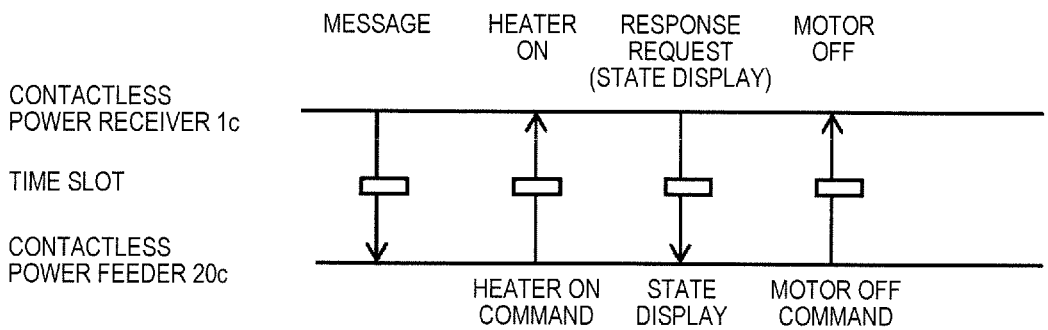
FIG. 12C is a diagram illustrating an example of using the response message which returns to the contactless power receiver from the contactless power feeder in Exemplary Embodiment 2.

For example, examples illustrated in FIG. 12A, FIG. 12B, and FIG. 12C are included in the use of the response message. As illustrated in FIG. 12A, in a case where transmission of power (for example, 1.2 kW) having a capacity greater than that of contactless power feeder 20c (for example, 1 kW) is requested as a message (a response request), contactless power feeder 20e transmits a negative response. In a case where contactless power receiver 1c receives the negative response, the value of the power decreases, and the power transmission is requested again (a response request).

As illustrated in FIG. 12B, in a case where it is difficult to perform communication of a message having a large size due to the influence of the noise which is generated by the power transmission, contactless power feeder 20c adaptively adjusts the sizes of messages to be transmitted at one time according to the presence or absence of a response.

Use examples described herein are merely examples, and various uses are considered in the bidirectional communication according to the present disclosure.

As illustrated in FIG. 10, contactless power feeder 20c includes an input unit and a display unit (not illustrated), and includes input display unit 33 connected to control unit 29. According to this configuration, input of a command with respect to contactless power receiver 1c and visual contact of an operation state of contactless power receiver 1c can be performed by input display unit 33.

Control unit 29 converts input with respect to input display unit 33 of a user into an operation command. Control unit 29 responds to a response request command received from contactless power receiver 1c through communication unit 22c, and transmits the converted operation command from communication unit 22c in the next time slot.

In order to transmit the input with respect to input display unit 33 to contactless power receiver 1c without any delay, it is necessary that control unit 29 is programmed in contactless power receiver 1c such that the response request command is periodically transmitted. Similarly, control unit 10 grasps the operation state of contactless power receiver 1c at all times, and periodically transmits the operation state to contactless power feeder 20c as a message.

FIG. 12C illustrates a control example of contactless power receiver 1c in contactless power feeder 20c. In FIG. 12C, contactless power feeder 20c is an induction heating cooking device, as with contactless power feeder 20a. Contactless power receiver 1c is a cooking device which includes a heater and a motor therein, and heats or stirs cooking ingredients by using power to be transmitted over the contactless.

The heater is controlled by transmitting a control command (for example, a heater on command) based on a program stored in control unit 29 to contactless power receiver 1c from contactless power feeder 20c as a message.

The operation state of contactless power receiver 1c is transmitted to contactless power feeder 20c from contactless power receiver 1c as a message, and is displayed on input display unit 33 of contactless power feeder 20c.

The motor is controlled by transmitting a control command (for example, a motor off command) input through input display unit 33 to contactless power receiver 1c from contactless power feeder 20c as a message.

Furthermore, contactless power feeder 20c and contactless power receiver 1c perform the state transition illustrated in FIG. 7, as with contactless power feeder 20a and contactless power receiver 1a.

Modification Example of Exemplary Embodiment 2

Figure 13:
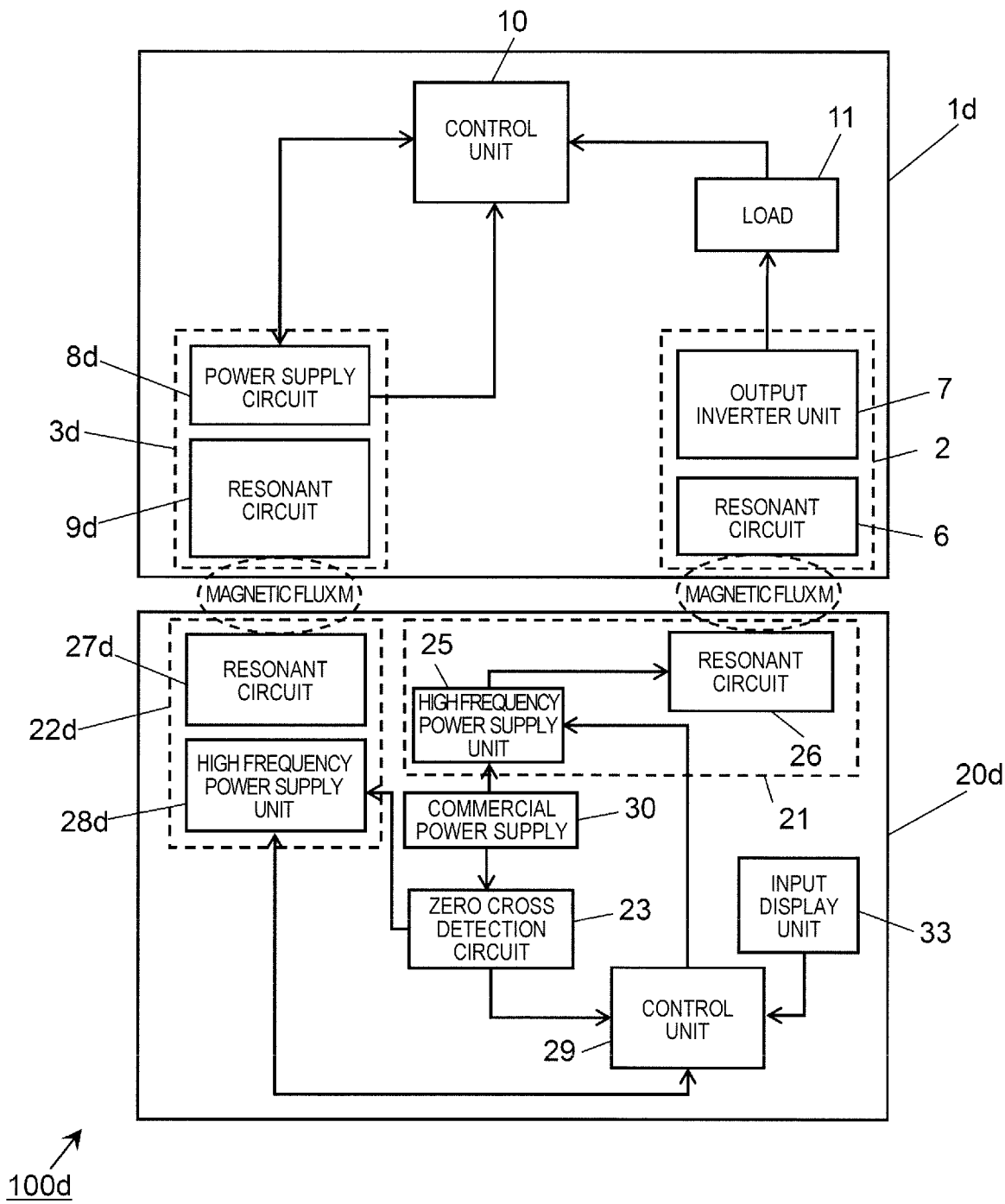
FIG. 13 is a block configuration diagram of a contactless power transmission system according to a modification example of Exemplary Embodiment 2.

FIG. 13 is a block configuration diagram of contactless power transmission system 100d according to a modification example of Exemplary Embodiment 2. In the drawings for illustrating this modification example, the same reference numerals are applied to the identical or corresponding portions to those of the drawings described above, and the detailed description thereof will be omitted.

As illustrated in FIG. 13, contactless power transmission system 100d is different from contactless power transmission system 100c illustrated in FIG. 10 in the following points.

Contactless power receiver 1d does not include zero cross detection circuit 4, but includes power reception communication unit 3d instead of communication unit 3c. Contactless power feeder 20d includes power feeding communication unit 22d instead of communication unit 22c.

Power feeding communication unit 22d includes resonant circuit 27d including a power feeding coil, and high frequency power supply unit 28d, as with power feeding communication unit 22b.

As illustrated in FIG. 13, zero cross detection circuit 23 feeds a timing signal providing the timing of the zero cross point of the alternating current voltage from commercial power supply 30 to high frequency power supply unit 28d. High frequency power supply unit 28d generates magnetic flux M through resonant circuit 27d in the vicinity of the zero cross point according to the timing signal thereof.

Power reception communication unit 3d includes resonant circuit 9d including a power reception coil, and power supply circuit 8d, as with power reception communication unit 3b. Power supply circuit 8d converts a change in magnetic flux M from resonant circuit 27d into alternating current power by using resonant circuit 9d, and feeds the alternating current power to control unit 10.

Thus, power feeding communication unit 22d has a contactless power feeding function to power reception communication unit 3d as with power feeding communication unit 22b, and power reception communication unit 3d has a contactless power reception function from power feeding communication unit 22d as with power reception communication unit 3b.

In concurrence with the power transmission described above, power supply circuit 8d performs load modulation with respect to power to be transmitted over the contactless according to a transmission message output from control unit 10, and thus, transmits the transmission message to the power feeding side from the power reception side by superimposing the transmission message on the power to be transmitted.

High frequency power supply unit 28d demodulates a signal superimposed on the power to be transmitted, and feeds a reception message to control unit 29.

In addition, as with the power transmission described above, high frequency power supply unit 28d performs load modulation with respect to power to be transmitted over the contactless according to a transmission message from control unit 29, and thus, transmits the transmission message to the power reception side from the power feeding side by superimposing the transmission message on the power to be transmitted.

Power supply circuit 8d demodulates a signal superimposed on the power to be transmitted, and feeds a reception message to control unit 10.

Thus, bidirectional communication is performed between power reception communication unit 3d and power feeding communication unit 22d only in the vicinity of the zero cross point of the alternating current voltage from commercial power supply 30.

Exemplary Embodiment 3

Figure 14:
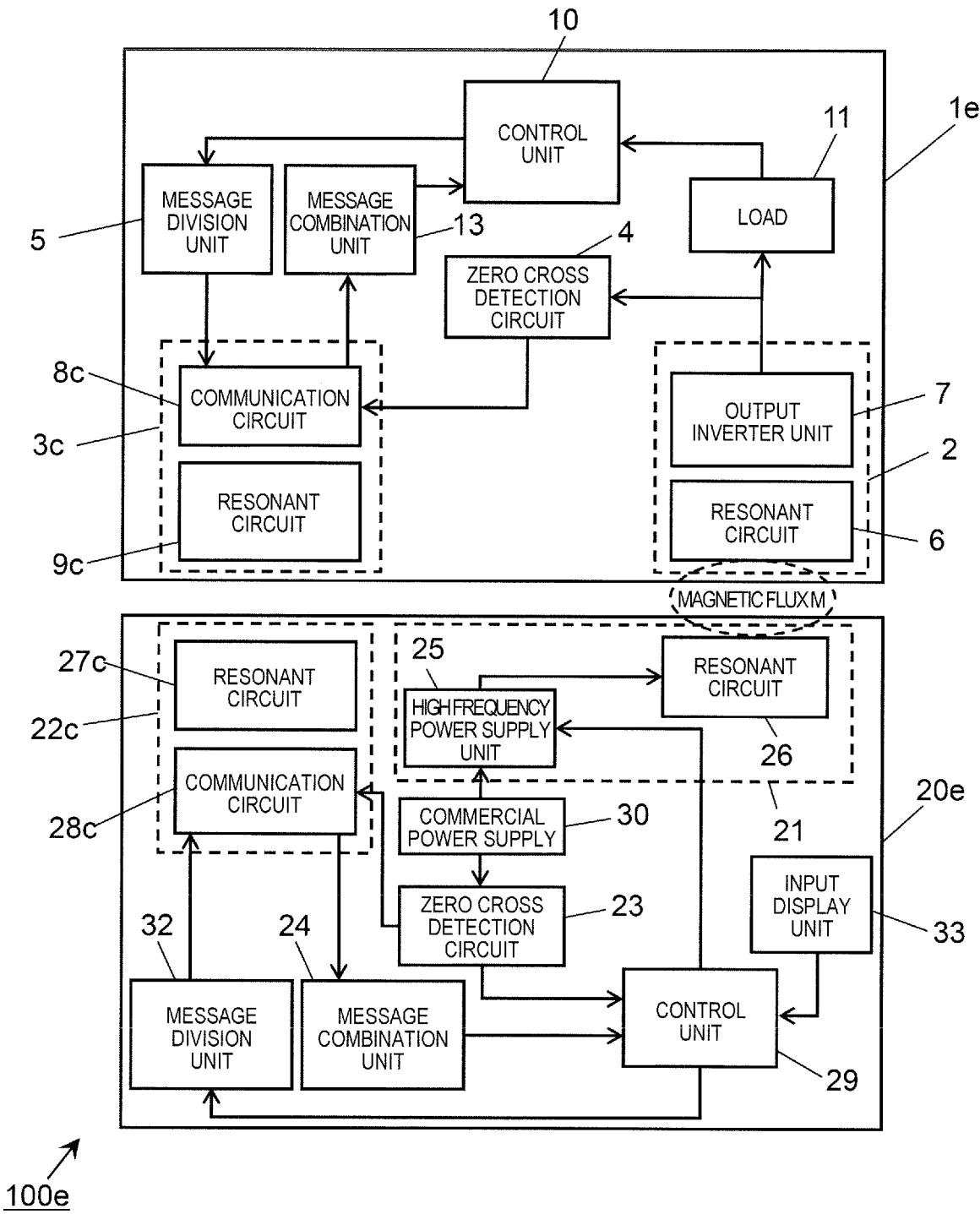
FIG. 14 is a block configuration diagram of a contactless power transmission system according to Exemplary Embodiment 3.

FIG. 14 is a block configuration diagram of contactless power transmission system 100e according to Exemplary Embodiment 3 of the present disclosure. FIG. 15 is a diagram illustrating an example of a timing chart of each signal and a format of a communication packet in contactless power transmission system 100e. In the drawings for illustrating this exemplary embodiment, the same reference numerals are applied to the identical or corresponding portions to those of the drawings described above, and the detailed description thereof will be omitted.

As illustrated in FIG. 14 and FIG. 15, contactless power transmission system 100e according to this exemplary embodiment includes contactless power receiver 1e and contactless power feeder 20e. In this exemplary embodiment, division and combination of a message, and bidirectional communication of a message are performed.

In contactless power receiver 1e, in a case where the transmission message is required to be transmitted by being divided due to a large size, message division unit 5 divides the message into two data items each of which has a size transmittable in one time slot. Communication unit 3c transmits two communication packets including the divided data by using two time slots, on the basis of the timing signal output from zero cross detection circuit 4.

Message division unit 5 functions as a power reception side message division unit.

In contactless power feeder 20e, communication unit 22c receives the communication packet on the basis of the timing signal output from zero cross detection circuit 23. In a case where the divided message is included in the received communication packet, message combination unit 24 combines the data included in the received communication packet, and generates one message.

Message combination unit 24 functions as a power feeding side message combination unit.

In a case where the received message is a message requesting a response, control unit 29 generates a response message for responding to the received message.

In a case where the transmission message is required to be transmitted by being divided due to a large size, message division unit 32 divides the message into two data items each of which has a size transmittable in one time slot. Communication unit 22c transmits two communication packets including the divided data by using two time slots, on the basis of the timing signal output from zero cross detection circuit 23.

Message division unit 32 functions as a power feeding side message division unit.

In contactless power receiver 1e, communication unit 3c receives the communication packet on the basis of the timing signal output from zero cross detection circuit 4. In a case where the divided message is included in the received communication packet, message combination unit 13 combines a plurality of data items included in the received communication packet, and generates one message.

Message combination unit 13 functions as a power reception side message combination unit.

The message requesting a response is transmitted, and then, control unit 10 avoids a collision between the next transmission packet and the response packet, and thus, the transmission of the next message is restrained until a response signal from contactless power feeder 20e is received. It is also effective that the direction of the communication is determined in advance in each time slot from the viewpoint of avoiding the collision in the packets.

In order to a avoid deadlock occurring in case where the response packet does not return due to a communication error or the like, a time-out period is set with respect to a period in which the transmission is restrained. Idealistically, it is important that both of the number of divisions of the transmission packet and the number of divisions of the response packet are grasped, and a period in which the response is completed is identical to the time-out period from the viewpoint of an efficiency.

Figure 16A:
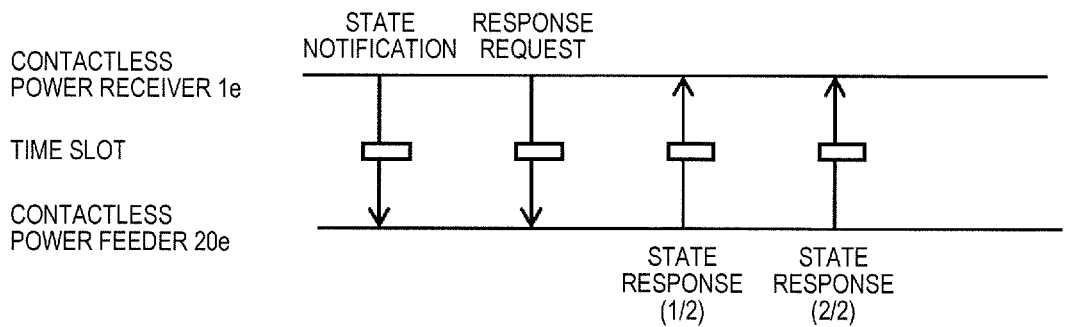
FIG. 16A is a diagram illustrating an example of using a response message which returns to a contactless power receiver from a contactless power feeder in the Exemplary Embodiment 3.
Figure 16B:
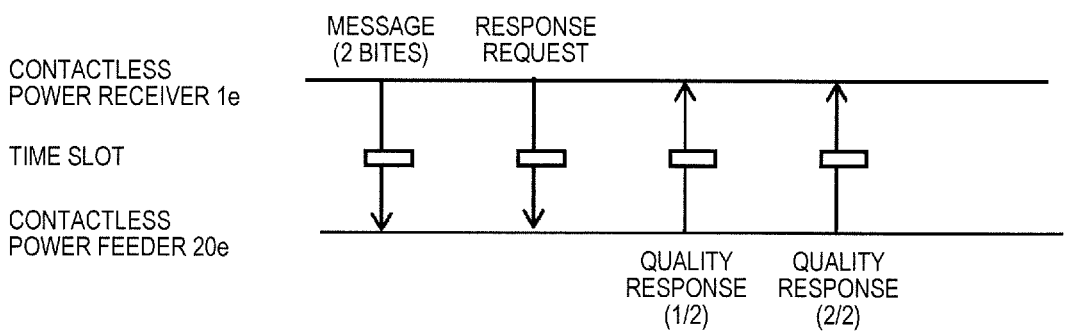
FIG. 16B is a diagram illustrating an example of using the response message which returns to the contactless power receiver from the contactless power feeder in the Exemplary Embodiment 3.
Figure 16C:
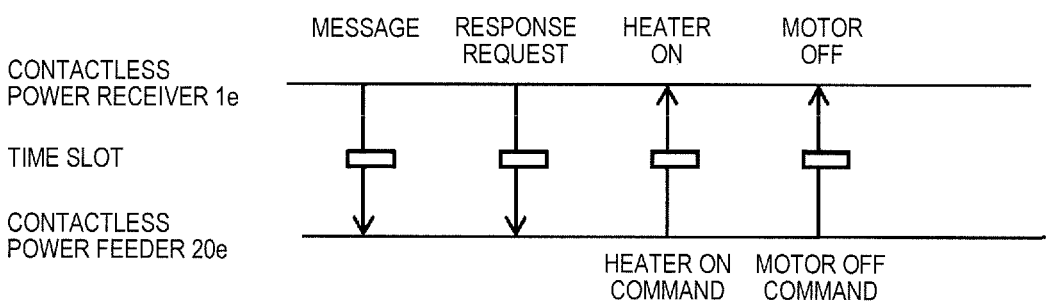
FIG. 16C is a diagram illustrating an example of using the response message which returns to the contactless power receiver from the contactless power feeder in the Exemplary Embodiment 3.

For example, examples illustrated in FIG. 16A, FIG. 16B, and FIG. 16C are included in the use of the response message. As illustrated in FIG. 16A, contactless power receiver 1e notifies the state of the power reception side to the power feeding side in one time slot as a message (a state notification), and requests the state of contactless power feeder 20e to be responded as a message in a subsequent time slot (a response request).

Contactless power feeder 20e receives the message for the response request, and returns the state of the power feeding side as a message by using two time slots (a state response).

Here, an example in which each time slot is divided into two time slots will be described, but the present disclosure is not limited thereto. In this exemplary embodiment, various states are included, and it is also possible to perform communication of a longer message by dividing the message into greater than or equal to three.

In FIG. 15, the header and the checksum are added to each of the divided messages, and thus, it is also possible to perform the same processing as that in FIG. 6.

That is, the header and the checksum are added to the message before being divided, and then, the data is divided into the number which fits into one time slot. The preamble is added to each data after being divided, and two packets are configured. In a case where transmission is performed in two time slots according to the timing signal obtained from zero cross detection circuit 4, it is possible to efficiently transmit 2 to 4 messages in two time slots.

Furthermore, it is also possible to apply this division communication method to a longer message. For example, it is also possible to divide a message of 5 bites to 7 bites into three messages, and to transmit the three messages by using three time slots. In a case of a message having a length longer than or equal to the length described above, a time slot may be used in which data which is divided every 3 bites is transmitted.

In addition, in this exemplary embodiment, one time slot is defined as a period having a length in which the communication of the message of 1 bite can be narrowly performed, but the present disclosure is not limited thereto. In a case where a faster communication method is used, a message length which can be subjected to communication in one time slot increases. For example, in a case where data of 2 bites can be subjected to communication in one time slot, the same effect can be obtained in a case where a message is divided every 2 bites.

It is possible to apply the division communication method illustrated in FIG. 6 to both of communication to the power feeding side from the power reception side and communication to the power reception side from the power feeding side.

Here, communication in contactless power receiver 1e will be described.

Figure 17:
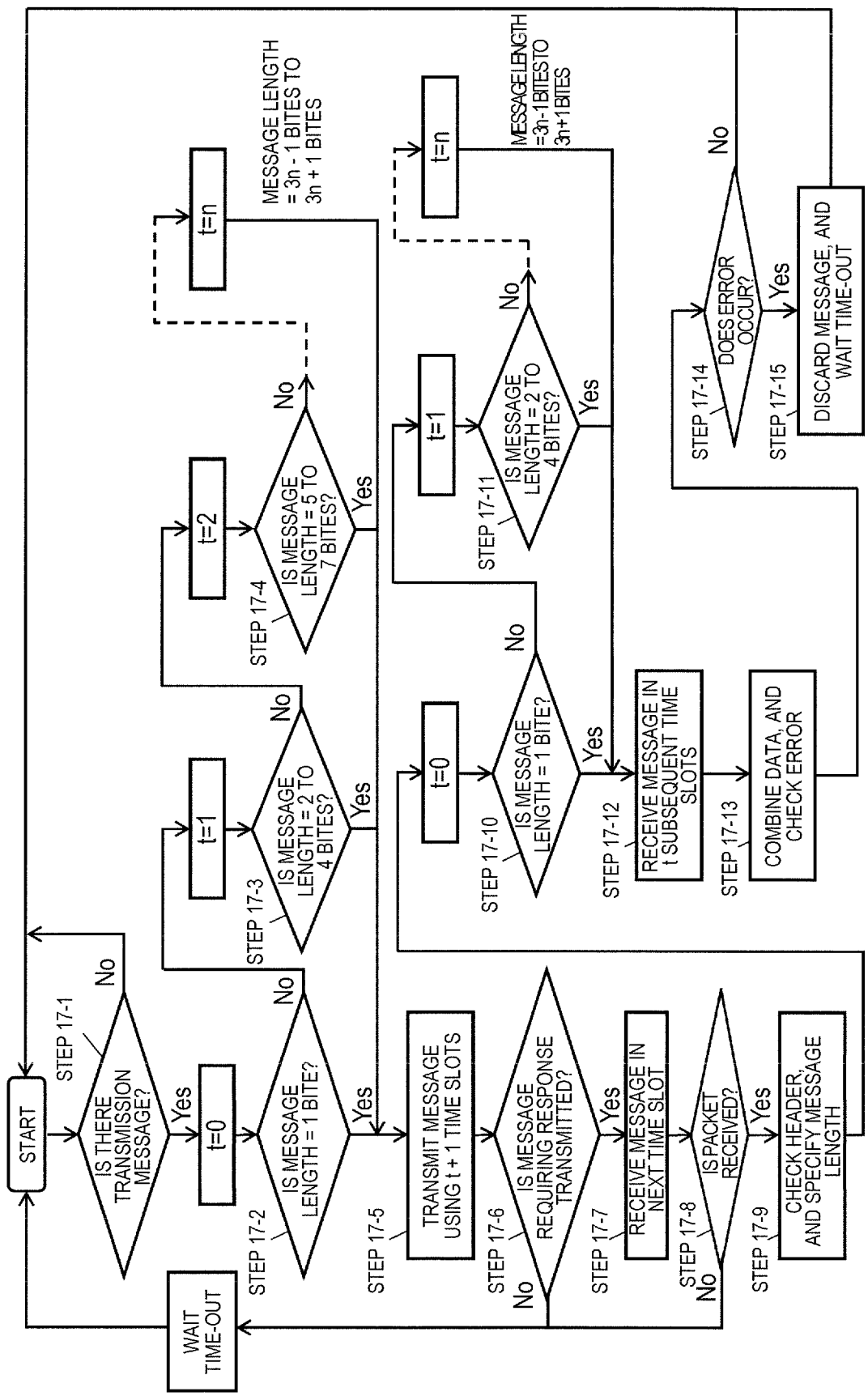
FIG. 17 is a flowchart illustrating a communication process in the contactless power receiver according to Exemplary Embodiment 3.

FIG. 17 is a flowchart illustrating a communication process in contactless power receiver 1e. As illustrated in FIG. 17, in Step 17-1, the presence or absence of the transmission message is determined. In a case where there is no transmission message, the process returns to Start, and in a case where there is a transmission message, variable t is set to 0, and the process proceeds to Step 17-2.

In Step 17-2, it is determined whether the length of the transmission message is 1 bite or greater than or equal to 2 bites. In a case where the length of the transmission message is greater than or equal to 2 bites, variable t is set to 1, and the process proceeds to Step 17-3. In Step 17-3, it is determined whether the message length is 2 bites to 4 bites or greater than or equal to 5 bites.

Hereinafter, similarly, variable t is incremented after Step 17-4. In a case where t becomes n, it is specified that the length of the transmission message is $3n-1$ bites to $3n+1$ bites. In a case where the message length is specified, the process proceeds to Step 17-5. In Step 17-5, t+1 divided messages are transmitted one by one in sequence by using t+1 successive time slots.

In Step 17-6, it is determined whether the transmitted message is a message requiring a response of a response message (ACK, NAK, and the like) from contactless power feeder 20e or a message urging the transmission of the message. In a case where the message requiring a response is transmitted, the process proceeds to Step 17-7. In Step 17-7, a packet from contactless power feeder 20e is received in the next time slot. In a case where the message requiring a response is not transmitted, the process returns to Start.

In a case where an error occurs in header information of the transmitted message in Step 17-5, there is a possibility that contactless power feeder 20e recognizes the received message as a message having a message length different from the actual message length. In this case, the checksum stored in the bottom is received, and then, reception processing is continuously performed until the error is determined by error detection. For this reason, even in a case where a new packet is transmitted from contactless power receiver 1e, it is not possible to normally receive the new pack.

As a countermeasure for avoiding such a situation, it is considered that the time-out period is set such that communication restarts after an initial packet is transmitted, and then, time elapses by the number of time slots according to the maximum message length defined in a communication protocol.

In a case where the time-out period is set, the process returns to Start after the time-out period elapses. In Step 17-8, it is determined whether or not the packet is received in Step 17-7. In a case where it is determined that the packet is received, the process proceeds to Step 17-9, and in a case where it is determined that the packet is not received, the process returns to Start after the time-out period elapses.

In Step 17-9, the header of the packet received in Step 17-7 is analyzed, and a message length transmitted from contactless power feeder 20e is specified. In a case where the message length is specified, the process proceeds to Step 17-10.

In Step 17-10 and Step 17-11, variable t is set according to the message length. In Step 17-12, the packet which is transmitted by being divided is received in t subsequent time slots.

In Step 17-13, the data included in the packet received in Step 17-12 from Step 17-7 is combined, and error check is performed. In Step 17-14, the presence or absence of the error is determined. In a case where the error is detected, the process proceeds to Step 17-15. In Step 17-15, the message is discarded. In a case where the error is not detected, the message is output to control unit 10, and then, the process returns to Start.

Here, in a case where the error occurs in the header information, there is a possibility that the message is erroneously determined as a telegram message having a message length different from the actual message length, and there is a case where packet transmission is continuously performed from contactless power feeder 20e on the basis of such determination.

As a countermeasure for avoiding such a situation, it is considered that the time-out period is set such that communication restarts after an initial packet is transmitted, and then, time elapses by the number of time slots according to the maximum message length defined in a communication protocol. In a case where the time-out period is set, the process returns to Start after the time-out period elapses.

Next, communication of a message in contactless power feeder 20e will be described.

Figure 18:
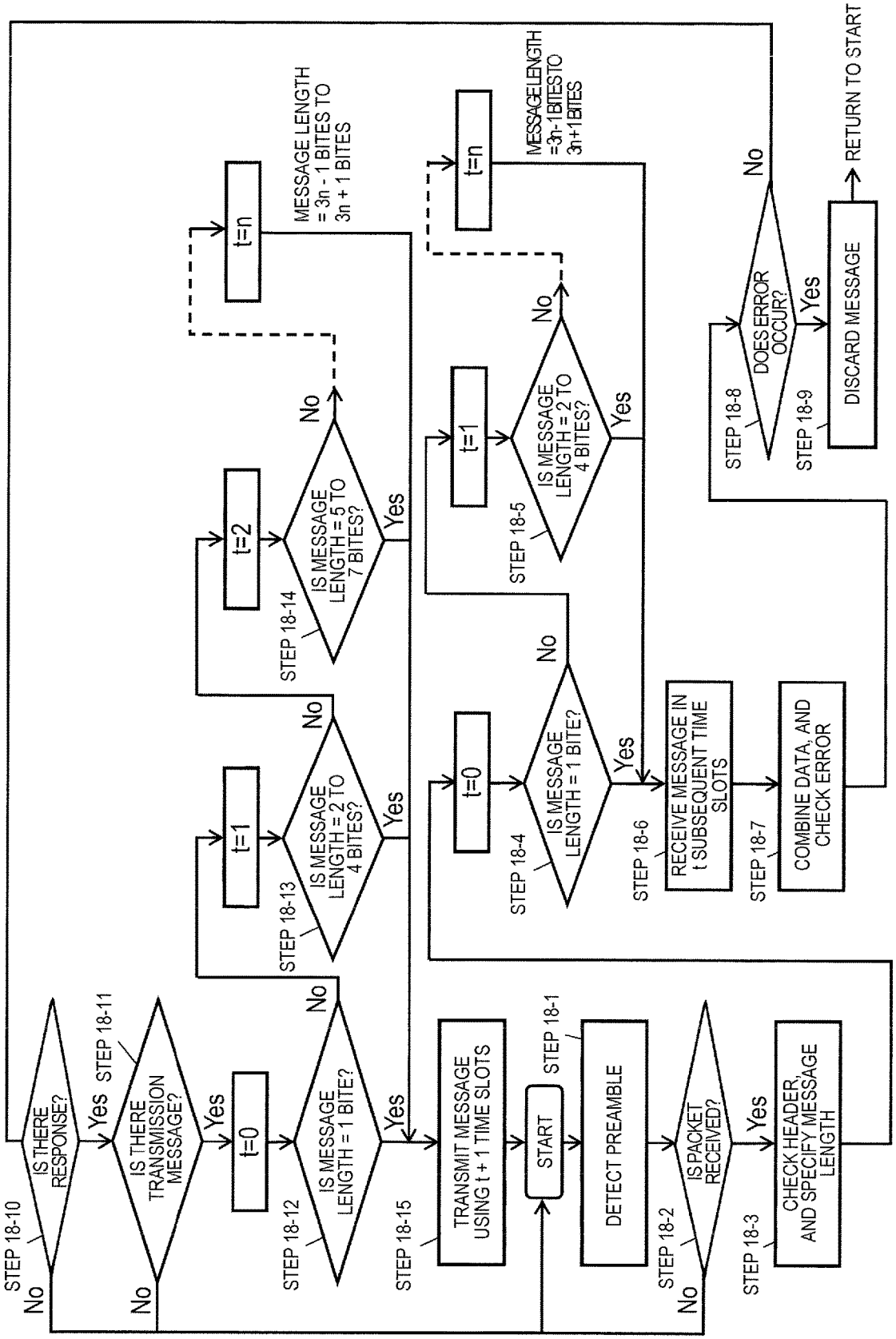
FIG. 18 is a flowchart illustrating a communication process in the contactless power feeder according to Exemplary Embodiment 3.

FIG. 18 is a flowchart illustrating a communication process in contactless power feeder 20e. As illustrated in FIG. 18, after Start, detection of a preamble in a time slot is performed in Step 18-1, and a reception operation is performed. In Step 18-2, determination of reception is performed.

In a case where the packet is not received, the process proceeds to Start, and in a case where the packet is received, the process proceeds to Step 18-3. In Step 18-3, the header of the packet received in Step 18-2 is analyzed, and a message length transmitted from contactless power receiver 1e is specified.

In a case where the message length is specified, the process proceeds to Step 18-4. In Step 18-4 and Step 18-5, variable t is set according to the message length. In Step 18-6, the packet which is transmitted by being divided is received in t subsequent time slots.

In Step 18-7, the data included in the received packet is combined, and error check is performed. In Step 18-8, in a case the error is detected, the process proceeds to Step 18-9. In Step 18-9, the message is discarded, and the process returns to Start. In a case where the error is not detected, the process proceeds to Step 18-10.

In Step 18-10, it is determined whether the received message is a message requiring a response of a response message (ACK, NAK, and the like) from contactless power feeder 20e or a message urging the transmission of the message. In a case where the message requiring a response is received, the process proceeds to Step 18-11.

In Step 18-11, it is determined whether there is a response message (ACK, NAK, and the like) or there is a transmission message with respect to the urging of the message, and in a case where there is no transmission message, the process proceeds to Start.

In a case where there is a transmission message, variable t is set to 0, and the process proceeds to Step 18-12. In Step 18-12, it is determined whether the length of the transmission message is 1 bite or greater than or equal to 2 bites. In a case where the length of the transmission message is greater than or equal to 2 bites, variable t is set to 1, and the process proceeds to Step 18-13. In Step 18-13, it is determined whether the message length is 2 bites to 4 bites or greater than or equal to 5 bites.

Hereinafter, similarly, variable t is incremented after Step 18-14. In a case where t becomes n, it is specified that the length of the transmission message is 3n−1 bites to 3n+1 bites. In a case where the message length is specified, the process proceeds to Step 18-15. In Step 18-15, t+1 divided messages are transmitted one by one in sequence by using t+1 successive time slots.

FIG. 16B illustrates an example in which in a case where contactless power feeder 20e and contactless power receiver 1e perform communication with respect to a message of 2 bites in one time slot, contactless power receiver 1e requests return of statistical data relevant to communication quality with respect to contactless power feeder 20e.

In a case where the message for a response request is received, contactless power feeder 20e returns the statistical data such as an error rate of the packet received from contactless power receiver 1e as a divided message in two time slots for a certain period (a quality response).

Furthermore, in bidirectional communication of this exemplary embodiment, it is possible to adjust the number of bites of a message to be transmitted in the vicinity of the zero cross point according to fed power such that an error does not occur, on the basis of the statistical data such as an error rate.

It is also possible to apply the bidirectional communication of this exemplary embodiment to various uses in addition to this exemplary embodiment. For example, in a case where contactless power feeder 20e includes input display unit 33 as illustrated in FIG. 10, the user can operate contactless power receiver 1e through input display unit 33 of contactless power feeder 20e, or display the operation state of contactless power receiver 1e.

FIG. 16C illustrates an example of a control example of contactless power receiver 1e in contactless power feeder 20e. In FIG. 16C, contactless power feeder 20e is a cooking device which includes a heater and a motor therein, and heats or stirs cooking ingredients by using power to be transmitted over the contactless.

The heater is controlled by transmitting a control command (for example, a heater on command) based on a program stored in control unit 29 to contactless power receiver 1e from contactless power feeder 20e as a message.

The motor is controlled by transmitting a control command (for example, a motor off command) input through input display unit 33 to contactless power receiver 1e from contactless power feeder 20e as a message.

Furthermore, contactless power feeder 20e and contactless power receiver 1e perform the state transition illustrated in FIG. 7, as with contactless power feeder 20a, contactless power receiver 1a, and the like.

Modification Example of Exemplary Embodiment 3

Figure 19:
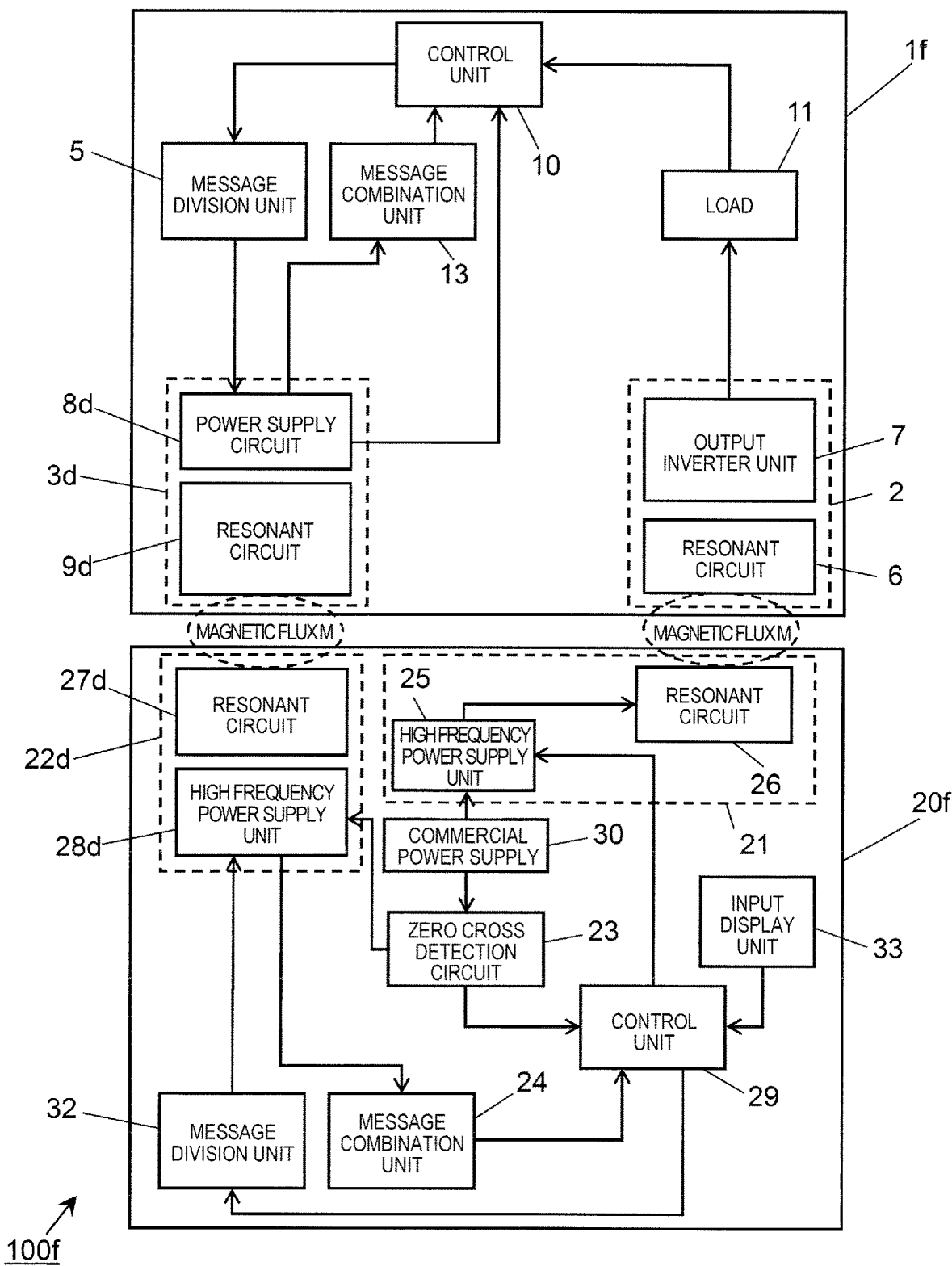
FIG. 19 is a block configuration diagram of a contactless power transmission system according to a modification example of Exemplary Embodiment 3.

FIG. 19 is a block configuration diagram of contactless power transmission system 100f according to a modification example of Exemplary Embodiment 3. In the drawings for illustrating this modification example, the same reference numerals are applied to the identical or corresponding portions to those of the drawings described above, and the detailed description thereof will be omitted.

As illustrated in FIG. 19, contactless power transmission system 100f is different from contactless power transmission system 100d illustrated in FIG. 13 in the following points.

Contactless power receiver 1f includes message division unit 5 and message combination unit 13 illustrated in FIG. 14. Contactless power feeder 20f includes message division unit 32 and message combination unit 24 illustrated in FIG. 14.

According to this configuration, contactless power transmission system 100f has a bidirectional communication function identical to that of Exemplary Embodiment 3, and a two-system contactless power transmission function identical to that of the modification example of Exemplary Embodiment 2.

Exemplary Embodiment 4

In power feeding state S4a illustrated in the state transition diagram of FIG. 7, information of power (received power information) which is actually received in the power reception side and power error information (corresponding to the amount of required power described above) which is a difference with respect to power to be requested are transmitted to the power feeding side, and thus, power control is performed.

In order to perform the power control, it is necessary that communication of the power error information is periodically performed, but in a case where other information items such as device control information are transmitted by being divided into a plurality of packets, there is a possibility that periodical transmission of power error information for power control is hindered. In particular, strictness is requested in a transmission cycle of the power control information as the power transmission amount increases.

Figure 20:
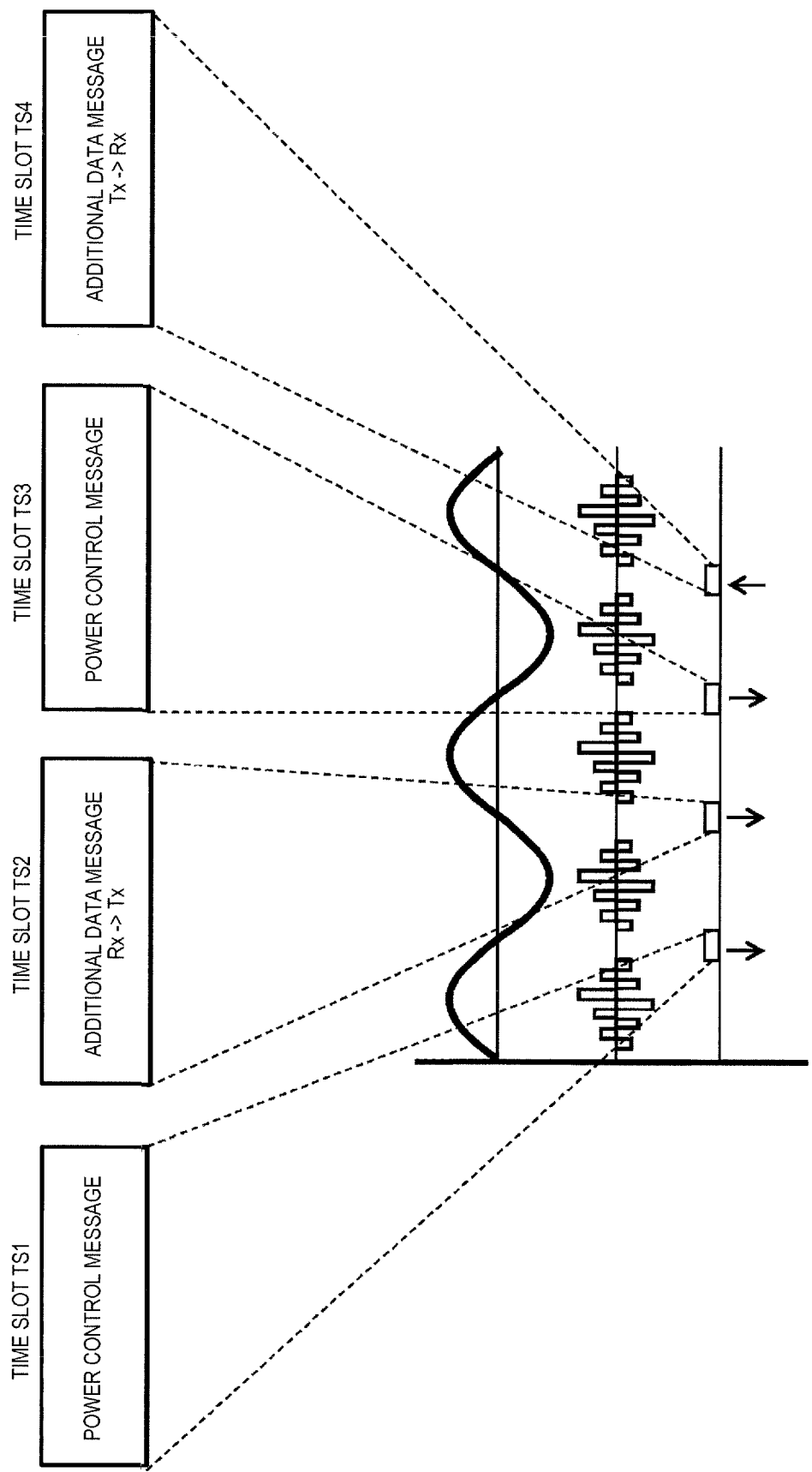
FIG. 20 is a diagram illustrating time slot allocation of Exemplary Embodiment 4.

As one of countermeasures for such a problem, a time slot for transmitting the power control information in advance is preferentially allocated. FIG. 20 is a diagram illustrating an example of time slot allocation in a contactless power transmission system according to this exemplary embodiment.

In information transmission according to this exemplary embodiment, a basic pattern including four time slots is repeated. As illustrated in FIG. 20, the basic pattern includes two time slots for power control information, additional data message Rx->Tx for transmitting other information items to the power feeding side from the power reception side, and additional data message Tx->Rx for transmitting other information items to the power reception side from the power feeding side.

In this exemplary embodiment, even in a case where the time slots are preferentially allocated, contactless power transmission system 100g transmits a message having a length which is not capable of being transmitted in one time slot by dividing the message in each of the time slots.

Figure 21:
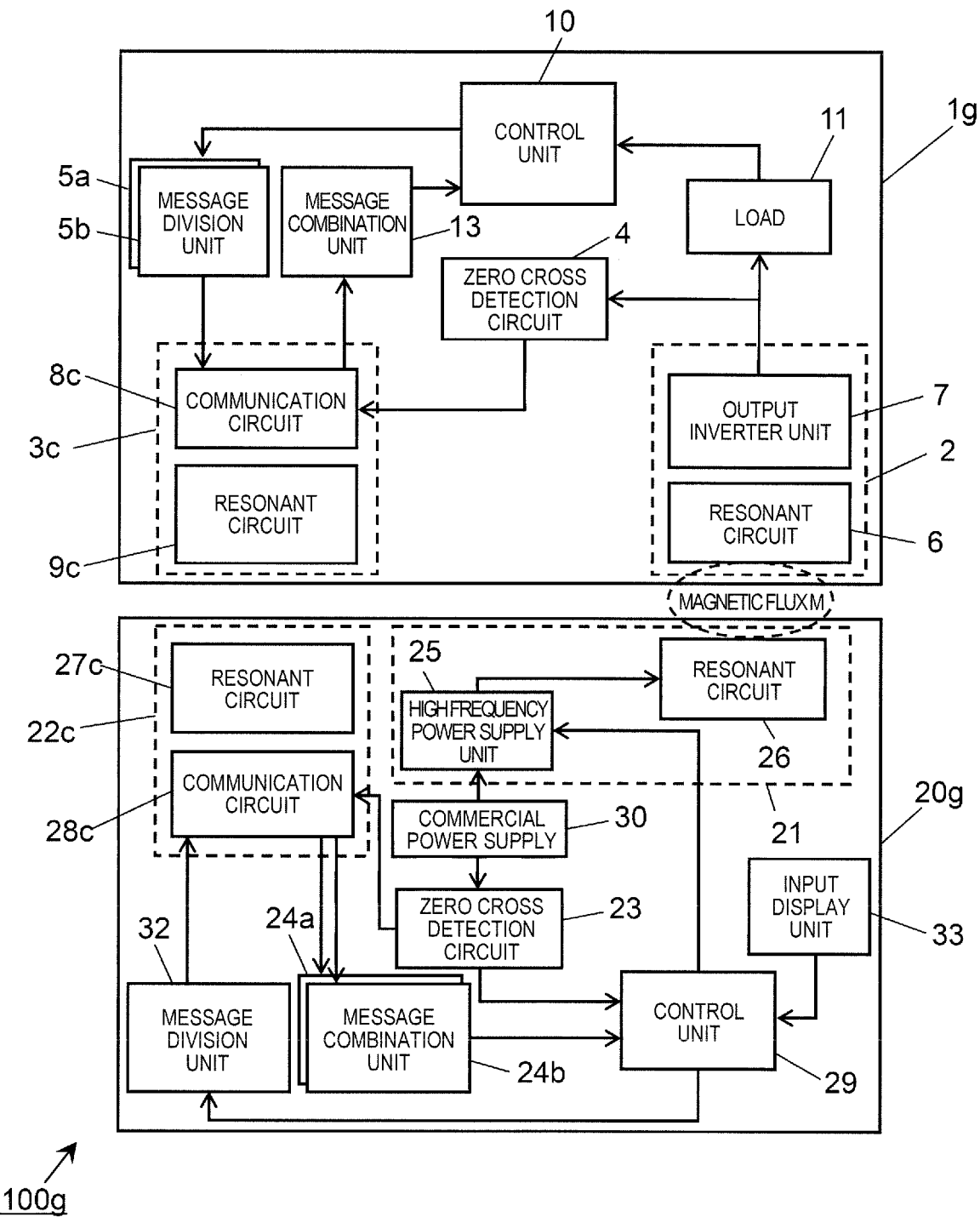
FIG. 21 is a block configuration diagram of a contactless power transmission system according to Exemplary Embodiment 4.

FIG. 21 is a block configuration diagram of contactless power transmission system 100g according to this exemplary embodiment. In the drawings for illustrating this exemplary embodiment, the same reference numerals are applied to the identical or corresponding portions to those of the drawings described above, and the detailed description thereof will be omitted.

As illustrated in FIG. 21, contactless power transmission system 100g is different from contactless power transmission system 100e illustrated in FIG. 14 in the following points.

Message division unit 5 is substituted with message division unit 5a and message division unit 5b, and message combination unit 24 is substituted with message combination unit 24a and message combination unit 24b. That is, message division units 5a and 5b are power reception side message division units, and message combination units 24a and 24b are power feeding side message combination units.

According to this configuration, the power control message and additional data message Rx->Tx illustrated in FIG. 20 can be separately divided in the power reception side. Similarly, the power control slot and additional data message Rx->Tx illustrated in FIG. 20 can be separately combined in the power feeding side.

Figure 22:
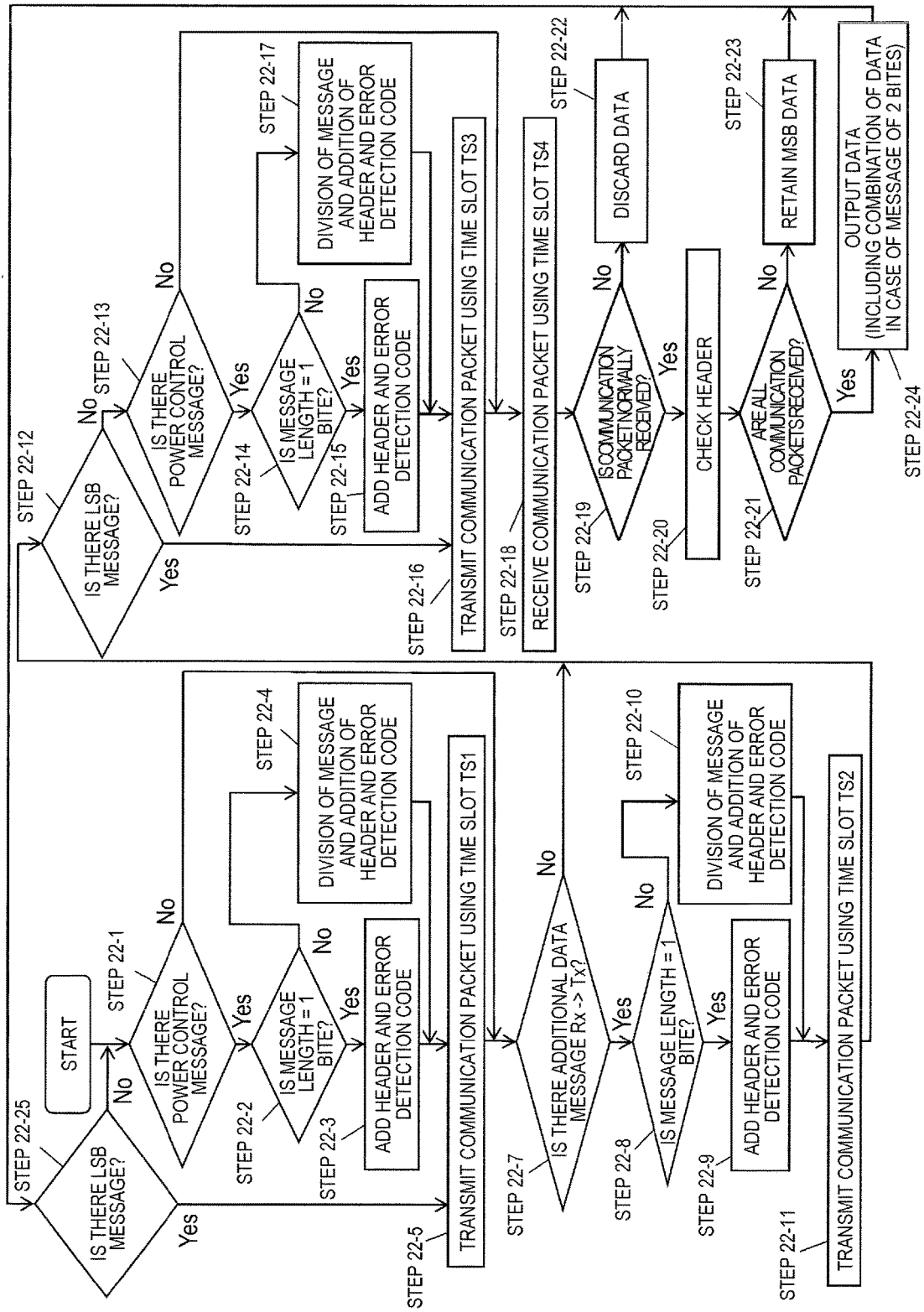
FIG. 22 is a flowchart illustrating a communication process in a contactless power receiver according to Exemplary Embodiment 4.

FIG. 22 is a flowchart illustrating a communication process in contactless power receiver 1g. As illustrated in FIG. 22, in Step 22-1, the presence or absence of a power control message to be transmitted is determined. In a case where there is no transmission message, the process proceeds to transmission processing of time slot TS2. In a case where there is a transmission message, the process proceeds to Step 22-2, and it is determined whether the length of the transmission message is 1 bite or 2 bites.

In a case where the length of the transmission message is 1 bite, the process proceeds to Step 22-3. In Step 22-3, a header and an error detection code for a message of 1 bite are added to the message. In Step 22-5, the communication packet is transmitted by using time slot TS1.

In a case where the length of the transmission message is 2 bites, the process proceeds to Step 22-4. In Step 22-4, the message is divided into MSB data and LSB data, and a header and an error detection code are added to the MSB data and the LSB data. In Step 22-5, the communication packet is transmitted by using time slot TS1, and then, the process proceeds to Step 22-7.

In Step 22-7, the presence or absence of additional data message Rx->Tx to be transmitted is determined.

In a case where there is no transmission message, the process proceeds to transmission processing of time slot TS3. Even in a case where there is no transmission message, it is possible to grasp transmission timing in the power feeding side in a case where a header for transmitting NULL data in advance is defined, and the NULL data to which the header is added is transmitted as additional data message Rx->Tx.

Both of the power control information and the additional information to the power feeding side from the power reception side are transmitted from the power reception side, and thus, can be shared in a case where an information class can be designated by a header or the like. That is, in a case where it is not necessary to transmit the additional information to the power feeding side from the power reception side, it is possible to transmit the power control information instead.

In this case, it is also possible to increase a temporal accuracy in the power reception side by transmitting more received power information or power error information having a resolution of 1 bite. In addition, received power information or power error information having a resolution of 2 bites can be transmitted by being divided by using two time slots.

As a result of determination in Step 22-7, in a case where there is a transmission message, the process proceeds to Step 22-8. In Step 22-8, it is determined whether the length of the transmission message is 1 bite or 2 bites.

In a case where the length of the transmission message is 1 bite, the process proceeds to Step 22-9. In Step 22-9, the header and the error detection code for a message of 1 bite are added to the message. In Step 22-11, the communication packet is transmitted by using time slot TS2.

In a case where the length of the transmission message is 2 bites, the process proceeds to Step 22-10. In Step 22-10, the message is divided into the MSB data and the LSB data, and a unique header and a unique error detection code are added to the MSB data and the LSB data, respectively. In Step 22-11, the communication packet is transmitted by using time slot TS2, and then, the process proceeds to Step 22-12.

In Step 22-12, in time slot TS1, the presence or absence of LSB data for power control in a case where MSB data for power control is transmitted is determined.

In a case where there is LSB data for power control, the process proceeds to Step 22-16. In Step 22-16, the communication packet is transmitted by using time slot TS3. In a case where there is no LSB data for power transmission, the process proceeds to Step 22-13.

In Step 22-13, the presence or absence of a power control message to be transmitted is determined. In a case where there is no transmission message, the process proceeds to reception processing of time slot TS4, and in a case where there is a transmission message, the process proceeds to Step 22-14.

In Step 22-14, it is determined whether the length of the transmission message is 1 bite or 2 bites. In a case where the length of the transmission message is 1 bite, the process proceeds to Step 22-15. In Step 22-15, the header and the error detection code for a message of 1 bite are added to the message. In Step 22-16, the communication packet is transmitted by using time slot TS3.

In a case where the length of the transmission message is 2 bites, the process proceeds to Step 22-17. In Step 22-17, the message is divided into the MSB data and the LSB data, and a unique header and a unique error detection code are added to the MSB data and the LSB data, respectively. In Step 22-16, the communication packet is transmitted by using time slot TS3, and then, the process proceeds to Step 22-18.

In Step 22-18, the communication packet is received by using time slot TS4. In Step 22-19, it is determined whether or not the communication packet is normally received by using the error detection code. In a case where the communication packet is normally received, the process proceeds to Step 22-20.

In Step 22-20, the header is checked, and the process proceeds to Step 22-21. In Step 22-21, it is determined whether a reception message is a message of 1 bite, or MSB data or LSB data of a message of 2 bites according to the check result of the header. In a case where the transmission message is the message of 1 bite, the process proceeds to Step 22-24. In Step 22-24, control unit 29 receives the received message of 1 bite.

In a case where the transmission message is the MSB data of the message of 2 bites, the process proceeds to Step 22-23. In Step 22-23, the MSB data is retained, and the process proceeds to Step 22-25 in preparation for reception processing of the LSB data to be received in next time slot TS4. In a case where the LSB data is received in the next time slot, the process proceeds to Step 22-24.

In Step 22-24, the received LSB data is combined with the retained MSB data. Control unit 29 receives a combined message of 2 bites.

In the process of combining the divided data items described above, in a case where the MSB data is not received, but LSB data is received, or in a case where the LSB data is not received after the MSB data is received, in Step 22-22, the retained MSB data, or the retained MSB data and the received LSB data are discarded.

Figure 23:
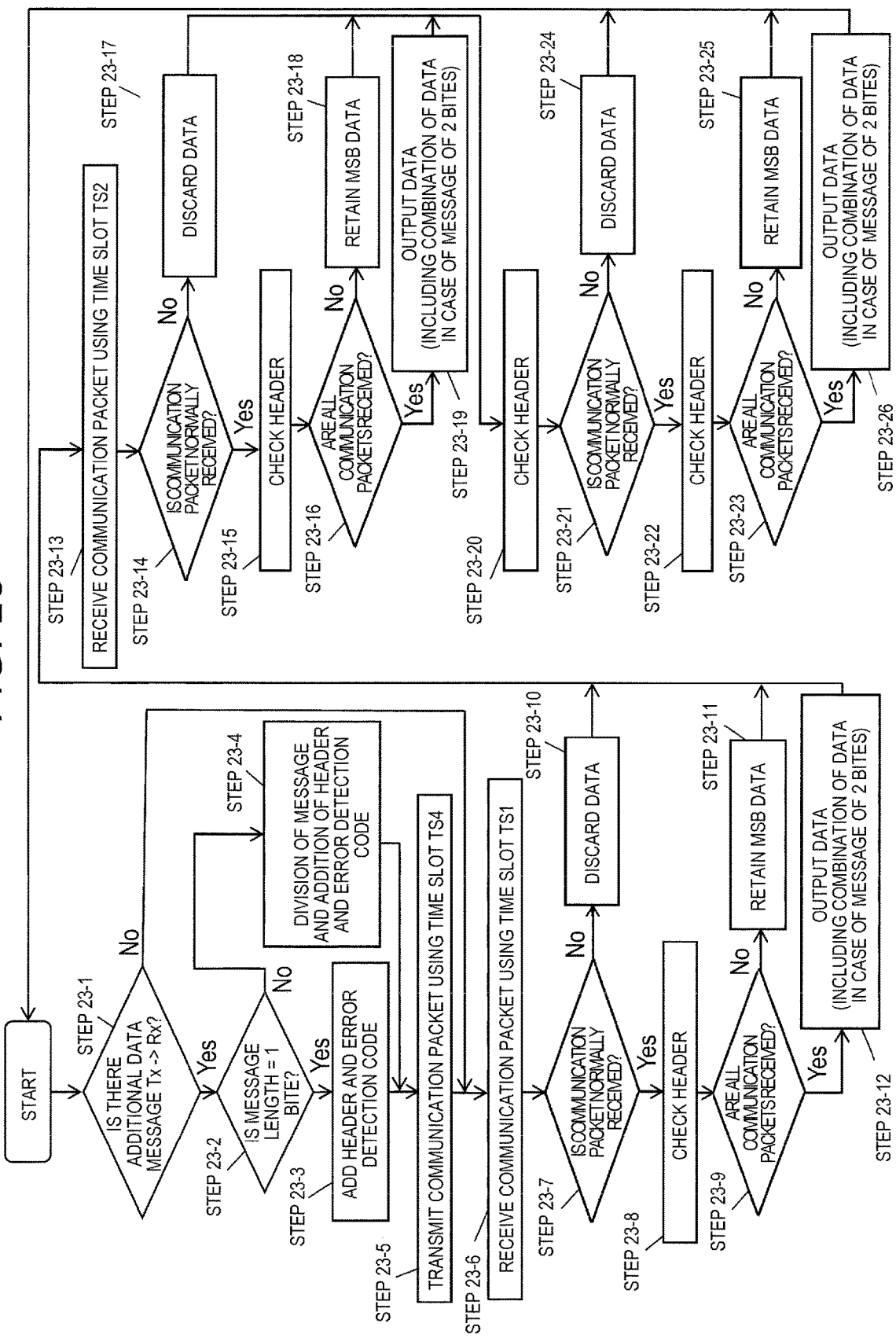
FIG. 23 is a flowchart illustrating a communication process in a contactless power feeder according to Exemplary Embodiment 4.

FIG. 23 is a flowchart illustrating a communication process in contactless power feeder 20g. As illustrated in FIG. 23, in Step 23-1, the presence or absence of additional data message Tx->Rx to be transmitted is determined. In a case where there is no transmission message, the process proceeds to Step 23-6. In a case where there is a transmission message, the process proceeds to Step 23-2.

In Step 23-2, it is determined whether the length of the transmission message is 1 bite or 2 bites. In a case where the length of the transmission message is 1 bite, the process proceeds to Step 23-3. In Step 23-3, the header and the error detection code for a message of 1 bite are added to the message. In Step 23-5, the communication packet is transmitted by using time slot TS4.

In a case where the length of the transmission message is 2 bites, the process proceeds to Step 23-4. In Step 23-4, unique header and a unique error detection code are added to the MSB data and the LSB data, respectively. In Step 23-5, the communication packet is transmitted by using time slot TS4, and then, the process proceeds to Step 23-6.

In Step 23-6, the communication packet is received by using time slot TS1. In Step 23-7, it is determined whether the communication packet is normally received by using the error detection code. In a case where the communication packet is normally received, the process proceeds to Step 23-8.

In Step 23-8, the header is checked, and the process proceeds to Step 23-9. In Step 23-9, it is determined whether a reception message is a message of 1 bite, or MSB data or LSB data of a message of 2 bites according to the check result of the header.

In a case where the reception message is the message of 1 bite, the process proceeds to Step 23-12. In Step 23-12, control unit 29 receives the received message of 1 bite. In a case where the reception message is the MSB data of the message of 2 bites, the process proceeds to Step 23-11.

In Step 23-11, the MSB data is retained, and the process proceeds to Step 23-13 in preparation for reception processing of the LSB data to be received in next time slot TS3. In a case where the LSB data is received in the next time slot, the process proceeds to Step 23-12. In Step 23-12, the received LSB data is combined with the retained MSB data. Control unit 29 receives a combined message of 2 bites.

In the process of combining the divided data items described above, in a case where the MSB data is not received, but LSB data is received, or in a case where the LSB data is not received after the MSB data is received, in Step 23-10, the retained MSB data, or the retained MSB data and the received LSB data are discarded.

In Step 23-13, the communication packet is received by using time slot TS2, and in Step 23-14, it is determined whether or not the communication packet is normally received by using the error detection code. In a case where the communication packet is normally received, the process proceeds to Step 23-15. In Step 23-15, the header is checked, and the process proceeds to Step 23-16. In Step 23-16, it is determined whether a reception message is a message of 1 bite, or MSB data or LSB data of a message of 2 bites according to the check result of the header.

In a case where the reception message is the message of 1 bite, the process proceeds to Step 23-19. In Step 23-19, control unit 29 receives the received message of 1 bite. In a case where the reception message is the MSB data of the message of 2 bites, the process proceeds to Step 23-18.

In Step 23-18, the MSB data is retained, and the process proceeds to Step 23-20 in preparation for reception processing of the LSB data to be received in next time slot TS2. In a case where the LSB data is received in the next time slot, the process proceeds to Step 23-19. In Step 23-19, the received LSB data is combined with the retained MSB data. Control unit 29 receives a combined message of 2 bites.

In the process of combining the divided data items described above, in a case where the MSB data is not received, but LSB data is received, or in a case where the LSB data is not received after the MSB data is received, in Step 23-17, the retained MSB data, or the retained MSB data and the received LSB data are discarded.

In Step 23-20, the communication packet is received by using time slot TS3, and in Step 23-21, it is determined whether or not the communication packet is normally received by using the error detection code. In a case where the communication packet is normally received, the process proceeds to Step 23-22. In Step 23-22, the header is checked, and the process proceeds to Step 23-23. In Step 23-23, it is determined whether a reception message is a message of 1 bite, or MSB data or LSB data of a message of 2 bites according to the check result of the header.

In a case where the reception message is the message of 1 bite, the process proceeds to Step 23-26. In Step 23-26, control unit 29 receives the received message of 1 bite. In a case where the reception message is the MSB data of the message of 2 bites, the process proceeds to Step 23-25.

In Step 23-25, the MSB data is retained, and the process proceeds to Step 23-1 in preparation for reception processing of the LSB data to be received in next time slot TS1. In a case where the LSB data is received in the next time slot, the process proceeds to Step 23-26. In Step 23-26, the received LSB data is combined with the retained MSB data. Control unit 29 receives a combined message of 2 bites.

In the process of combining the divided data items described above, in a case where the MSB data is not received, but LSB data is received, or in a case where the LSB data is not received after the MSB data is received, in Step 23-24, the retained MSB data, or the retained MSB data and the received LSB data are discarded.

Even though it is not illustrated in FIG. 23, in a case where a header (for example, 28*h* illustrated in FIG. 4) of MSB data of a message indicating the amount of received power is received in the power feeding side by using time slot TS3, it is determined in advance such that the transmission processing in next time slot TS4 is postponed to the time after next time slot TS4, and the same reception processing is performed.

Accordingly, in the power reception side, it is possible to successionally transmit each of the MSB data and the LSB data of the power control message in time slot TS3 and time slot TS4. In this case, in order to guarantee a constant transmission opportunity in the power feeding side, a rule that successive transmission of a message in the power reception side is limited to one time in a constant time or a constant cycle is set.

Thus far, a case where the message of 2 bites is divided into the MSB data and the LSB data has been described. However, it is also possible to apply this exemplary embodiment to a case where data of greater than or equal to 3 bites is transmitted by being divided.

For example, in a case where a message of 3 bites is transmitted by being divided into three messages, a header of a frame transmitting data (⅓) of 1 bite at the beginning is defined as (38*h*), a header of a frame transmitting data (⅔) of the second bite is defined as (39*h*), and a header of a frame transmitting data (3/3) of the third bite is defined as (3A*h*), in advance.

Accordingly, in the reception side, it is possible to reliably grasp when reception of data of one bite starts and ends, and whether or not the data is actually received. As a result thereof, in a case where a transmission error occurs in the middle of reception, in the reception side, it is possible to specify data to be discarded in this time point.

Furthermore, it is also possible apply this division communication method to a longer message. For example, it is also possible to divide a message of 5 bites to 7 bites into three messages, and to transmit the divided messages by using three time slots. In a case of a message having a length longer than or equal to the length described above, a time slot may be used in which data which is divided every 3 bites is transmitted.

In addition, in this exemplary embodiment, one time slot is defined as a period having a length in which the communication of the message of 1 bite can be narrowly performed, but the present disclosure is not limited thereto. In a case where a faster communication method is used, a message length which can be subjected to communication in one time slot increases. For example, in a case where data of 2 bites can be subjected to communication in one time slot, the same effect can be obtained in a case where a message is divided every 2 bites.

Here, the use of the time slot being changed according to whether or not the input display unit including the input unit and the display unit is disposed on the power reception side or on the power feeding side will be described by using FIG. 24A to FIG. 24D.

Figure 24A:
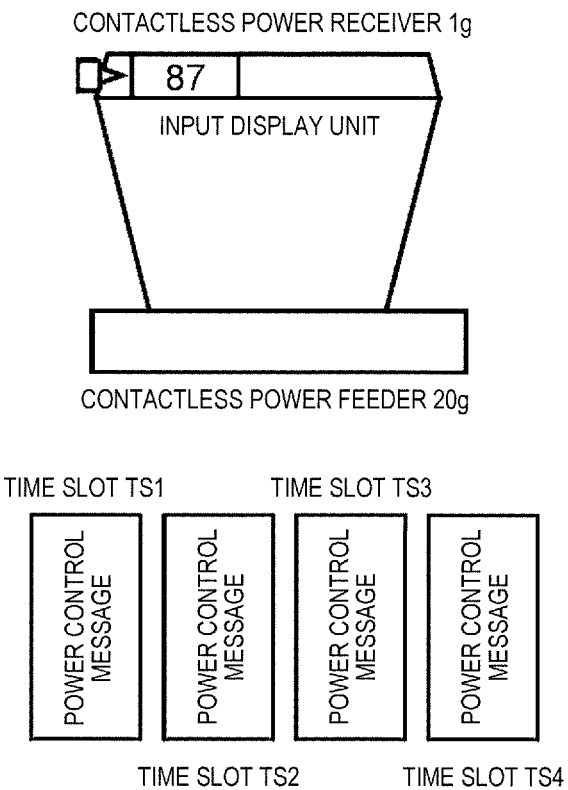
FIG. 24A is a diagram illustrating an example of a combination according to the presence or absence of an input display unit on a power reception side and a power feeding side.

As illustrated in FIG. 24A, in a case where the power receiver in which the input display unit is disposed is mounted on the power feeder in which the input display unit is not disposed, in power feeding state S4*a* illustrated in the state transition diagram of FIG. 7, it is not necessary to perform communication of additional information controlling a device other than the received power information and the power error information. For this reason, it is possible to allocate all time slots to the power control message.

As illustrated in FIG. 24C, in a case where the power receiver in which the operation display unit is not disposed is mounted on the power feeder in which the input display unit is disposed, additional data message Tx->Rx for transmitting additional information required for setting such as on and off information of the power reception side, a temperature, a rotational rate, and a time to the power reception side from the power feeding side, and additional data message Rx->Tx for transmitting additional information required for notification such as a temperature, a rotational rate, and a time to the power feeding side from the power reception side are required.

As illustrated in FIG. 24D, the power receiver in which the input display unit is disposed is mounted on the power feeder in which the input display unit is disposed, in order to enable both of an operation from one to the other and display of information of the other to be performed, it is necessary to provide a time slot for performing the communication of the additional information.

Figure 24B:
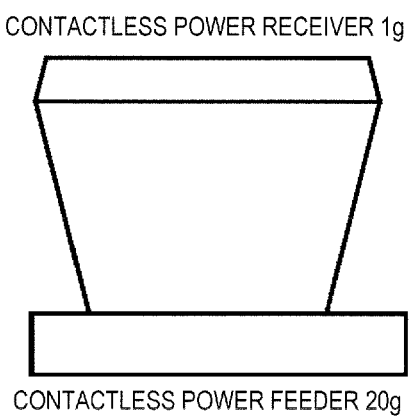
FIG. 24B is a diagram illustrating an example of the combination according to the presence or absence of the input display unit on the power reception side and the power feeding side.

As illustrated in FIG. 24B, in a case where the power receiver in which the input display unit is not disposed is mounted on the power feeder in which the input display unit is not disposed, it is desirable that the power transmission is not performed from the viewpoint of safety.

Furthermore, it is also possible to use a contactless power receiver including an AC output terminal (an outlet) instead of load 11. Such a contactless power receiver feeds power to other electrical devices in which an AC input plug is inserted into the AC output terminal described above.

A table including a contactless power feeder therein, a kitchen counter, a general-purpose contactless table tap for feeding power to a general electrical device, which can be used on an IH stove, a dedicated contactless power reception jacket for feeding power to a specified electrical device, and the like are considered as a specific example. In general, the input display unit is disposed in the electrical device, and thus, this case corresponds to a case illustrated in FIG. 24A, among the four combinations described above.

In identification state/setting state S3$a$ illustrated in the state transition diagram of FIG. 7, any one of the time slot allocations illustrated in FIG. 24A to FIG. 24D is selected according to whether or not each of the power receiver and the power feeder includes the input display unit. Accordingly, safety, efficiency, and convenience are improved.

Modification Example of Exemplary Embodiment 4

Figure 25:
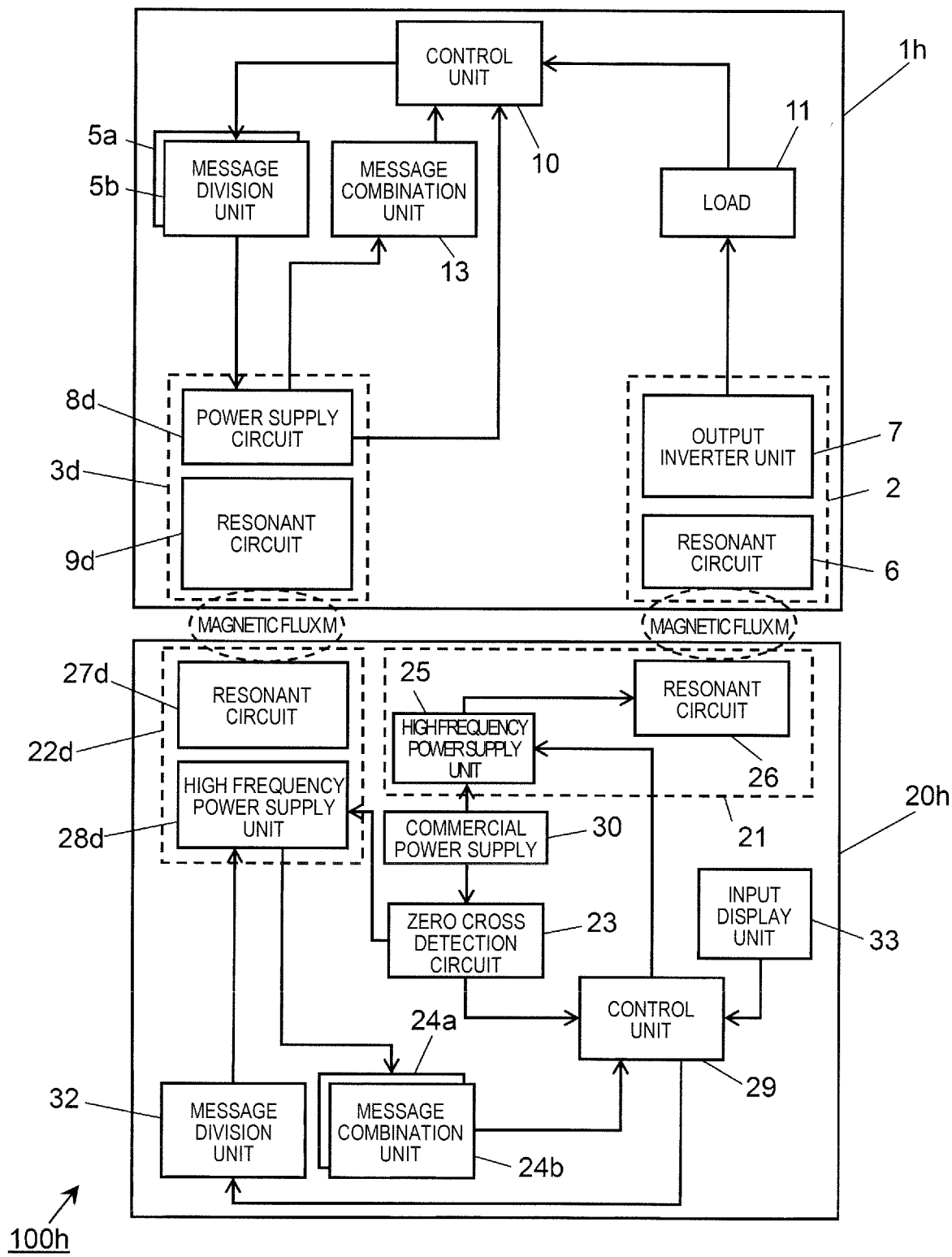
FIG. 25 is a block configuration diagram of a contactless power transmission system according to a modification example of Exemplary Embodiment 4.

FIG. 25 is a block configuration diagram of contactless power transmission system 100$h$ according to a modification example of Exemplary Embodiment 4. In the drawings for illustrating this modification example, the same reference numerals are applied to the identical or corresponding portions to those of the drawings described above, and the detailed description thereof will be omitted.

As illustrated in FIG. 25, contactless power transmission system 100$h$ is different from contactless power transmission system 100$f$ illustrated in FIG. 19 in the following points.

Contactless power receiver 1$h$ includes message division units 5$a$ and 5$b$ instead of message division unit 5. Contactless power feeder 20$h$ includes message combination units 24$a$ and 24$b$ instead of message combination unit 24.

According to this configuration, contactless power transmission system 100$h$ has a bidirectional communication function identical to that of Exemplary Embodiment 4, and a two-system contactless power transmission function identical to that of the modification example of Exemplary Embodiment 3.

Exemplary Embodiment 5

Figure 26:
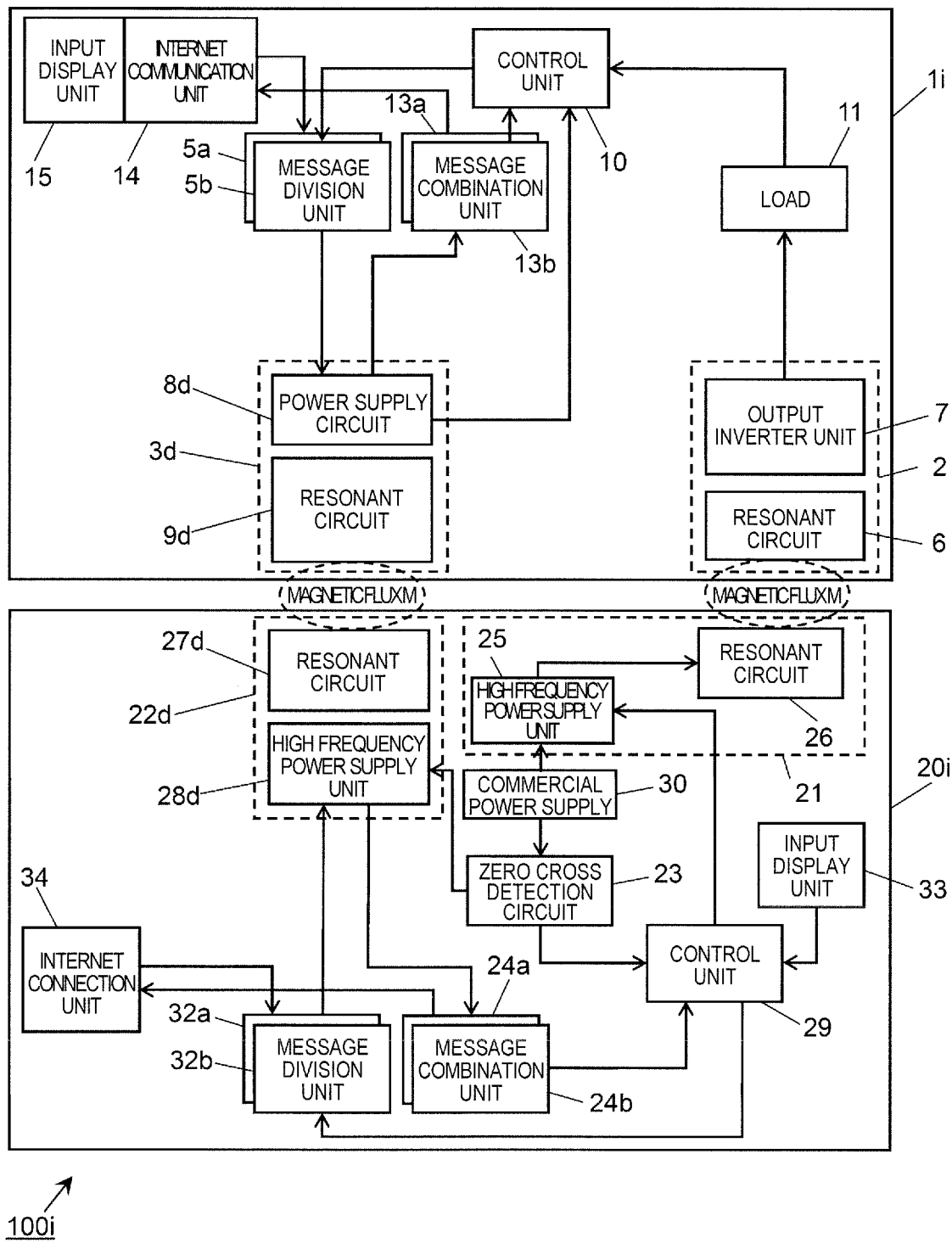
FIG. 26 is a block configuration diagram of a contactless power transmission system according to Exemplary Embodiment 5.

FIG. 26 is a block configuration diagram of contactless power transmission system 100$i$ according to this exemplary embodiment. In the drawings for illustrating this exemplary embodiment, the same reference numerals are applied to the identical or corresponding portions to those of the drawings described above, and the detailed description thereof will be omitted.

As illustrated in FIG. 26, contactless power transmission system 100$i$ is different from contactless power transmission system 100$h$ illustrated in FIG. 25 in the following points.

Contactless power receiver 1$i$ further includes internet communication unit 14 and input display unit 15, and includes message combination unit 13$a$ and message combination unit 13$b$ instead of message combination unit 13. Contactless power feeder 20$i$ further includes internet connection unit 34, and includes message division unit 32$a$ and message division unit 32$b$ instead of message division unit 32.

That is, message combination units 13$a$ and 13$b$ are power reception side message combination units, and message division units 32$a$ and 32$b$ are power feeding side message combination units.

In this exemplary embodiment, an example will be described in which the user operates input display unit 15, accesses a server on the internet, downloads information such as a cooking recipe, and displays the information on input display unit 15.

Internet connection unit 34 has a function of WiFi and Ethernet (Registered Trademark), and is connected to the internet. In this exemplary embodiment, communication of dramatically more information than that of the exemplary embodiments described above is performed, and thus, studies different from those for the exemplary embodiments described above are required in order to perform power control.

This exemplary embodiment is for solving such a problem, transmits a message having a length which is not capable of being transmitted in one time slot by dividing the message in each of time slots which are dynamically allocated, and dynamically adjusts a time width in one time slot.

First, dynamic time slot allocation will be described. In a case where contactless power receiver 1$i$ is a device including a motor such as a blender, it is necessary to continually perform communication of a message required for power control. In a case where contactless power receiver 1$i$ is a device including a heater such as a toaster, it is not necessary to continually perform the communication of the message required for power control.

In a case where contactless power receiver 1$i$ is a device controlling a heater by a thermostat, a device switching motor control and heater control such as a coffee machine with a mill, and the like, the frequency of the communication of the message required for power control is changed in a cooking process.

In this exemplary embodiment, time slot allocation is dynamically changed according to the properties of load 11 of contactless power receiver 1$i$.

Figure 27:
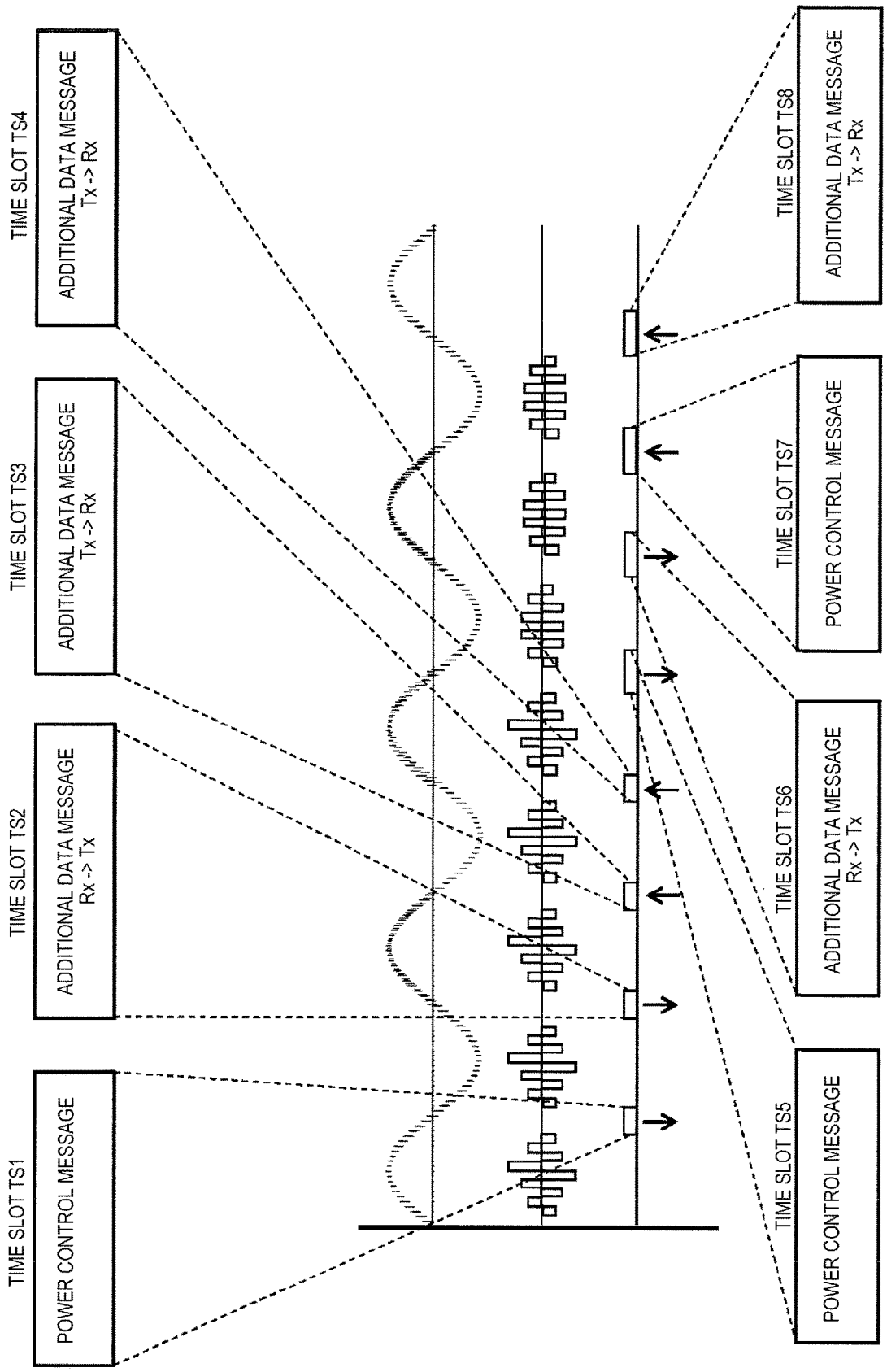
FIG. 27 is a diagram illustrating an example of dynamic time slot allocation according to Exemplary Embodiment 5.

FIG. 27 is a diagram illustrating an example of dynamic time slot allocation in this exemplary embodiment. FIG. 27 is different from the pattern of the time slot allocation illustrated in FIG. 20, the rate of the power control message in the same period of time is halved, and instead, the sporadic rate of additional data message Tx->Rx is doubled.

Specifically, for example, it is considered that in 12 successive time slots, one time slot is allocated for the power control message, 3 time slots are allocated for additional data message Rx->Tx, and 8 time slots are allocated for additional data message Tx->Rx. Other settings can be used.

Control unit 29 is programmed to include a plurality of alternatives relevant to the time slot allocation according to the attributes of load 11 (a motor, a heater, and the like), the properties of load 11 (the number of rotations, heater output, and the like), and a cooking pattern (a time change in the attributes or the properties). Control unit 29 determines one alternative from the programmed plurality of alternatives according to load 11 disposed in contactless power receiver 1$i$.

Accordingly, it is possible to ensure time slots in which the number of times slots is required for power control at the time of cooking, and then, for example, to allocate the time slots to the download of recipe information from the internet to a maximum extent.

As illustrated in FIG. 26, this exemplary embodiment includes a duplexed message division unit and a duplexed message combination unit on the power reception side, and a duplexed message division unit and a duplexed message combination unit on the power feeding side. An IP packet of the internet is divided into a size which can be transmitted as an additional data message, and is combined, and thus, is transmitted as a plurality of additional data messages. The power control message is transmitted by using the minimum time slot for power control.

Figure 28:
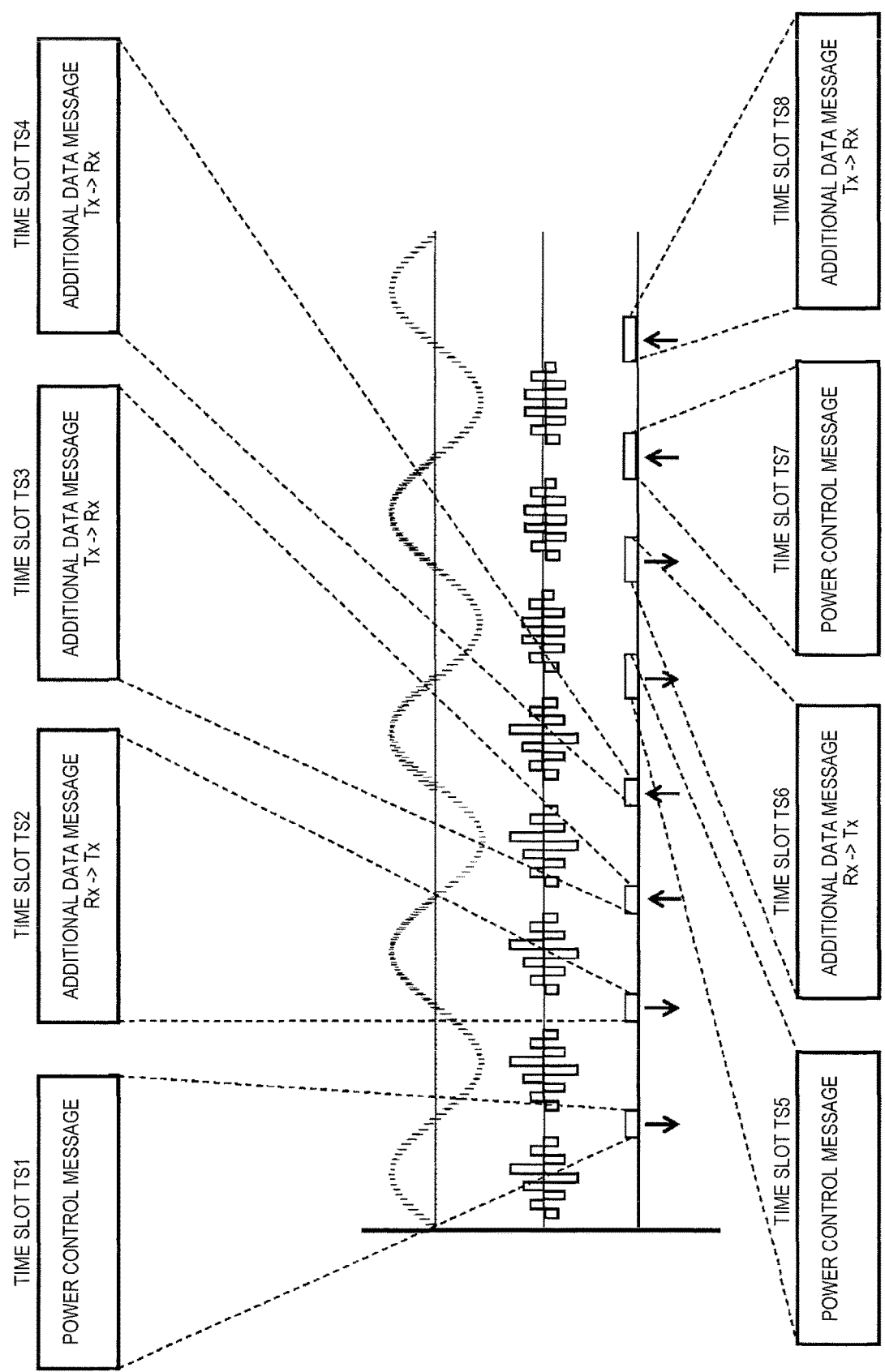
FIG. 28 is a diagram illustrating an example of the dynamic time slot allocation according to Exemplary Embodiment 5.

Next, dynamic adjustment of the time width of the time slot will be described by using FIG. 28.

The message communication is performed in the vicinity of a zero cross in order to avoid an influence on the message communication due to a magnetic field for contactless power transmission. The degree of the influence is changed according to power to be transmitted.

For this reason, the time width of the time slot is adjusted according to the amount of fed power, the time width of the time slot is widened such that more information is transmitted in a time slot where the amount of fed power is small. Specifically, several time slot widths are determined in advance according to the amount of fed power, and in the power feeding side, the time width of the time slot is determined according to the fed power.

Figure 29:
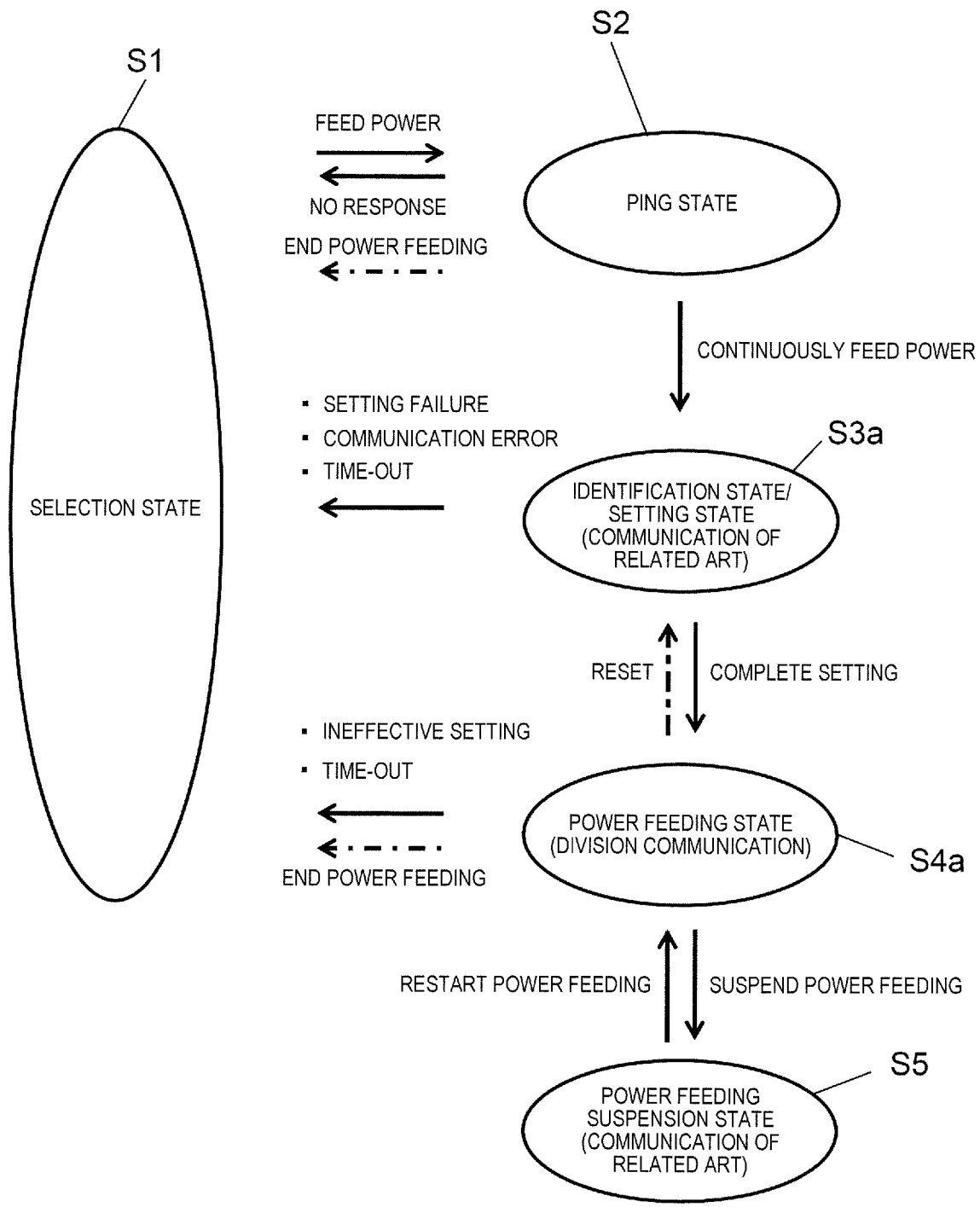
FIG. 29 is a state transition diagram of the contactless power transmission system according to Exemplary Embodiment 5.
Figure 30:
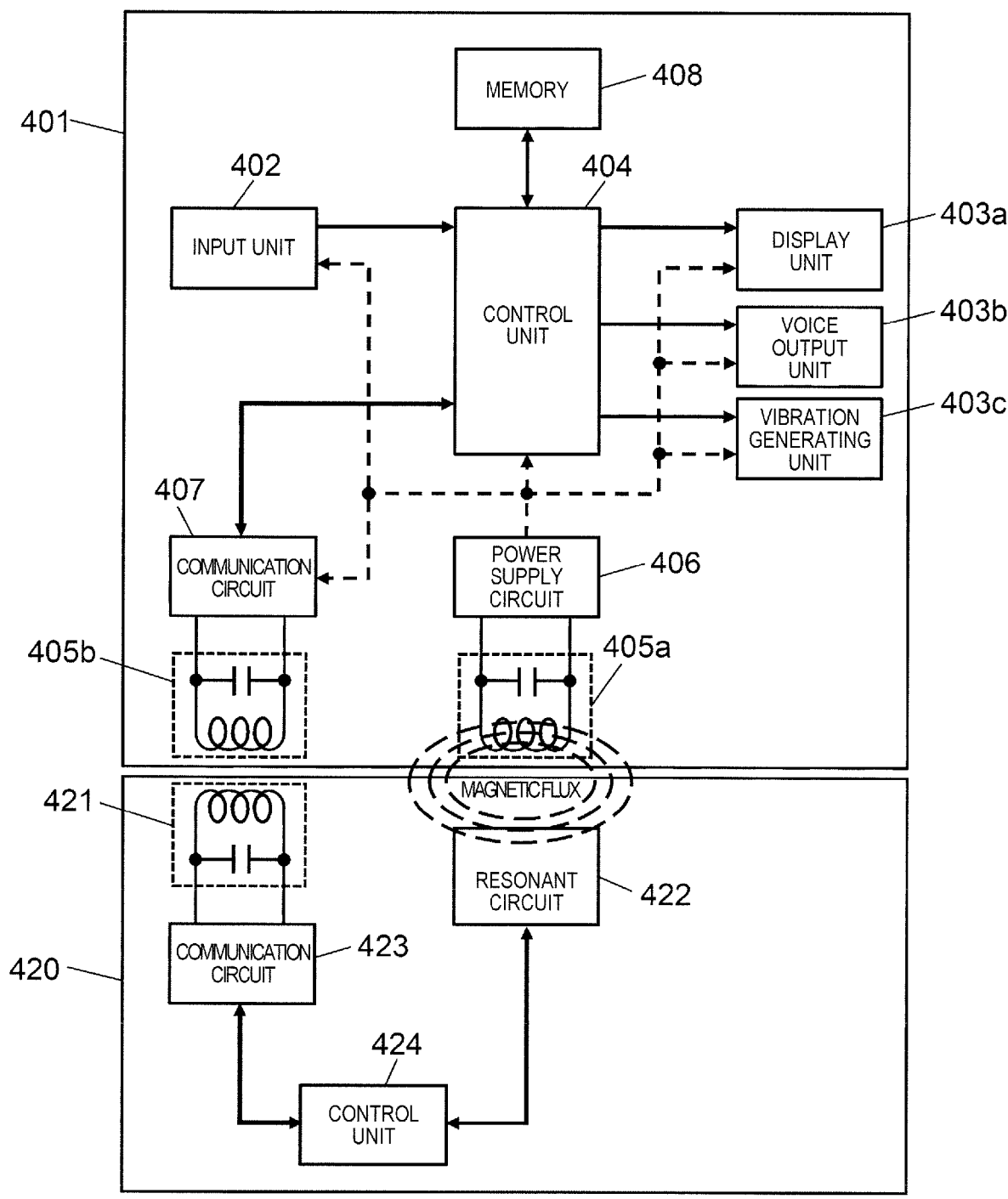
FIG. 30 is a block configuration diagram of a contactless power transmission system of the related art described in PTL 1.
Figure 31:
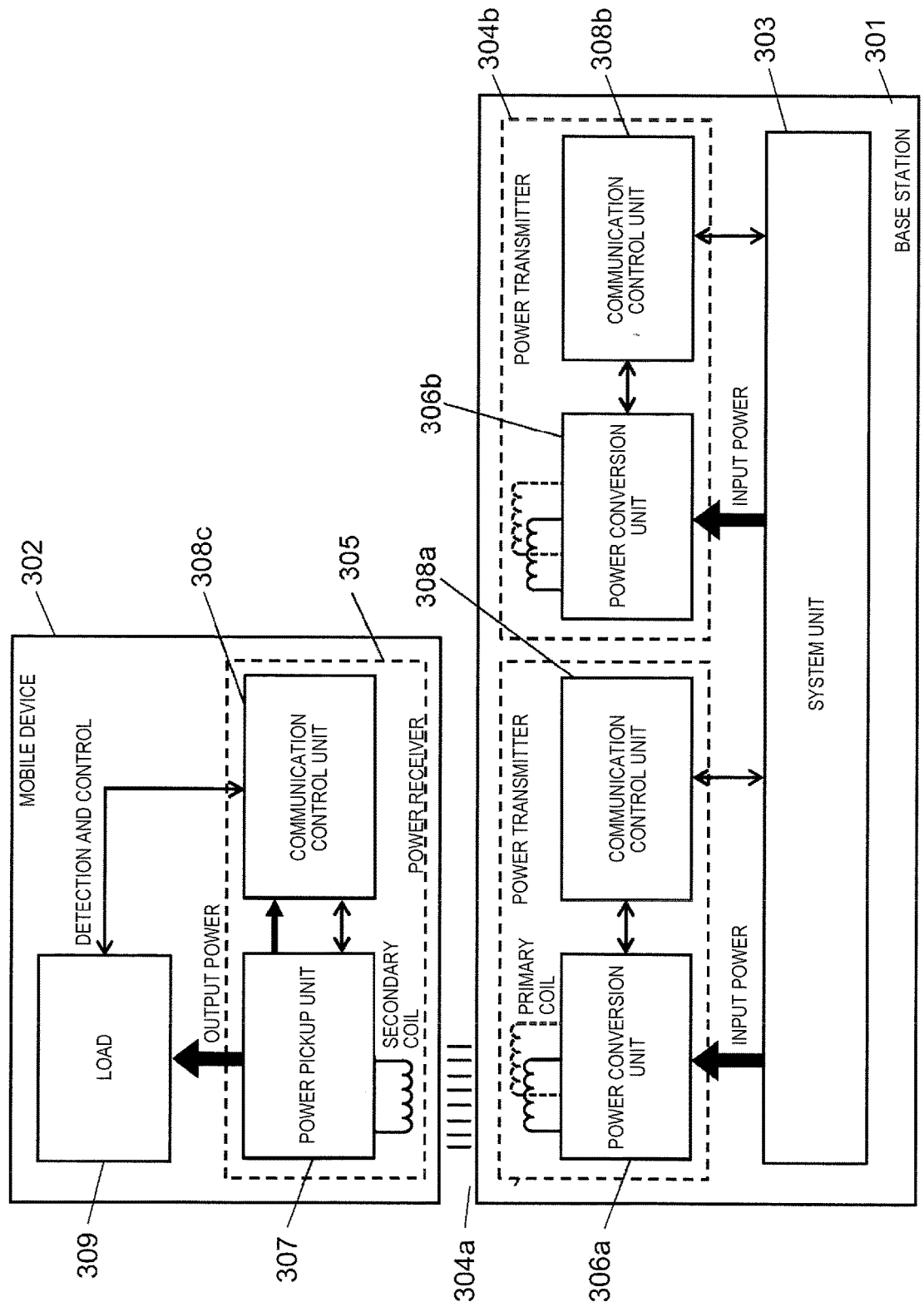
FIG. 31 is a block configuration diagram of a wireless charge system of the related art described in NPL 1.

In a case of a cooking pattern including a time slot where the fed power becomes zero, in this time slot, power control is not necessary, and thus, the message communication can be performed at all times. FIG. 29 is a state transition diagram of contactless power transmission system 100i, and illustrates state transition in dynamic time slot allocation to which a cooking pattern is added.

As illustrated in FIG. 29, the state transition diagram of this exemplary embodiment further includes power feeding suspension state S5 in addition to the state transition illustrated in FIG. 7. Power feeding suspension state S5, for example, is a state transitioned in a time slot where the fed power is not necessary, in the cooking pattern.

When power feeding communication unit 22d performs conventional communication not using the division communication method in response to a signal for instructing suspension of the fed power, which is output by control unit 29, to high frequency power supply unit 25, contactless power transmission system 100i proceeds to power feeding suspension state S5.

In power feeding suspension state S5, the influence due to the power transmission is not generated, and the message communication can be performed at all times, and thus, the download of the information from the internet is performed in this state.

Furthermore, it is also possible to apply the division communication method according to this exemplary embodiment to a longer message. For example, it is also possible to divide a message of 5 bites to 7 bites into three messages, and to transmit the three messages by using three time slots. In a case of a message having a length longer than or equal to the length described above, a time slot may be used in which data which is divided every 3 bites is transmitted.

In addition, in this exemplary embodiment, one time slot is defined as a period having a length in which the communication of the message of 1 bite can be narrowly performed, but the present disclosure is not limited thereto. In a case where a faster communication method is used, a message length which can be subjected to communication in one time slot increases. For example, in a case where data of 2 bites can be subjected to communication in one time slot, the same effect can be obtained in a case where a message is divided every 2 bites.

As described above, according to the contactless power transmission system of the present disclosure, it is possible to accurately perform communication having a large amount of information between the contactless power receiver and the contactless power feeder without being affected by the noise due to the contactless power transmission.

According to the contactless power transmission system of the present disclosure, the size of message to be subjected to communication in the vicinity of the zero cross point at one time is changed according to the maximum power received by the contactless power receiver. Accordingly, it is possible to perform communication of more messages with respect to a power receiver of which the maximum power is smaller, in a predetermined period of time.

According to the contactless power transmission system of the present disclosure, in a case where a response message does not normally return to a request of response message, the size of information to be subjected to communication in the vicinity of the zero cross point at one time decreases. That is, it is possible to adjust the size of information to be subjected to communication according to a communication environment.

According to the contactless power transmission system of the present disclosure, in a case of the power feeding state to the contactless power receiver from the contactless power feeder, division of a message or communication in the vicinity of the zero cross point is performed. Accordingly, it is possible to more efficiently perform communication in a state other than the power feeding state.

INDUSTRIAL APPLICABILITY

As described above, it is possible to apply the present disclosure to a contactless power feeder, a contactless power receiver, and a contactless power transmission system.

What is claimed is:

1. A contactless power receiver, comprising:
    a power reception unit having a contactless power reception function using electromagnetic induction through a first resonant circuit;
    a communication unit separately transmitting a plurality of out-going data items through a second resonant circuit in a time slot in a vicinity of a zero cross point of an alternating current voltage from a commercial power supply, wherein a power transmitting coil of the first resonant circuit has a shape of a doughnut, a data communication coil of the second resonant circuit is disposed on an outside of the power transmitting coil and is concentrically wound along an outer circumference of the power transmitting coil, and the time slot includes the zero cross point; and
    a power reception side message division unit dividing a transmission message into the plurality of out-going data items for transmitting, each of the plurality of out-going data items having a size transmittable in the time slot; and
    a power reception side message combination unit generating a reception message by combining a plurality of incoming data items received through the time slot in the vicinity of the zero cross point.

2. The contactless power receiver of claim 1,
    wherein in a case in which the transmission message is a message requesting a response message, the communication unit transmits all of the plurality of out-going data items, and then, receives the response message in a subsequent time slot.

3. The contactless power receiver of claim 1,
    wherein the communication unit is a power reception communication unit having the contactless power reception function and transmitting the transmission message by performing load modulation with respect to high frequency power which is subjected to contactless transmission according to the transmission message.

4. The contactless power receiver of claim 1, wherein the communication unit is a power reception communication unit having the contactless power reception function and receiving the reception message superimposed on high frequency power which is subjected to contactless transmission by load modulation.

5. A contactless power receiver, comprising:
a power reception unit having a contactless power reception function using electromagnetic induction through a first resonant circuit; and
a communication unit, in a case in which a transmission message requesting a response message is transmitted through a second resonant circuit in a time slot in a vicinity of a zero cross point of an alternating current voltage from a commercial power supply, wherein a power transmitting coil of the first resonant circuit has a shape of a doughnut, a data communication coil of the second resonant circuit is disposed on an outside of the power transmitting coil and is concentrically wound along an outer circumference of the power transmitting coil, and the time slot includes the zero cross point, the communication unit receiving the response message in a subsequent time slot, and
wherein the transmission message are divided into a plurality of out-going data items for transmitting through the time slot, and the response message is formed by combining a plurality of incoming data items received through the subsequent time slot.

6. A contactless power receiver, comprising:
a power reception unit having a contactless power reception function using electromagnetic induction through a first resonant circuit;
a communication unit performing communication of a message through a second resonant circuit in a time slot in a vicinity of a zero cross point of an alternating current voltage from a commercial power supply, wherein a power transmitting coil of the first resonant circuit has a shape of a doughnut, a data communication coil of the second resonant circuit is disposed on an outside of the power transmitting coil and is concentrically wound along an outer circumference of the power transmitting coil, and the time slot includes the zero cross point; and
a control unit allocating the time slot to any one of transmission of a power control message, transmission of other messages, and reception of a reception message according to time slot allocation,
wherein the transmission of other message are divided into a plurality of out-going data items for transmitting through the time slot, and the reception message is formed by combining a plurality of incoming data items received through subsequent time slot.

7. The contactless power receiver of claim 6, wherein the control unit changes the time slot allocation according to a load.

8. A contactless power feeder, comprising:
a power feeding unit having a contactless power feeding function using electromagnetic induction through a first resonant circuit;
a communication unit separately receiving a plurality of incoming data items through a second resonant circuit in a time slot in a vicinity of a zero cross point of an alternating current voltage from a commercial power supply, wherein a power transmitting coil of the first resonant circuit has a shape of a doughnut, a data communication coil of the second resonant circuit is disposed on an outside of the power transmitting coil and is concentrically wound along an outer circumference of the power transmitting coil, and the time slot includes the zero cross point; and
a power feeding side message combination unit generating a reception message by combining the plurality of incoming data items, each of the plurality of incoming data items having a size receivable in the time slot.

9. The contactless power feeder of claim 8, further comprising:
a power feeding side message division unit dividing a transmission message into a plurality of out-going data items,
wherein the communication unit separately transmits the plurality of out-going data items divided by the power feeding side message division unit, by using a plurality of time slots.

10. The contactless power feeder of claim 8, wherein in a case in which the reception message is a message requesting a response message, the communication unit receives all of the plurality of incoming data items, and then, transmits the response message in a subsequent time slot.

11. The contactless power feeder of claim 8, wherein the communication unit is a power feeding communication unit having the contactless power feeding function and receiving the reception message superimposed on high frequency power which is subjected to contactless transmission by load modulation.

12. The contactless power feeder of claim 9, wherein the communication unit is a power feeding communication unit having the contactless power feeding function and transmitting the transmission message by performing load modulation with respect to high frequency power which is subjected to contactless transmission according to the transmission message.

13. A contactless power feeder, comprising:
a power feeding unit having a contactless power feeding function using electromagnetic induction through a first resonant circuit; and
a communication unit, in a case in which a reception message requesting a response message is received through a second resonant circuit in a time slot in a vicinity of a zero cross point of an alternating current voltage from a commercial power supply, wherein a power transmitting coil of the first resonant circuit has a shape of a doughnut, a data communication coil of the second resonant circuit is disposed on an outside of the power transmitting coil and is concentrically wound along an outer circumference of the power transmitting coil, and the time slot includes the zero cross point, the communication unit transmitting the response message in a subsequent time slot, wherein response message is divided into a plurality of out-going data items for transmitting in the subsequent time slot.

14. A contactless power feeder, comprising:
a power feeding unit having a contactless power feeding function using electromagnetic induction through a first resonant circuit;
a communication unit performing communication of a message through a second resonant circuit in a time slot in a vicinity of a zero cross point of an alternating current voltage from a commercial power supply, wherein a power transmitting coil of the first resonant circuit has a shape of a doughnut, a data communication coil of the second resonant circuit is disposed on an outside of the power transmitting coil and is concentrically wound along an outer circumference of the power transmitting coil, and the time slot includes the zero cross point; and a control unit allocating the time slot to any one of transmission of a power control message, transmission of other messages, and reception of a reception message according to time slot allocation, wherein control message and the other messages, each is divided into a plurality of out-going data items for transmitting, and the reception message is formed by combining a plurality of incoming data items received according to the time slot allocation.

15. The contactless power feeder of claim 14,
wherein the control unit changes the time slot allocation according to a load.

16. A contactless power transmission system, comprising:
a contactless power receiver;
a contactless power feeder;
wherein the contactless power receiver includes:
- a power reception unit having a contactless power reception function using electromagnetic induction through a first resonant circuit,
- a communication unit separately transmitting a plurality of out-going data items through a second resonant circuit in a time slot in a vicinity of a zero cross point of an alternating current voltage from a commercial power supply, wherein a power transmitting coil of the first resonant circuit has a shape of a doughnut, a data communication coil of the second resonant circuit is disposed on an outside of the power transmitting coil and is concentrically wound along an outer circumference of the power transmitting coil, and the time slot includes the zero cross point, and
- a power reception side message division unit dividing a transmission message into the plurality of out-going data items, each of the plurality of out-going data items having a size transmittable in the time slot; and wherein the contactless power feeder includes:
- a power feeding unit having a contactless power feeding function using electromagnetic induction through a third resonant circuit,
- a communication unit separately receiving a plurality of incoming data items through a fourth resonant circuit in a time slot in the vicinity of the zero cross point, wherein the third resonant circuit and the fourth resonant circuit are separate circuits, and
- a power feeding side message combination unit generating a reception message by combining the plurality of incoming data items, each of the plurality of incoming data items having a size receivable in the time slot.

* * * * *